(12) United States Patent
Swager

(10) Patent No.: US 7,186,355 B2
(45) Date of Patent: Mar. 6, 2007

(54) INSULATED NANOSCOPIC PATHWAYS, COMPOSITIONS AND DEVICES OF THE SAME

(75) Inventor: Timothy M. Swager, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 793 days.

(21) Appl. No.: 09/777,725

(22) Filed: Feb. 5, 2001

(65) Prior Publication Data
US 2002/0040805 A1 Apr. 11, 2002

Related U.S. Application Data

(60) Provisional application No. 60/180,357, filed on Feb. 4, 2000.

(51) Int. Cl.
H01B 1/00 (2006.01)
H01B 1/12 (2006.01)
H01B 1/04 (2006.01)
H01B 1/06 (2006.01)
H01L 29/08 (2006.01)
H01L 35/24 (2006.01)
H01L 51/00 (2006.01)
G01N 27/26 (2006.01)
C08F 290/14 (2006.01)
H01L 29/43 (2006.01)

(52) U.S. Cl. .................. 252/500; 252/502; 252/510; 252/506; 204/415; 422/98; 525/50; 257/40; 257/139

(58) Field of Classification Search ............. 252/500, 252/502, 506, 510; 204/415; 422/98; 525/50; 257/40, 139
See application file for complete search history.

(56) References Cited

U.S. PATENT DOCUMENTS

| 4,839,112 A | 6/1989 | Wynne et al. |
| 4,841,099 A * | 6/1989 | Epstein et al. .............. 174/258 |
| 4,957,615 A | 9/1990 | Ushizawa et al. |
| 4,992,244 A | 2/1991 | Grate |

(Continued)

FOREIGN PATENT DOCUMENTS

WO    WO 99/57222 A1    11/1999

(Continued)

OTHER PUBLICATIONS

T. Swager, "The Molecular Wire Approach to Sensory Signal Application," Acc. Chem. Res., vol. 31, pp. 201 207, 1998.

(Continued)

Primary Examiner—Jezia Riley
(74) Attorney, Agent, or Firm—Wolf, Greenfield & Sacks, P.C.

(57) ABSTRACT

The present invention relates to compositions which provide an insulated nanoscopic pathway. The pathway comprises molecules, polymers or nanoscopic particles capable of conducting charge integrated with nanoscopic switches which are capable of electronic communication with the charge-conducting species. Turning "on" the nanoscopic switch electronically "connects" the various molecules/particles, such that a continuous nanoscopic pathway results. The nanoscopic pathway can be used in a sensor, where the switches can act as receptors for analytes. Binding of an analyte can result in a variety of effects on the nanoscopic pathway, including altering the conductivity of the nanoscopic pathway.

4 Claims, 25 Drawing Sheets

U.S. PATENT DOCUMENTS

| | | | |
|---|---|---|---|
| 5,091,502 | A | 2/1992 | Narang et al. |
| 5,250,439 | A | 10/1993 | Musho et al. |
| 5,312,896 | A | 5/1994 | Bhardwaj et al. |
| 5,323,309 | A | 6/1994 | Taylor et al. |
| 5,387,462 | A | 2/1995 | Debe |
| 5,493,017 | A | 2/1996 | Therien et al. |
| 5,549,851 | A | 8/1996 | Fukushima et al. |
| 5,675,001 | A | 10/1997 | Hoffman et al. |
| 6,020,426 | A | 2/2000 | Yamaguchi et al. |
| 6,323,309 | B1 | 11/2001 | Swager et al. |

FOREIGN PATENT DOCUMENTS

| | | |
|---|---|---|
| WO | WO 00/05774 A1 | 2/2000 |

OTHER PUBLICATIONS

P. Audebert et al, "Synthesis and Characteristics of New Redox Polymers Based on Copper Containing Units; Evidence for the Participation of Copper in the Electron Transfer Mechanism", New Journal of Chemistry, vol. 15, No. 4, pp. 235-237, 1991.

K.A. Goldsby et al., "Oxidation of Nickel(II) Bis(salicyladimine) Complexes: Solvent Control of the Ultimate Redox Site", Polyhedron, vol. 8, No. 1, pp. 113-115, 1989.

L.A. Hoferkamp and K.A. Goldsby, "Surface-Modified Electrodes Based on Nickel(II)and Copper(II) Bis(salicyladimine) Complexes", Chemistry of Materials vol. 1, No. 3, pp. 348-352, 1989.

M.Vilas-Boas et al., "New Insights into the Structure and Properties of Electroactive Polymer Films Derived from [Ni(salen)]", Inorganic Chemistry, vol. 36, No. 22, pp. 4919-4929, 1997.

C.P. Horwitz and R.W. Murray, "Oxidative Electropolymerization of Metal Schiff-Base Complexes", Mol.Cryst.Liq.Cryst., vol. 160, pp. 389-404, 1988.

J.L. Reddinger and John R. Reynolds, "Tunable Redox and Optical Properties Using Transition Metal-Complexed Polythiophenes". Macromolecules, vol. 30, No. 3 pp. 673-675, 1997.

J.L. Reddinger and J.R. Reynolds, "Electroactive π-Conjugated Polymers Based on Transition Metal-Containing Thiophenes Capable of Sensing Ionic and Neutral Species", ACS Polym. Prepr. pp. 321-222, 1997.

J.L. Reddinger and J.R. Reynolds, "Electroactive, π-Conjugated Polymers based on Transition Metal-Containing Thiophenes", Synthetic Metals 84, pp. 225-226, 1997.

P. Audebert et al., "Redox and Conducting Polymers Based on Salen-Type Metal Units; Electrochemical Study and Some Characteristics", New Journal of Chemistry, vol. 16, No. 6, pp. 697-703, 1992.

F. Bedioui et al., "Electrooxidative polymerization of cobalt, nickel and manganese salen complexes in acetonitrile solution", J. Electroanal. Chem. 301, pp. 267-274, 1991.

C.E. Dahm and D.G. Peters, "Catalytic Reduction of Iodoethane and 2-Iodopropane at Carbon Electrodes Coated with Anodically Polymerized Films of Nickel(II) Salen", Analytical Chemistry, vol. 66, No. 19, pp. 3117-3123, 1994.

K.A. Goldsby, "Symmetric and Unsymmetric Nickel(II) Schiff Base Complexes; Metal-Localized Versus Ligand-Localized Oxidation", J.Coord.Chem., vol. 19, pp. 83-90, 1988.

H. Segawa et al., "Approaches to conducting polymer devices with nano-structure: Electrochemical construction of one-dimensional and two-dimensional prophyrin-oligothiophene co-polymers", Synthetic Metals 71, pp. 2151-2154, 1995.

T. Shimidzu et al., "Approaches to conducting polymer devices with nonstructures: photoelectrochemical function of one-dimensional and two-dimensional porphyrin polymers with oligothienyl molecular wire", Journal of Photochemistry and Photobiology A: Chemistry 99, Article 4168, pp. 1-7, 1995.

C. Armengaud et al., "Electrochemistry of conducting polypyrrole films containing cobalt porphyrin", J.Electroanal. Chem., 277, pp. 197-211, 1990.

P. Moisy et al., "Epoxidation of *cis*-cyclooctene by Molecular Oxygen Electrocatalysed by Polypyrrole-Manganese Porphyrin Film Modified Electrodes", J. Electroanal. Chem. 250, pp. 191-199, 1988.

F. Bedioui et al., "Poly(Pyrrole-Manganese Tetraphenylporphyin) film Electrodes in Acetonitrile Solution", J. Electroanal. Chem. 239, pp. 433-439, 1988.

A. Bettelheim et al., "Electrochemical Polymerization of Amino-, Pyrrole-, and Hydroxy-Substituted Tetraphenylporphyrins", Inorganic Chemistry, vol. 26, No. 7, pp. 1009-1017, 1987.

P. Audebert et al., "Description of New Redox and Conducting Polymers Based on Copper Containing Units; Emphasis on the Role of Copper in the Electron Transfer Mechanism", Synthetic Metals 41-43, pp. 3049-3052, 1991.

S.S. Zhu et al., "Conducting Polymetallorotaxanes: A Supramolecular Approach to Transition Metal Ion Sensors", Journal of the American Chemical Society, vol. 118, No. 36, pp. 8713-8714, 1996.

S.S. Zhu and T.M. Swager, "Design of Conducting Redox Polymers: A Polythiophene-Ru(bipy)$_3$$^{nP}$Hybrid Material**", Advanced Materials, vol. 8, No. 6, pp. 497-500, 1996.

G. Zotti et al., "Conductivity In Redox Modified Conducting Polymers. 2. Enhanced Redox Conductivity in Ferrocene-Substituted Polypyrroles and Polythiophenes", Chem. Mater. vol. 7, No. 12, pp. 2309-2315, 1995.

C.G. Cameron and P.G. Pickup, "A conjugated polymer/redox polymer hybrid with electronic communication between metal centres", Chem. Commun., pp. 303-304, 1997.

F. Bedioui et al., "Electrochemistry of conducting polypyrrole films containing cobalt porphyrin, Part 2." New Developments and inclusion of metallic aggregates in the coordination polymer, J. Electroanal. Chem., vol. 297, pp. 257-269, 1991.

\* cited by examiner

N = 1 or more than 1

BLOCK POLYMERS TO BIND METAL OR SEMICONDUCTOR NANOPARTICLES

INSULATED NANOSCOPIC PATHWAYS, COMPOSITIONS AND DEVICES OF THE SAME

RELATED APPLICATION

This application claims priority to U.S. Provisional Patent Application Ser. No. 60/180,357, filed Feb. 4, 2000.

FIELD OF INVENTION

The present invention provides articles, devices, compositions and methods involving conduction pathways of nanoscopic thicknesses. Applications for such devices include sensors for a variety of analytes.

BACKGROUND OF THE INVENTION

There is a considerable interest in the preparation and use of conducting pathways of the nanoscopic scale as the need for miniaturization and heightened signal sensitivity increases. A class of such conducting pathways include conjugated polymers comprising organic and/or inorganic components, e.g. "molecular wires". Typically, these molecular wire polymers will be incorporated in devices as a film having an extensive intertwined array of individual conducting pathways. Each individual pathway is provided by a polymer chain, or a nanoscopic aggregate of polymer chains.

FIG. 22 shows a schematic diagram of a prior art device 100. Device 100 comprises a polymer film 105 deposited on substrate 101 between electrodes 102 and 103, in which film 105 is capable of conducting charge. An electrical circuit 104 capable of determining the resistance with voltmeter (or ammeter) 107 completes device 100. Polymer film 105 comprises a plurality of individual polymer chains 106 (drawn as straight lines for illustrative purposes—in reality, the chains are often intertwined). Because no individual polymer chain extends between the electrode, charge conduction must occur through film 105 by charge "hopping" between individual chains (e.g. between chains 106*a* and 106*b*). A disadvantage in many films, however, is that the presence of bound guests 108, which may impede charge conduction throughout film 105, is not capable of producing as large of chemical signal as is optimal due the presence of a continuum of parallel pathways. In such materials the charge carriers responsible for the charge conduction can taken an alternative path that avoids the impediments introduced by the bound guests.

One application for nanoscopic pathways is a sensor, particularly for sensing specific molecules. Such sensors include receptor sites to bind analytes via molecular recognition. FIG. 23 shows a schematic of a plurality of isolated receptor molecules 120, each comprising a receptor site 124. Prior to binding analyte 126, receptor molecule 120 has a particular "state" schematically represented by open oval 122, which can define an oxidation state, conformation state, etc. In order to detect a binding event, the sensor relies on a change in the state upon binding an analyte. FIG. 23 schematically shows this change in state with receptor molecule 130 which is bound to analyte 126 and has a change in state depicted by blackened oval 123. Receptor molecules 120 which do not bind analyte 126 remain in state 122. FIG. 23 depicts a binding event as an equilibrium between a concentration of bound receptors and receptors prior to binding. Sensitivity of the device is thus determined by the equilibrium constant $K_{(eq)}$=[Bound receptor]/([Unbound receptor][Analyte]).

The use of conducting polymer films in sensor applications has the potential to increase the sensitivity. FIG. 24 shows a schematic of a polymer film 130 comprising a plurality of individual polymer chains 132. Film 130 spans a dimension 131, which is the dimension between electrodes if incorporated into a device.

FIG. 25 shows a schematic expansion of individual chain 132, in which receptors 142 are incorporated into chain 132 and interspersed between conducting polymer regions 140, i.e. receptors 142 are wired in series. Preferably, the entire chain comprising regions 140 and 142 comprise a continuous conducting pathway. Each receptor has a site 144 with an initial state depicted by open oval 143. Upon binding analyte 146, the state 146 of each receptor site 142 is affected due to the electronic communication existing between each receptor site 142. The result is a large signal amplification. Only a fractional occupancy is required to achieve a collective signal response.

Despite such recent improvements, there still exists a need to improve the signal amplification for sensors requiring even heightened sensitivity. There also exists a need to develop new nanoscopic materials and materials systems.

SUMMARY OF THE INVENTION

One aspect of the invention provides an article comprising a nanoscopic pathway having a conductivity. A dielectric insulates the nanoscopic pathway. A nanoscopic switch in electronic communication with the nanoscopic pathway is capable of altering the conductivity of the nanoscopic pathway.

Another aspect of the present invention provides a composition comprising a nanoscopic pathway and a polymer isolating the nanoscopic pathway. The nanoscopic pathway has a resistance of less than $10^{-4}$ times a resistance of the polymer.

Another aspect of the present invention provides a method for altering conductivity, comprising the step of providing an article comprising a nanoscopic pathway having a conductivity. The method further comprises the steps of insulating the nanoscopic pathway; and activating a nanoscopic switch positioned in the article.

Another aspect of the present invention provides a method for detecting the presence of a analyte, comprising the step of providing an article comprising a nanoscopic pathway having a conductivity. The method further comprises the steps of insulating the nanoscopic pathway, and activating detection sites positioned in the article.

Another aspect of the present invention provides a method for amplifying conductivity, comprising the step of providing an article comprising a nanoscopic pathway. The method further comprises the steps of positioning a plurality of nanoscopic switches in the article, and activating a number of the plurality of nanoscopic switches, the number being greater than a percolation threshold.

Another aspect of the present invention provides a method for reducing conductivity, comprising the step of providing an article comprising a nanoscopic pathway. The method further comprises the steps of positioning a plurality of nanoscopic switches in the article, and deactivating a number of the plurality of nanoscopic switches, the number being less than a percolation threshold.

Another aspect of the present invention provides a method for detecting the presence of an analyte, comprising the step of providing an article comprising a nanoscopic pathway. The method further comprises the steps of positioning a plurality of nanoscopic switches along the nanoscopic pathway, and activating a number of the plurality of nanoscopic switches, the number being greater than a percolation threshold.

Another aspect of the present invention provides a method for detecting the presence of an analyte, comprising the step of providing an article comprising a nanoscopic pathway. The method further comprises the steps of positioning a plurality of nanoscopic switches along the nanoscopic pathway, and deactivating a number of the plurality of nanoscopic switches, the number being less than a percolation threshold.

Another aspect of the present invention provides a method for synthesizing a conducting polymer comprising the step of providing a monomer having a first and second polymerization site. The method further comprises the steps of polymerizing the monomer at the first site to produce a first polymer, and polymerizing the monomer at the second site to produce a second polymer, the second polymer isolating the first polymer.

Another aspect of the present invention provides a block co-polymer, comprising blocks of a conducting material and blocks of a dielectric material. The blocks are arranged such that the blocks of the conducting material form a nanoscopic pathway insulated by blocks of the dielectric material.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
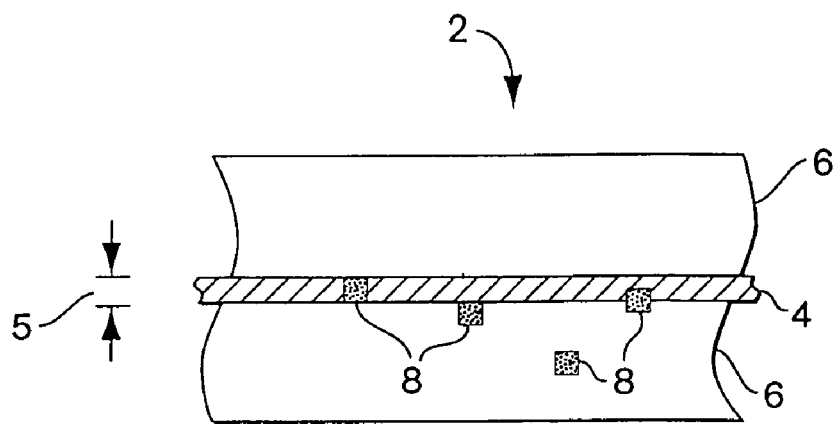
FIG. 1 shows a schematic cross-section of an article having a nanoscopic pathway isolated by a dielectric and including nanoscopic switches.

The present invention features articles, devices, compositions and methods for conducting electronic charge having applications in sensors and microelectronic components. The present invention provides advantageous features over the prior art from enhanced conduction properties and analyte detection sensitivity due to insulation of a conducting nanoscopic pathway. Such articles, devices and compositions have a number of variables that can be tailored to a desired application.

One aspect of the invention provides an article comprising a nanoscopic pathway isolated by a dielectric. In one embodiment, the nanoscopic pathway is a medium for the conduction of electronic charge. "Nanoscopic" refers to a minimum dimension of the pathway, e.g. a mean diameter or a thickness of the pathway. In one embodiment, the nanoscopic pathway has a minimum dimension of less than about 20 nm, more preferably less than about 10 nm. The minimum dimension can be as small as a thickness of a single molecule, such as a minimum thickness of benzene. In one embodiment, the nanoscopic pathway has at least one length of at least about 0.05 µm, more preferably at least about 0.1 µm. Typically, this length is the length over which conduction occurs. The pathway can be a singular pathway or can include branched pathways.

The nanoscopic pathway can be an organic group, an organometallic compound, a coordination compound, a salt, a nanoparticle, a carbon nanotube, a biological species and combinations thereof. In one embodiment, the nanoscopic pathway can be provided by a molecular system (e.g. an organic or organometallic group) having a bonding arrangement which affords delocalization of electronic charge extending throughout a portion or entire length of the molecule. Thus, the nanoscopic pathway can have a length equal to the length of the molecule. In another embodiment, the nanoscopic pathway can comprise a series of interconnected nanoscopic pathways, and the length of the pathway is equal to a total length of the interconnected series of pathways. Examples of organic groups include polyaniline, polythiophene, polypyrrole, polyphenylene, polyarylene, poly(bisthiophene phenylene), a conjugated ladder polymer, polyiptycene, polytriphenylene, poly(arylene vinylene), poly(arylene ethynylene), the corresponding monomers, corresponding oligomers and organic and transition metal derivatives thereof. Typical organometallic or coordination compounds in a nanoscopic pathway include metals capable of delocalizing charge through bound ligands. A variety of such compounds are known in the art. Silicon nanowires can also be contemplated for use in a nanoscopic pathway.

In one embodiment, electronic charge can occur via charge transfer (electron "hopping") between redox-active centers. "Redox-active" refers to a metallic, organic, organometallic or metal ion species capable of accepting or donating electronic charge. The charge transfer need not necessarily occur between two species having orbital overlap, and can occur via a long range charge transfer mechanism. Charge transfer can include a transfer of negative charge (e.g. an electron) or positive charge (e.g. a hole). For example, a nanoscopic pathway can be provided from a collection of nanoparticles, i.e. particles having at least one dimension less than about 1 µm which are arranged in electronic communication with each other. The particles are capable of conducting electronic charge either via a charge transfer mechanism or even through physical contact between the particles. In yet another embodiment, the nanoscopic pathway can involve a combination of redox-active species in conjunction with a conjugated pathway. In still another embodiment the nanoscopic pathway can comprise species with metallic properties (e.g. having a conducting mechanism similar to a metallic wire), for example species that do not have localized redox centers and hopping conduction.

Figure 26:
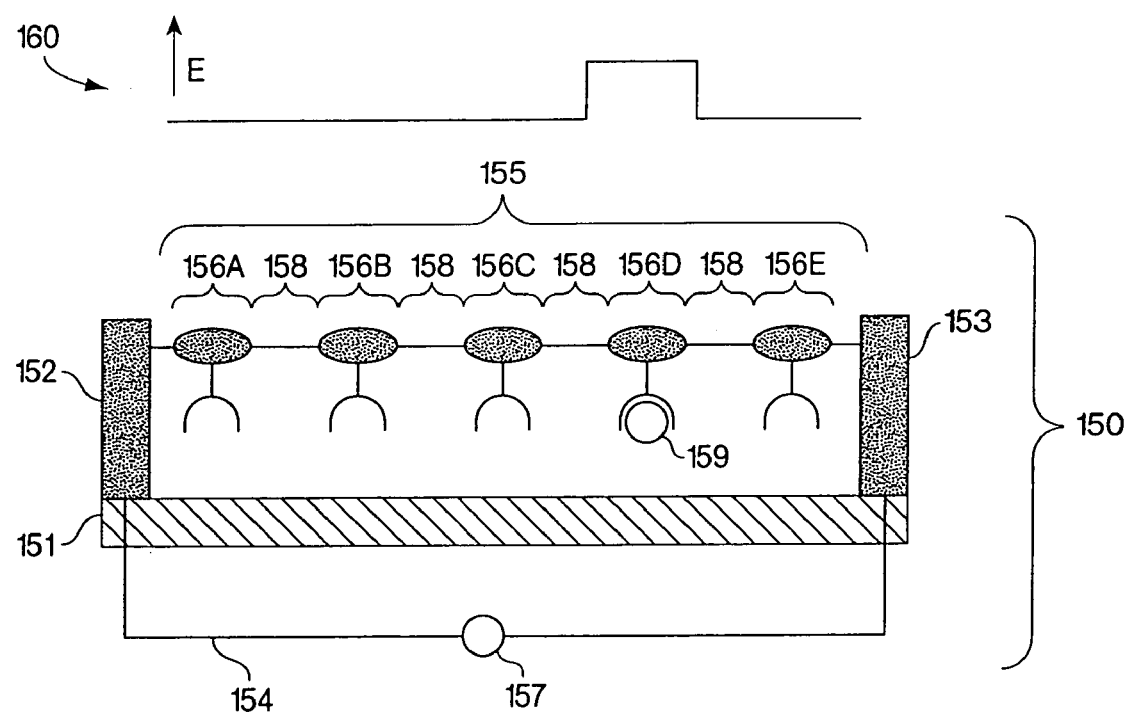
FIG. 26 shows a schematic of an idealized single molecule molecular wire extending the entire length between electrodes.

FIG. 26 shows an idealized diagram of a device having a molecular wire polymer incorporating receptor sites, in which the molecular wire comprises a nanoscopic pathway (e.g. poly(thiophene) or poly(pyrrole)) extending between two electrodes, allowing the resistance to be measured. The distance between the electrodes defines the path length of the nanoscopic pathway. In FIG. 26, device 150 comprises film 155 of a molecular wire polymer deposited on substrate 151 between electrodes 152 and 153. An electrical circuit 154 capable of determining the resistance with voltmeter (or ammeter) 157 completes device 150. Film 155 comprises receptor sites 156a14 e interspersed between conjugated chains 158. Site 156d is shown as bound to analyte 159. Energy along the nanoscopic pathway, depicted as line 160, increases as shown in the direction of the arrow adjacent the label "E". Binding of analyte 159 by receptor 156d adds resistance to the wire, as schematically indicated by energy 160.

FIG. 26 helps illustrate advantages of an insulated nanoscopic pathway. Besides the ability to measure resistivity precisely with inexpensive electronics, it can be seen that a large amount of charge can migrate along the wire while the analyte is modifying the migration, thereby allowing a single analyte binding event to affect the migration of many electrons.

Although an ideal, the device of FIG. 26 in reality presents practical synthetic problems, including the fact that such single molecules do not retain their shape (i.e. not shape persistent) upon undergoing various chemical or electronic processes. Moreover, many molecules are not easily manipulated to provide the single pathway.

A feature of the present invention provides a nanoscopic pathway comprised of a plurality of nanoscopic wires are interrupted by one or more nanoscopic switches. The switches, when turned "on" can produce a continuous pathway extending through the plurality of nanoscopic wires, as connected by the intermittent switches, as described in more detail below.

In one embodiment, the nanoscopic pathways produce a material with a bulk conductivity of at least about $10^{-9}$ S·cm$^{-1}$, more preferably at least about preferably at least about $10^{-4}$ S·cm$^{-1}$, more preferably at least about $10^{-2}$ S·cm$^{-1}$, more preferably at least about 1 S·cm$^{-1}$, more preferably at least about $10^{2}$ S·cm$^{-1}$, more preferably at least about $10^{3}$ S·cm$^{-1}$, and even more preferably at least about $10^{4}$ S·cm$^{-1}$. In one embodiment, at least a portion of the pathway has an intrinsic conductivity of the previously mentioned values. "Intrinsic conductivity" refers to a conductivity of the pathway at a resting state of an article or device incorporating the pathway, i.e. a conductivity that is present in the absence of an applied energy.

In one embodiment, a dielectric isolates the nanoscopic pathway. The dielectric can serve to isolate the pathway from contacting external substances. The dielectric can serve to electrically isolate (i.e. insulate) the pathway from other conduction pathways. In one embodiment, the dielectric has a resistivity of greater than about $10^8$ ohm·cm. In one embodiment, the nanoscopic pathway has a resistance less than $10^{-4}$ times a resistance of the dielectric. Examples of dielectric materials include a molecular species including a polymer, a ceramic, a solvent, a vacuum, a gas, a liquid crystal phase, a microphase-separated block copolymer structure and combinations thereof.

In one embodiment, the article includes a nanoscopic switch. The article can have one nanoscopic switch per nanoscopic pathway, or a plurality of switches per nanoscopic pathway. The switch is a chemical or biological species capable of altering the conductivity of the nanoscopic pathway. The nanoscopic switch can be positioned anywhere in the article, e.g. in the nanoscopic pathway, in the dielectric, along an interface of the dielectric and the nanoscopic pathway. "Altering" can involve either reducing or increasing the conductivity of the nanoscopic pathway. "Altering" can also involve completely shutting down the conduction, or turning the conduction "on" from an initially "off" state. Thus, the nanoscopic switch can mediate charge transfer (or conduction) through the pathway. In one embodiment, the switch is redox-active, allowing it to participate in charge transfer, oxidation or reduction processes.

In one embodiment, the nanoscopic switch is redox active. In one embodiment, the nanoscopic switch is capable of mediating electronic charge via a tunneling mechanism. In the situation where a material exhibits high conductivity, electronic charge can travel through a pathway while experiencing relatively low energy barriers. "Tunneling" refers to a transfer of charge through a region having a high energy barrier.

In one embodiment, the nanoscopic switch is capable of mediating charge via a chemical reaction. For example, the addition or removal of charge from a nanoscopic switch can result in the loss, formation, displacement or transfer of a chemical bond.

One embodiment of an article of the present invention is shown schematically in FIG. 1. FIG. 1 shows a cross-section of article 2 having a nanoscopic pathway 4 having a minimum dimension 5. Pathway 4 can comprise one continuous molecule or an interconnected series of molecules and/or nanoparticles. Nanoscopic pathway 4 is isolated by a dielectric 6. Dielectric 6 has a high resistance, and can be a vacuum, a gas, a liquid or a solid material. Nanoscopic switches 8 can be positioned anywhere in the article so long as it serves to alter the conductivity of nanoscopic pathway 4. The various positions of nanoscopic switches 8 shown in FIG. 1 illustrates at least some of the possible positions of the nanoscopic switch in the article, and is not meant to indicate that the article must possess nanoscopic switches in all these positions. If desired, the article can include a plurality of more than one type of nanoscopic switches in any position.

In one embodiment, the nanoscopic switch operates by a change in conformation. Typically, a significant portion of the switch comprises an organic group capable of changing conformation upon charge transfer. Examples of such compounds can be found in a paper entitled "A Three-Pole Supramolecular Switch" by P. R. Ashton et al., (*J. Am. Chem. Soc.* 1999, 121, 3951–3957), which is herein incorporated by reference in its entirety.

In the embodiment where the nanoscopic pathway comprises an organic group, the nanoscopic pathway can be provided by a molecular species having extended conjugation. Extended conjugation results from a series of chemical bonds having mobile π-electrons which can delocalize throughout a portion of the molecule or throughout the entire molecule. Where the nanoscopic pathway comprises an organometallic or coordination compound, the metal ion by virtue of s, p, d or f orbitals or mixtures thereof, provides a mechanism to delocalize charge, and this delocalization can occur with or without an organic group capable of participating in conjugation. Examples of nanoscopic pathways comprising an organic component include a conducting polymer such as those selected from the group consisting of polyaniline, polythiophene, polypyrrole, polyphenylene, polyarylene, poly(bisthiophene phenylene), a conjugated ladder polymer (i.e. a polymer which requires the breaking of at least two bonds to break the chain), polyiptycene, polytriphenylene, poly(arylene vinylene), poly(arylene ethynylene). Of course, organic, organometallic or inorganic derivatives of the conducting polymer, and combinations of these derivatives are meant to be encompassed by the present invention, as known by one of ordinary skill in the art.

Figure 2A:
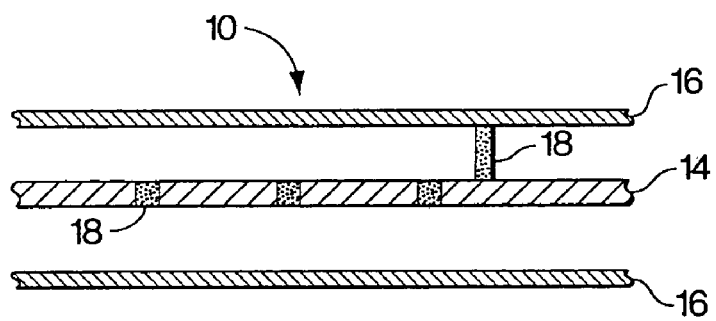
FIG. 2A shows a schematic cross-section of a multi-stranded polymer having a central conducting polymer strand isolated by multiple dielectric polymer strands, the multi-stranded polymer including nanoscopic switches.
Figure 2B:
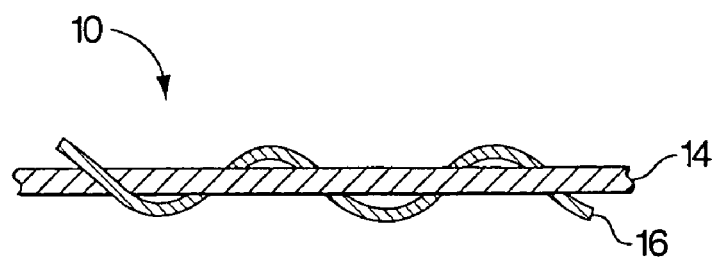
FIG. 2B shows a central conducting polymer isolated by a single dielectric polymer.

One example of an article of the present invention involves a multi-stranded polymer, as schematically shown in FIG. 2. FIG. 2A shows a cross-section of article 10 having a central conducting polymer strand 14 (schematically illustrated as a line) which functions as the nanoscopic pathway and at least one outer strand 16 (schematically illustrated as a line) which isolates the conducting polymer. For example, FIG. 2A shows at least two outer strands 16 in parallel arrangement with conducting polymer 14. FIG. 2B shows one outer strand 16 twisted in substantially helical formation around a conducting polymer 14. The arrangements of outer strands 16 in FIGS. 2A and 2B serve to isolate the conducting polymer from contacting any external entities. Outer strands 16 can be either a straight-chain polymer or branched, so long as it can isolate conducting polymer 14.

Figure 3A:
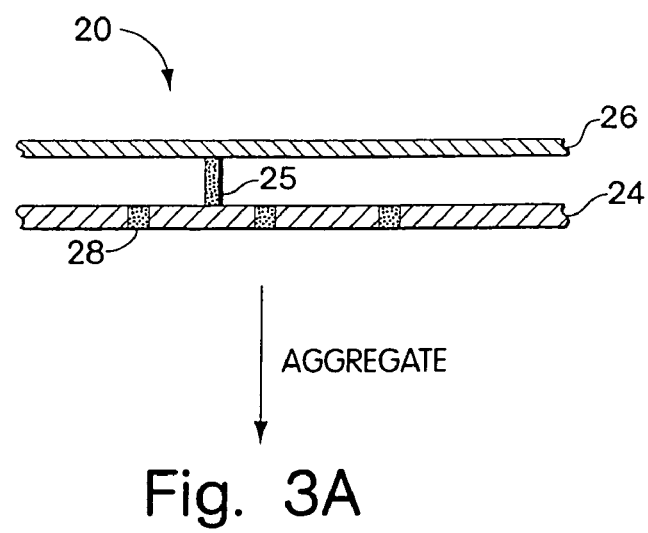
FIG. 3 schematically illustrates the aggregation of a nanoscopic pathway (a) to provide a larger nanoscopic pathway comprising an interconnected series of nanoscopic pathways (b)
Figure 3B:
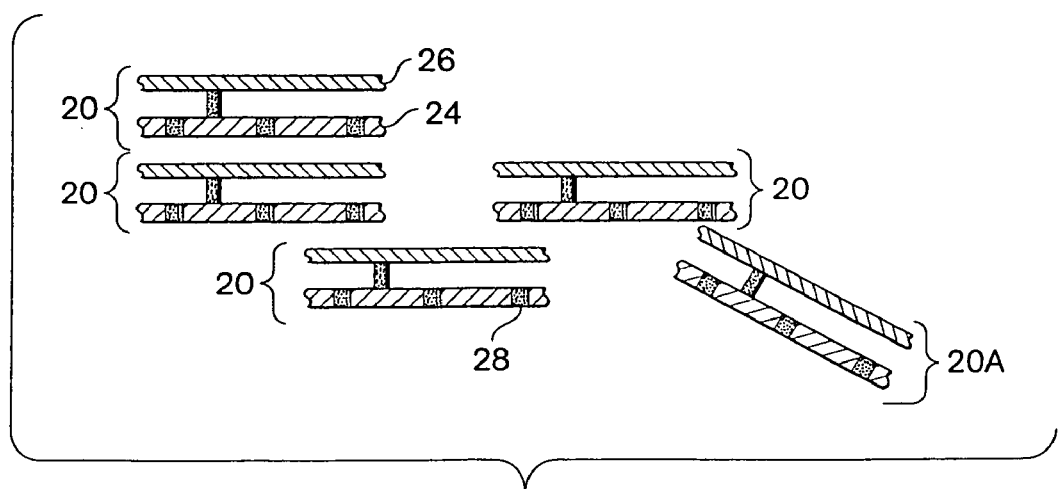

FIG. 3 schematically illustrates the aggregation of nanoscopic pathway to provide a larger nanoscopic pathway comprising an interconnected series of nanoscopic pathways. FIG. 3(*a*) illustrates a double-stranded polymer 20 having a nanoscopic pathway 24 comprising a first polymer and a dielectric comprising a second polymer 26. The first and second polymers can be attached by attachment 25 which can comprise a chemical bond, or an intermediary chemical species (e.g. an organic group, a metal ion, a metal ion complex) or biological species. Nanoscopic switches 28 can be interspersed throughout the first polymer 24. Alternatively, attachment 25 can comprise a nanoscopic switch. FIG. 3(*b*) illustrates an aggregate of double-stranded polymers 20. Preferably the aggregate is anisotropic in which the nanoscopic pathways have substantially the same orientation. The aggregate does not necessarily have to provide a linear pathway and can be curved, as demonstrated by double-stranded polymer 20. The aggregate can comprise nanoparticles or any article comprising a dielectric and nanoscopic pathway, as schematically illustrated in FIGS. 1 and 2.

In one embodiment, nanoparticles making up the nanoscopic pathway have anisotropic character, i.e. have an aspect ratio of greater than 5. In another embodiment, nanoparticles include nanotubes, metal clusters, semiconductor clusters, colloids and fibers. A minimum dimension of these particles can be that of the nanoscopic pathway, i.e. less than about 20 nm and preferably less than about 10 nm.

Nanotubes can be composed of sp² carbon atoms bonded exclusively to each other and arranged to enclose a hollow cavity. Carbon nanotubes are known to have conductivity properties. Other examples of nanotubes include metallized nanotubes, which comprise a metal coating over an organic substance. For example, a biological species (e.g. a lipid, a virus such as tobacco mosaic virus) or a chemical species (e.g. a surfactant) can provide a template for metallization, i.e. a process for depositing a metal coating on a template. Thus, a thin metal coating in the shape of a hollow vessel, such as a tubule, can be formed having dimensions of less than about 20 nm, or any dimension sufficient to provide a nanoscopic pathway having dimensions as described herein. Examples of such metallization are described in Schnur, Science Vol. 262(5140), p. 1669–1676 (1993) or Chow et al., Materials Science and Engineering A, Vol., 158(1), p. 1–6 (1992), each of which are incorporated herein by reference in its entirety.

Metal clusters and colloids comprise aggregates of metal atoms, such as gold, copper and silver. A typical minimum dimension of a cluster or colloid is about 2 nm. Colloids are typically dispersed in a second, host phase. In addition, a collection of colloids can adhere to each other to produce colloidal aggregates. Semiconductor clusters typically comprise binary inorganic compounds such as metal halides, metal oxides, metal sulfides, metal chalcogenides, and III–V semiconductors. Examples include CdO, CdS, CdSe, CdTe, ZnO, ZnS, ZnSe, PbS, PbSe, PbTe, AlP, AlAs, AlSb, GaP, GaAs, GaSb, InP, InAs, InSb and compositional mixtures thereof. Examples of fibers (nanofibrils) include graphite fibers, semiconductor nanowires and aggregated conducting polymers.

In one embodiment, the fibers forming a nanoscopic pathway can be formed by molecular processing. For example, a plurality of aligned nanoscopic pathways can be deposited on a substrate via a Langmuir-Blodgett process, in which polymers having a polar end ("head") and a non-polar end ("tail") are adsorbed onto a substrate as dictated by the substrate's affinity for polar or non-polar entities. In one embodiment, the polymers include π-electrons (e.g. in a double bond, a triple bond or an aromatic group such as a benzene ring). The π-electrons of one polymer can interact with the π-electrons in another polymer in a phenomenon known as "π-stacking" to form π-stacked aggregates. Such π-stacking can provide a nanoscopic pathway for conduction of charge. An example of such nanoscopic pathways is described in Kim et al., Macromolecules, Vol. 32, p. 1500–1507 (1999), which is herein incorporated in its entirety.

An example of electropolymerization of pyrrole to give fibers positioned between two electrodes is described in Curtis et al., Polymer Preprints, Vol. 35 p. 331 (March, 1995). In one embodiment, the fibers can be grown on a dielectric substrate.

In one embodiment, the dielectric is a polymer. Examples include polyolefins, polyesters, polyamides, polyarylenes, polyethers, polyketones, polyarylsulfides, fluoropolymers, polyacrylates, polymethacrylates, polysiloxanes, polystyrene, polyurethanes, cellulose proteins and derivatives thereof. Other polymers that can function as a dielectric are readily known to those of ordinary skill in the art. The dielectric polymer can be a gel, such as a hydrogel, examples of which are compositions containing poly(acrylic acid), poly(vinyl alcohol), and poly(ethylene oxide).

The dielectric can be a ceramic. Ceramics typically comprise metal oxides, metal nitrides, mixed metal oxides or mixed metal nitrides. In one embodiment, the ceramic is a silicate, or includes silicate groups e.g. $SiO_2$. In another embodiment, the silicate is a porous silicate such as MCM41 as described by Beck et. al. in the Journal of the American Chemical Society 114, 10834–10843 (1992). In one embodiment, the dielectric can be a solvent such as water, or an organic solvent. The solvent can be a combination of two or more solvents. In one embodiment, the dielectric is a gas, and preferably an inert gas such as helium, neon, argon, nitrogen, etc. In one embodiment, the dielectric is a liquid crystal phase. The liquid crystal phase can be a lyotopic liquid crystal (e.g. sodium dodecylsulfate, a phospholipid membrane), which requires the addition of solvent to provide anisotropic orientation of the liquid crystals. The liquid crystal phase can be thermotropic, as displayed by, for example, 5CB (pentyl substituted cyanobiphenyl). The liquid crystalline phases can further be used align the nanoscopic pathways to create optimal isolation and positioning of the switching elements.

In one embodiment, the nanoscopic switch and the nanoscopic pathway are capable of being redox-matched. "Redox-matched" refers to a situation where a difference in redox potentials between the nanoscopic pathway and the nanoscopic switch is minimized. In one embodiment, the nanoscopic switch and nanoscopic pathway are each redox-active. A "redox potential" refers to an electrochemical potential required to effect charge transfer either to and from the redox-active components. When at least one component is conducting and exhibits a maximum conductivity at a particular redox-potential or redox-potential range, redox-matching allows an optimal mixing of electronic states of the conductor with electronic states of its redox-matched partner, thereby enhancing electronic communication. The enhanced electronic communication can increase conductivity. In one embodiment, redox-matching can be achieved by altering a chemical property of either the nanoscopic switch or the nanoscopic pathway. For example, the nanoscopic switch and the pathway may undergo redox-chemistry at different electrochemical potential ranges. In an examples where the nanoscopic switch comprises a coordination compound, altering the electron-donating properties of the ligand can shift the electrochemical potential range to match that of the nanoscopic pathway. In another example, the nanoscopic pathway can be derivatized with groups having electron-poor or electron-rich properties, such that the pathway has an electrochemical potential range matching that of the nanoscopic switches. Redox-matching and examples of redox-matching is discussed further in co-pending U.S. application Ser. No. 09/201,743, to Swager et al. entitled "Conducting Polymer Transition Metal Hybrid Materials and Sensors," filed Dec. 1, 1998, which is incorporated herein by reference.

In one embodiment, the a nanoscopic pathway is a conductor within a defined electrochemical potential range. This type of pathway requires an input of electrochemical energy to afford conduction. In one embodiment, this pathway is non-conducting outside of this defined electrochemical range. In one embodiment, the nanoscopic pathway comprises a first nanoscopic pathway and is a conductor within a first electrochemical potential range. The first nanoscopic pathway can be isolated by a second nanoscopic pathway. The first nanoscopic pathway can have a resistance of less than $10^{-4}$ times a resistance of the second nanoscopic pathway, i.e., the second nanoscopic pathway is a dielectric.

In one embodiment, the second nanoscopic pathway is an insulator within a particular electrochemical potential range and is capable of being a conducting at a second electrochemical potential range. In one embodiment, the second electrochemical potential range is greater than the first electrochemical potential range.

In one embodiment, either the nanoscopic switch, the nanoscopic pathway or the dielectric comprises a biological species. In one embodiment, DNA can act as a nanoscopic pathway. The capability of DNA to provide a pathway for conduction (either by hole transfer, or long range charge transfer) has been described in Holmlin et al., J. Am. Chem. Soc., Vol. 120, p. 9724–9725 (1998). In another embodiment, DNA can act as a nanoscopic switch to mediate charge transfer. DNA can be incorporated into a film as described in Okahata et al., J. Am. Chem. Soc., Vol. 120, p. 6165–6166 (1998). Redox matched switching elements can bind to or be activated by DNA.

One advantageous feature of nanoscopic switches is evident where the article is to be used as a sensor for detecting an analyte. In one embodiment, the nanoscopic switch can act as a site capable of detecting an analyte (e.g. a detection site), where the detecting step can involve a binding event between the analyte and the nanoscopic switch. For example, if the nanoscopic switch is part of the nanoscopic pathway, a binding even between the nanoscopic switch and the analyte can affect electronic properties of the nanoscopic switch and thus affect mediation properties. The present invention provides increased sensitivity in analyte detection due to the insulation of the nanoscopic pathway. Because the occurrence of a single binding can theoretically affect an entire nanoscopic pathway, (see FIG. 1), the occurrence of multiple binding events on multiple detection sites can have a great effect on the conductivity of the entire article, sometimes in a non-linear manner, thereby providing enhanced sensitivity. This contrasts with prior art sensors, in which detection sites are located within a near infinite number of conduction pathways. A binding event will affect the conductivity very minimally.

One embodiment provides a sensor comprising an article having a nanoscopic pathway. A theoretical example is provided by referring back to FIG. 1. For example, if nanoscopic switch 8 is in an "off" position (i.e., does not permit the transfer of electronic charge) conduction cannot occur throughout pathway 4 in the direction of arrow 5. If the nanoscopic switch is capable of detecting an analyte, a binding event between the nanoscopic switch and the analyte will alter the electronic properties of the nanoscopic switch and allow at least some conduction to occur through pathway 4. Of course, this is one extreme example, and the nanoscopic switch can alter conductivity simply by increasing or reducing conduction, for example, such as optimizing or decreasing an amount of orbital overlap between the nanoscopic switch and the pathway. In one embodiment, the sensor includes a plurality of nanoscopic pathways arranged in parallel to each other. Such an arrangement can provide the sensor with an increased signal.

Another aspect of the present invention provides a composition comprising a nanoscopic pathway and a polymer isolating the nanoscopic pathway. In one embodiment, the nanoscopic pathway is a conducting polymer, such as any conducting polymer disclosed herein. The polymer isolating the nanoscopic pathway can be a dielectric polymer, such as any dielectric polymer disclosed herein. In one embodiment, the composition comprises a multi-stranded polymer. FIG. 2 schematically illustrates a multi-stranded polymer. In FIG. 2, the nanoscopic pathway is represented as a central conducting polymer. One or more dielectric polymers In one embodiment, the dielectric polymer is attached to the conducting polymer. For certain examples, this attachment provides a rigidity that maintains the integrity of the nanoscopic pathway, perhaps by preventing chain entanglement. The attachment can also be a result of the polymerization of a monomer having two polymerization sites (described below). In one embodiment, the dielectric polymer is attached to the conducting polymer via a chemical bond.

One method for attaching a dielectric polymer to the conducting polymer is by providing a structure comprising the formula:

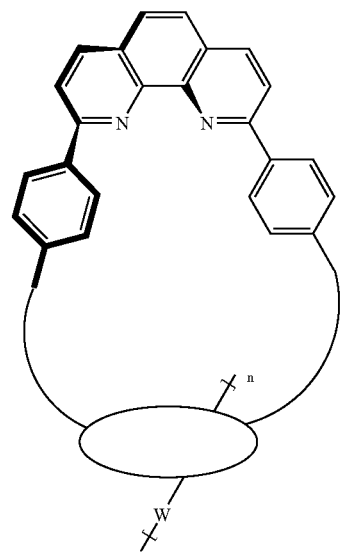

wherein ( ) comprises two continuous chains of atoms and

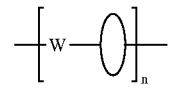

comprises a species which can be a dielectric or a conductive nanoscopic pathway, and n is an integer greater than 0. Examples of such polymers can be found in FIG. 10. Those of ordinary skill in the art can monomer of

Figure 10:
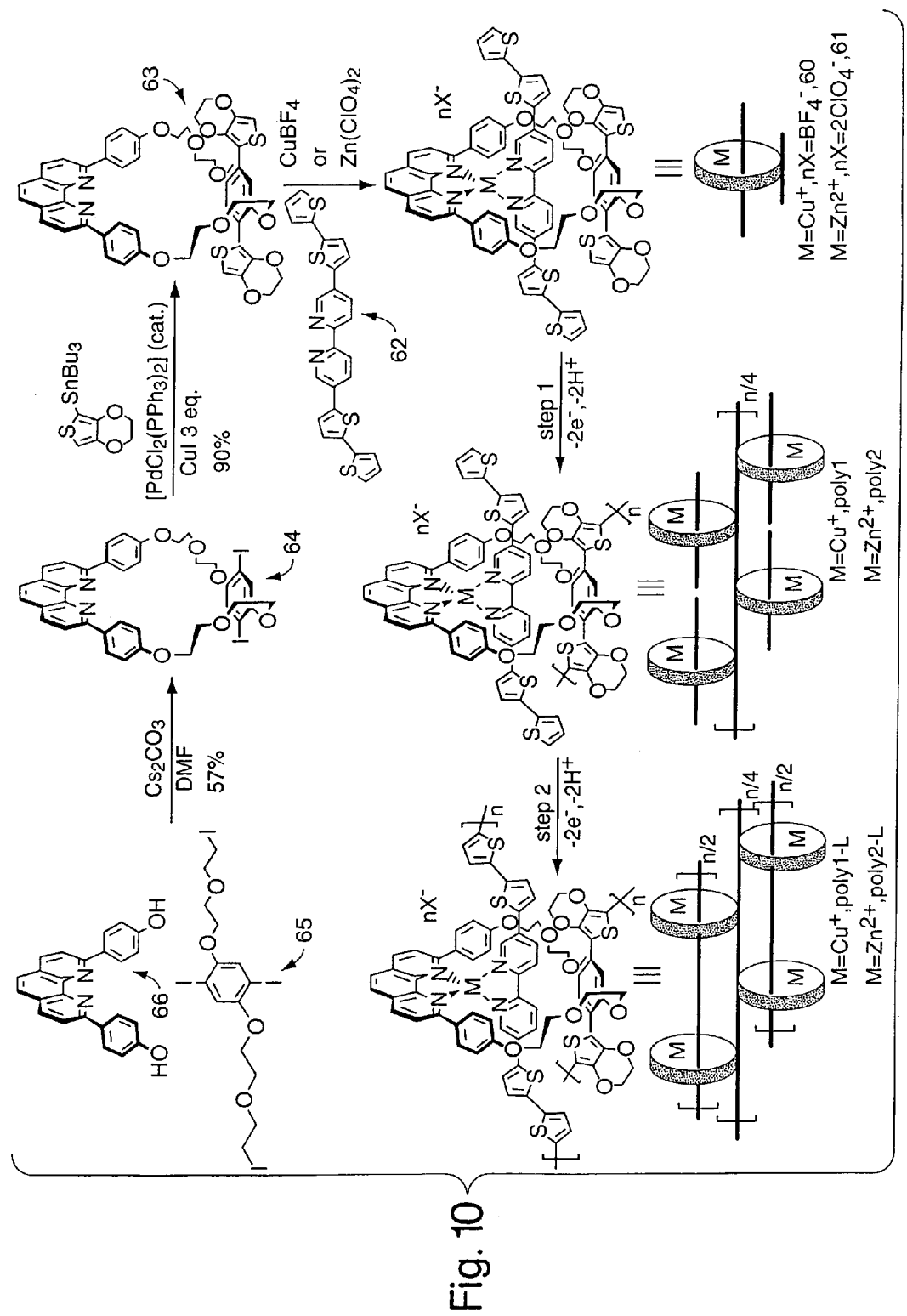
FIG. 10 shows a scheme for mixing 62, 63, and $Cu^{1+}$ or $Zn^{2+}$ ions to produce metallorotaxane monomers 60 and 61, and subsequent polymerization.

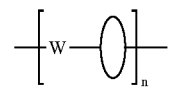

to allow polymerization from one or preferably two sites (or more) sites, as exemplified by the scheme of FIG. 10.

Figure 5A:
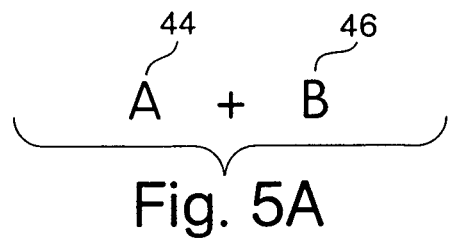
FIG. 5 schematically shows blocks A and B (a), a resulting block copolymer (b) and a resulting microphase separation of a film of a block copolymer (c) comprising conducting blocks A isolated by dielectric blocks B.
Figure 5B:
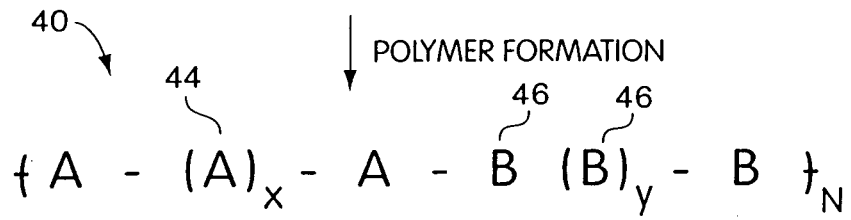
Figure 5C:
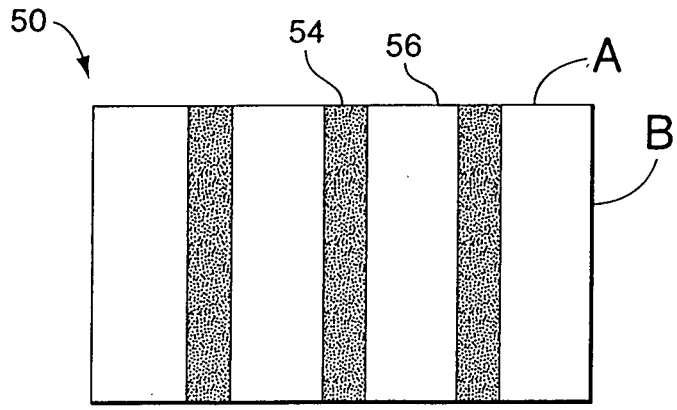
Figure 5C:
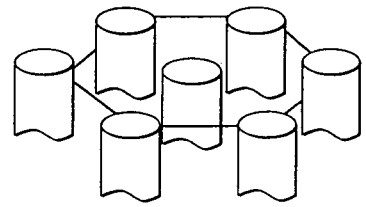
Figure 6A:
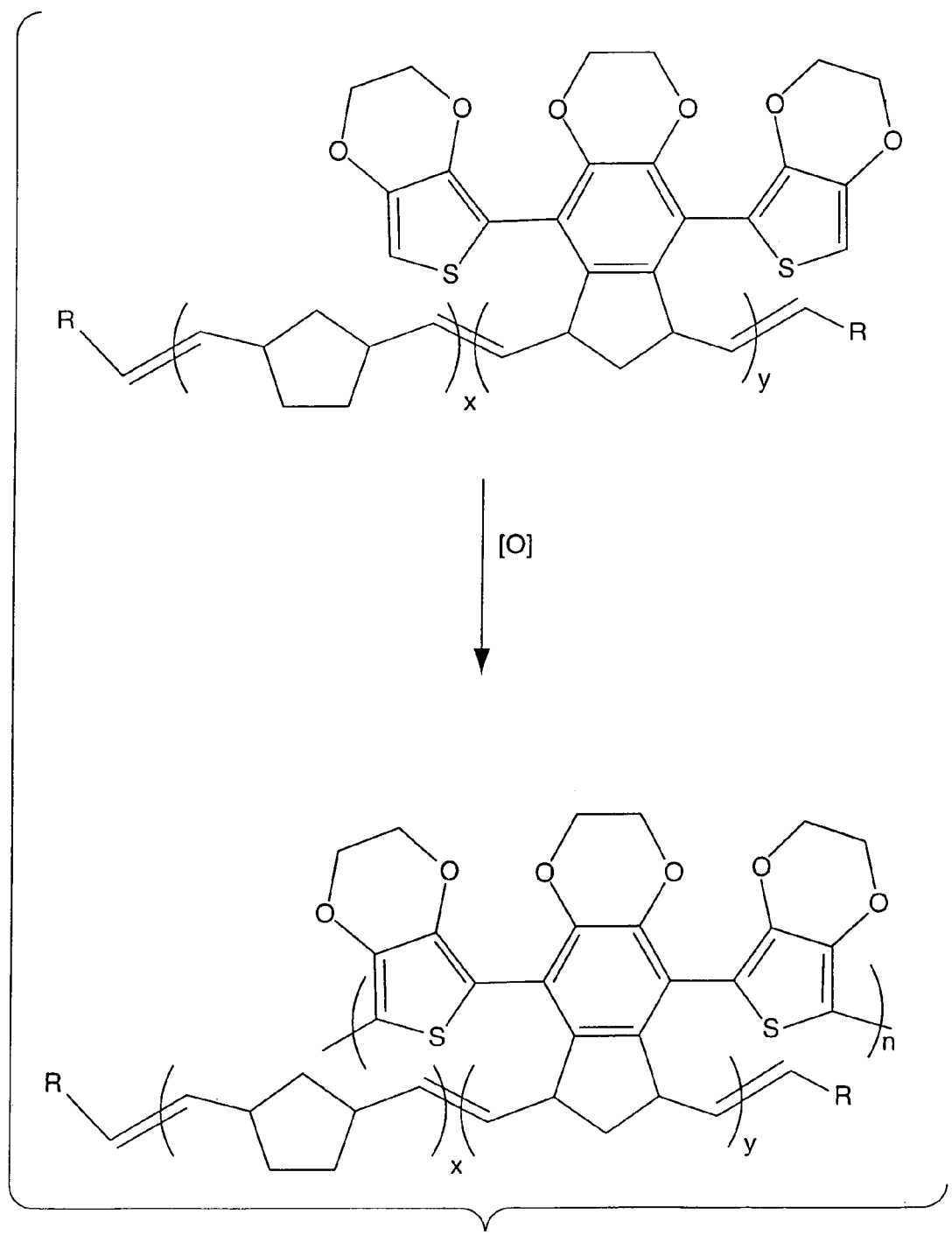
FIG. 6A shows two types of monomers that can be used in a block copolymer of the present invention.
Figure 6B:
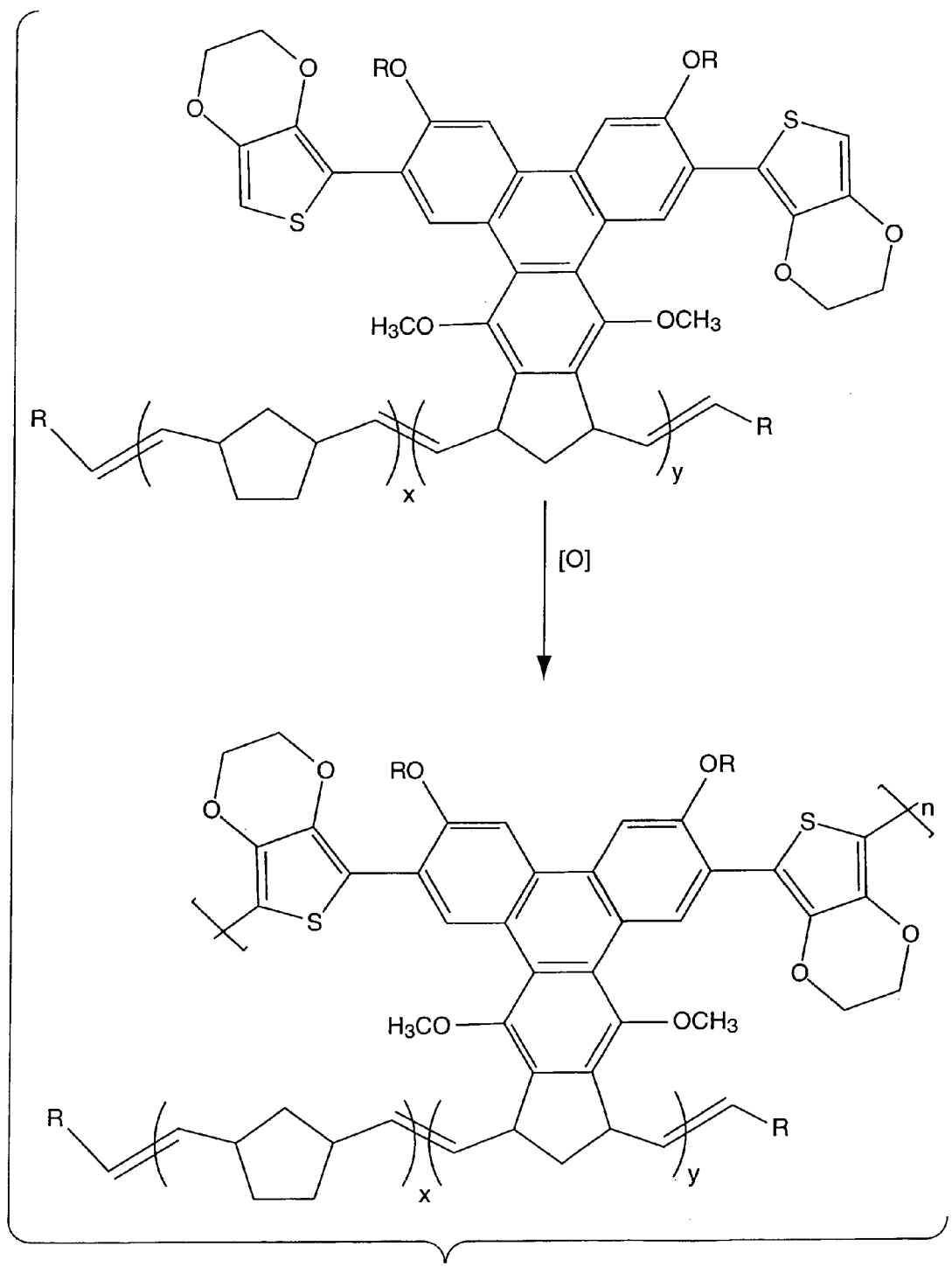
FIG. 6B shows two types of monomers that can be used in a block copolymer of the present invention.
Figure 7:
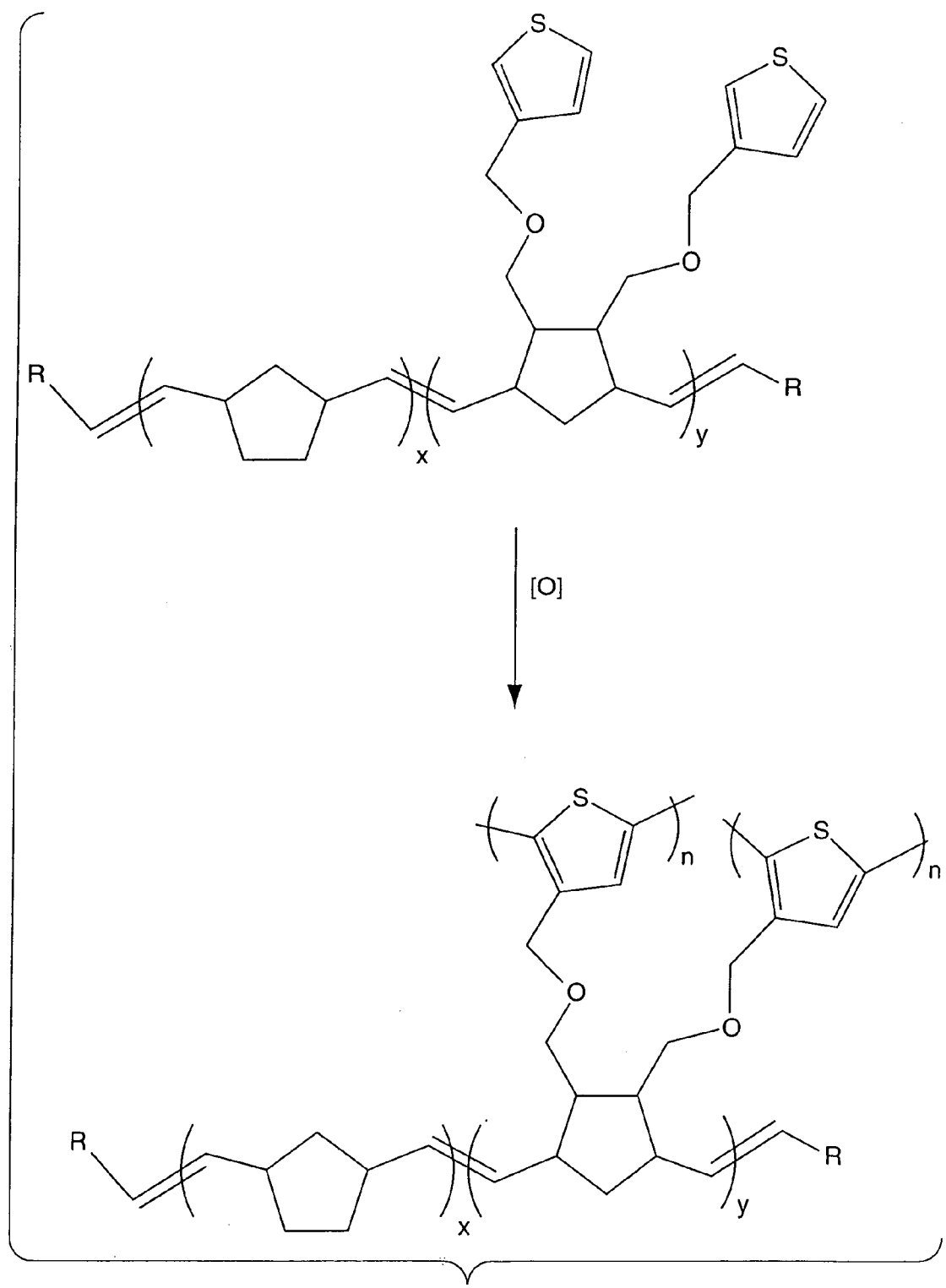
FIG. 7 shows two types of monomers that can be used in a block copolymer of the present invention.
Figure 8:
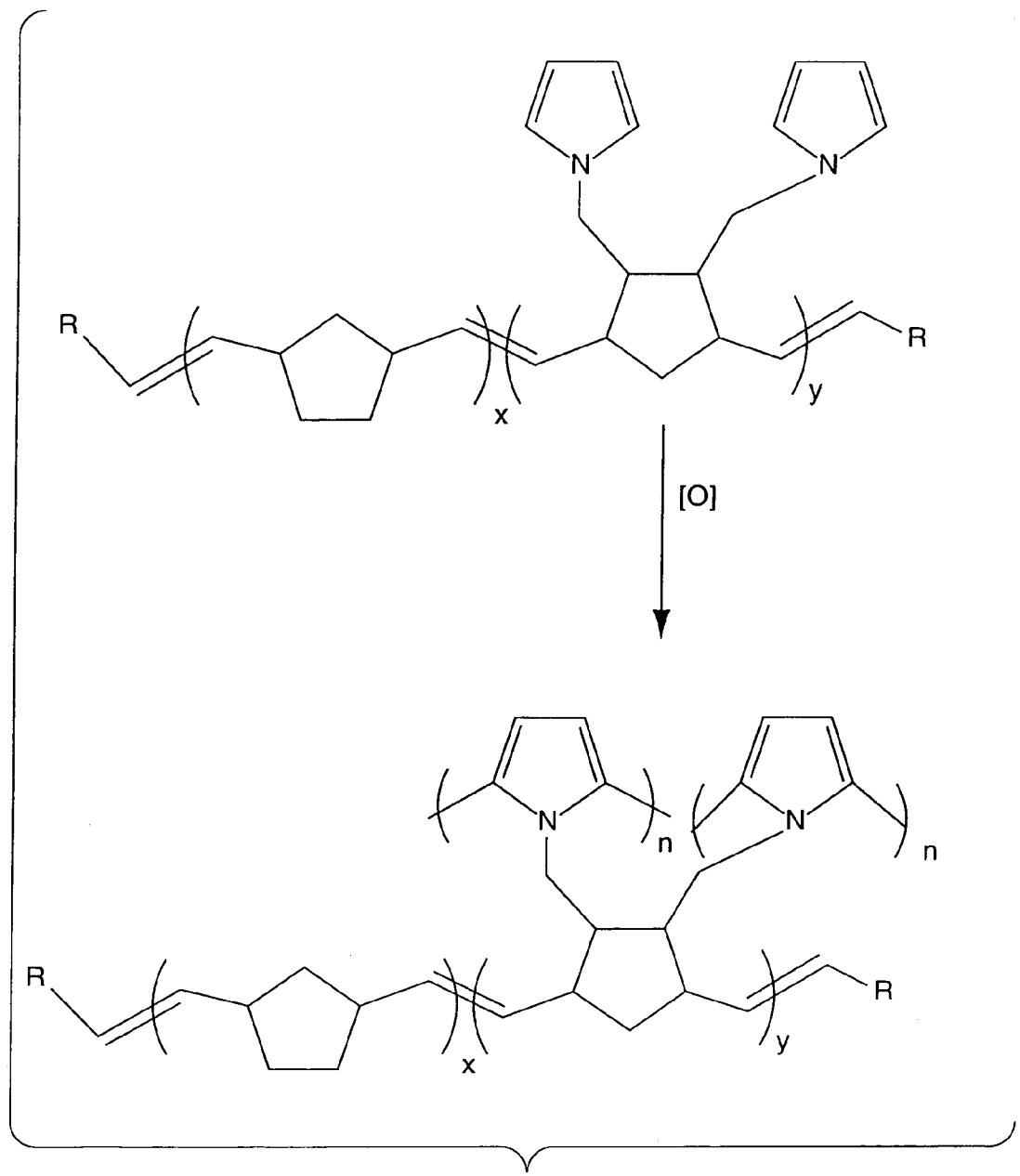
FIG. 8 shows two types of monomers that can be used in a block copolymer of the present invention.

Another aspect of the present invention provides a block co-polymer that can define a nanoscopic pathway. In one embodiment, the block copolymer comprises blocks of a conducting material and blocks of a dielectric material. In many instances, block copolymers prefer to exist in a solid state phase in which "like" blocks separate into phases with "like" blocks. This organization can create a microphase-separated block copolymer structure, as schematically illustrated in FIG. 5. FIG. 5(a) schematically illustrates a conducting block monomer 44 and a dielectric block monomer 46. FIG. 5(b) schematically illustrates a single polymer chain 40 comprising a series of monomer blocks 44 alternating with a series of dielectric blocks 46. FIG. 5(c) schematically illustrates the formation of a microphase-separated structure 50, where regions 54 comprise an alignment of conducting blocks whereas regions 56 comprise an alignment of dielectric blocks. This structure provides an arrangement in which the conducting blocks allow conduction throughout an entire block (by conjugation, redox conductivity, or a combination thereof). In addition, the conducting blocks are insulated by dielectric blocks. Depending upon the ratio of the compositions of each block the conducting block can be organized into layered structures or a hexagonal array of columns. The block copolymer can be a diblock, a triblock, or any multiblock copolymer as known in the art.

In one embodiment, dielectric blocks are selected from the group consisting of polyolefins, polyesters, polyamides, polyarylenes, polyethers, polyketones, polyarylsulfides, fluoropolymers, polyacrylates, polymethacrylates, polysiloxanes, polystyrene, polyurethanes, proteins and derivatives thereof. In one embodiment, conducting blocks comprise conjugated organic groups, nanoparticles or a combination thereof. For example, the conducting blocks can be a conducting organic group, such as an organic group selected from the group consisting of polyaniline, polythiophene, polypyrrole, polyphenylene, polyarylene, poly (bisthiophene phenylene), a conjugated ladder polymer, polyiptycene, polytriphenylene, poly(arylene vinylene), poly(arylene ethynylene), and organic and transition metal derivatives thereof. The conducting block can comprise a gel.

Examples of block copolymers are presented in FIGS. 6–9.

Figure 9:
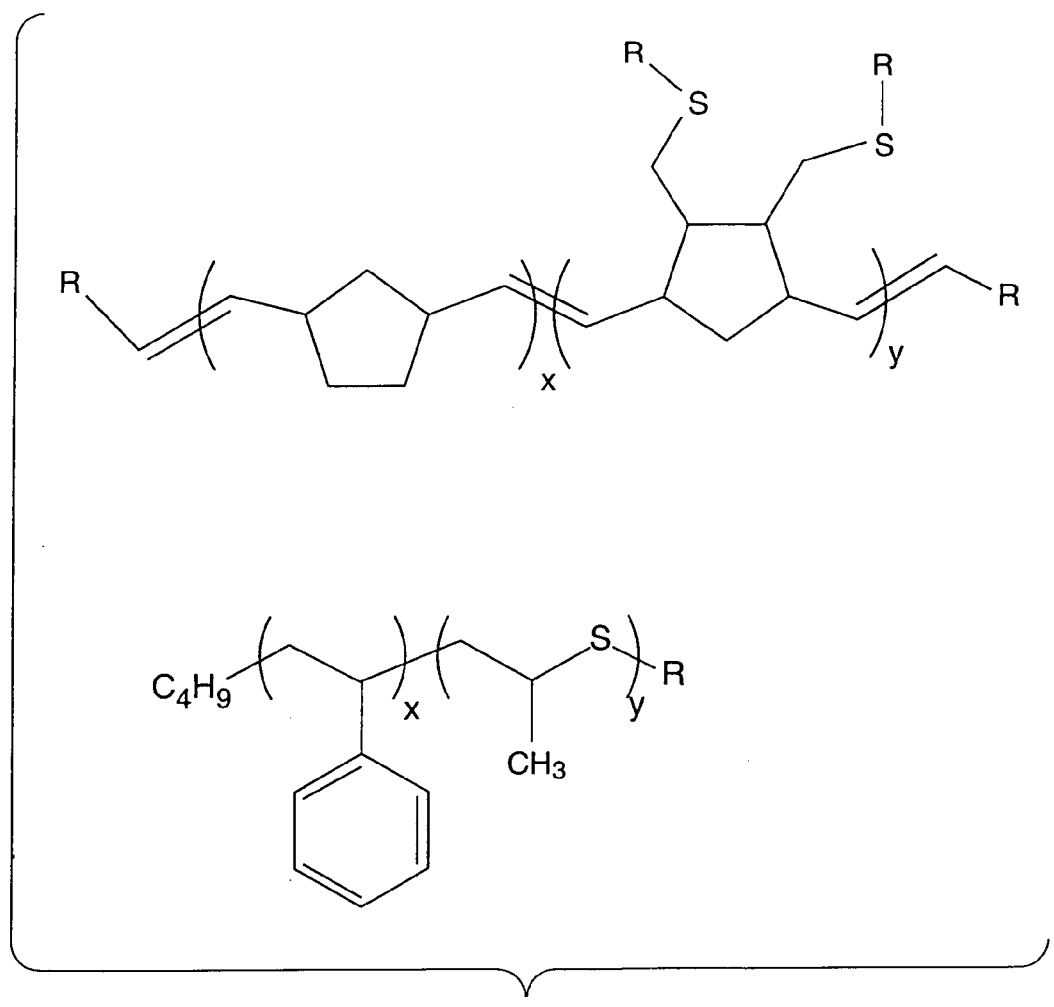
FIG. 9 shows examples of block polymers that can bind semiconductor nanoparticles.

FIG. 9 are examples of monomers in a polymer that can bind to metal ions or nanoparticles such as semiconductor nanoparticles.

In one embodiment, the activating step can involve redox-matching the nanoscopic pathway with the nanoscopic switch. In another embodiment, the activating comprises adjusting an electrochemical potential applied to the nanoscopic pathway. In these embodiments, the nanoscopic switch is a part of the nanoscopic pathway.

Another aspect of the invention provides an article comprising a percolation network. A "percolation network" is a lattice comprising a random mixture of conducting and non-conducting links. A "percolation threshold" is a minimum concentration of conducting links necessary to generate a conduction pathway between two sites situated within the percolation network. In one embodiment, the conducting links comprise sub-nanoscopic pathways in themselves, albeit of a smaller scale. Positioned amongst these sub-nanoscopic pathways are a plurality of nanoscopic switches which, when unactivated, are the non-conducting links. The nanoscopic switches are capable of being activated such that they comprise a conducting link.

Figure 4A:
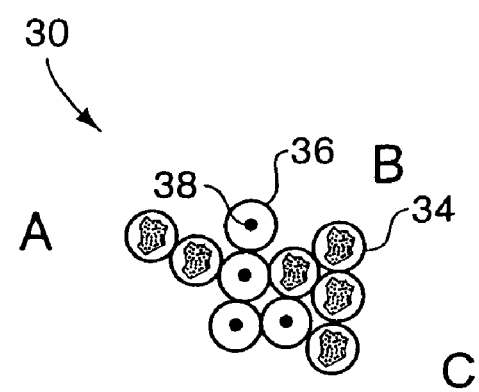
FIG. 4A shows a schematic cross-section of a percolation network comprising conducting links and dielectric links having nanoscopic switches.
Figure 4B:
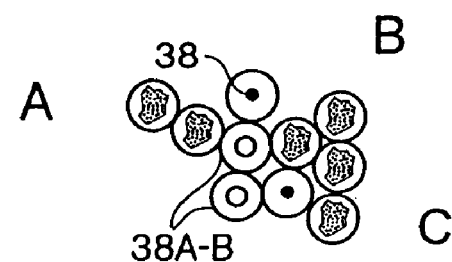
FIG. 4B shows the percolation network of FIG. 4a at or above the percolation threshold.

One example of this embodiment is schematically illustrated in FIG. 4. FIG. 4A schematically shows an article comprising nanoscopic particles 34 (sub-nanoscopic pathways) and dielectric particles 36. Dielectric particles 36 can include nanoscopic switches 38. When none of nanoscopic switches 38 are activated, there exists no nanoscopic pathway between any of points A, B or C. When some of the nanoscopic switches are activated such as to allow mediation of conduction (e.g. components 38a–b), this concentration is sufficient to create a nanoscopic pathway between points A and C. Thus, the percolation threshold is achieved.

In one embodiment, the nanoscopic switches can be activated by applying a defined electrochemical potential. In this embodiment, the nanoscopic switches are non-conducting within a first electrochemical potential range and conducting within an electrochemical potential range, the defined potential lying within that range.

In one embodiment, the nanoscopic switch is a metal ion. In another embodiment, the activating step involves changing a ligand environment around the metal ion. For example, the metal ion can be conducting when subjected to a first ligand environment and non-conducting when subjected to a second ligand environment.

In the embodiment where there is only one nanoscopic pathway, such as that illustrated in FIG. 1, the conductivity is amplified via an on/off mechanism. In the embodiment where there are a number of nanoscopic pathways all contributing to the conductivity of the article, activation above the percolation threshold may involve establishing a some or all of the nanoscopic pathways, and thus amplifying involves an increase in the conductivity due to a greater number of nanoscopic pathways established.

Another aspect of the present invention provides a method for altering conductivity. The method involves providing an article comprising a nanoscopic pathway having a conductivity. The method further involves insulating the nanoscopic pathway and activating a nanoscopic switch positioned in the article. The activating step can involve: (1) Establishing electrical communication between one nanoscopic pathway and another nanoscopic pathway, where the nanoscopic switch is positioned between two nanoscopic pathways, thereby producing a larger nanoscopic pathway; or (2) Redox-matching the nanoscopic pathway with the nanoscopic switch can result in optimal orbital overlap between the two species, providing a more optimal conduction pathway. Redox-matching can be provided by any method described herein.

In one embodiment, the activating step involves applying an electrochemical potential to the nanoscopic pathway. This may be necessary where the nanoscopic pathway is conducting within a particular electrochemical potential range.

Another aspect of the present invention provides a method for detecting the presence of an analyte. The method involves providing an article comprising a nanoscopic pathway having a conductivity and insulating the nanoscopic pathway. The method also involves activating detection sites positioned in the article.

In one embodiment, the activating comprises a binding event between the analyte and the detection site. In one embodiment, the binding event causes the detection site and the pathway to be redox-matched, thus increasing or reducing the extent of conduction in a detectable manner. In one embodiment, the detection site comprises a metal ion complex (e.g. a coordination compound, an organometallic compound). In one embodiment, the analyte is a potential ligand which can bind to the metal ion of the complex. In another embodiment, the metal ion complex has a ligand which can bind other analyte ligands, either covalently, ionically, sterically (e.g. a cage or pseudo-cage). In one embodiment, the analyte is a metal ion and the metal ion complex has a ligand (e.g. a crown either, a macrocycle, etc.) which can bind the analyte metal ion.

In one embodiment, DNA comprises a detection site. The analyte can be any biological species capable of binding to DNA, such as a complementary strand of DNA or RNA.

Another aspect of the present invention provides a method for amplifying conductivity. The method involves providing an article comprising a nanoscopic pathway and positioning a plurality of nanoscopic switches in the article. A number of the plurality of nanoscopic switches, the number being less than the total value of nanoscopic switches, is activated where the number is greater than a percolation threshold.

Another aspect of the invention a method for reducing conductivity. The method involves providing an article comprising a nanoscopic pathway and positioning a plurality of nanoscopic switches in the article. In this aspect, a number of the plurality of nanoscopic switches is deactivated such that the number is less than a percolation threshold.

One aspect of the present invention provides a method for synthesizing a conducting polymer. A monomer having first and second polymerization sites is provided. The method involves polymerizing the monomer at the first site to produce the first polymer. The monomer is then polymerized at the second site to produce the second polymer such that the second polymer insulates the first polymer. In one embodiment, the first polymer is a conducting polymer of the types mentioned herein. The polymerization steps can occur either sequentially or simultaneously, so long as the second polymer is arranged to insulate the first polymer.

In one embodiment, the polymerization occurs by electropolymerization, i.e. by the application of a defined electrochemical potential. At this potential, the monomer undergoes radical formation via reduction or oxidation (i.e. an electrochemical redox reaction), and recombination of these radicals produces oligomers. The oligomers are subsequently reduced or oxidized, and combined with other radical oligomers or monomers. In this embodiment, sequential polymerization can be effected by subjecting the monomer to a first electrochemical potential at which the first site undergoes an electrochemical redox reaction. This potential, however, is not sufficiently large enough to initiate redox reactions at the second site. Upon completion of the first polymerization, the monomer is subjected to a greater electrochemical potential sufficient to cause redox reactions at the second site (see FIG. 10, for example). Other examples of this polymerization can be found in Marsella et al, J. Am. Chem. Soc., Vol. 116, p. 9346–8 (1994) and Marsella et al., J. Am. Chem. Soc., Vol. 117, p. 9832–9841 (1995), each of which is incorporated herein by reference in its entirety.

The function and advantage of these and other embodiments of the present invention will be more fully understood from the examples below. The following examples are intended to illustrate the benefits of the present invention, but do not exemplify the full scope of the invention.

EXAMPLE 1

Reactions were carried out in oven-dried glassware using standard Schlenk techniques under an inert atmosphere of dry argon. $^1$H NMR spectra were recorded with a Bruker AC-250 or Varian Inova-500 MHz spectrometers. Electrochemical measurements were performed in an air-free drybox using a computer controlled Autolab Model PGSTAT 20 potentiostat from Eco Chemie. All electrochemical measurements shown were performed on interdigitated array microelectrodes purchased from AAI-ABTECH with an interelectrode spacing of 5 μm, with a platinum coil counter electrode and an isolated Ag wire quasi-reference electrode. All the potentials are reported versus the Fc/Fc$^+$ redox couple. Compound 6 was synthesized from the tosylate (Q. Zhou, T. M. Swager, J. Am. Chem. Soc., 1995, 117, 12593) by simple exchange with iodide ion and 7 was produced synthesized as reported previously (C.O. Dietrich-Buchecker, J.-P. Sauvage, Tetrahedron Lett. 1983, 24, 5091). Macrocycle 64 was produced by straight forward adaptation of conditions used for the synthesis of related macrocycles (C.O. Dietrich-Buchecker, J.-P. Sauvage, Tetrahedron Lett. 1983, 24, 5091).

Additional experimental details can be found in a paper entitled "Three-Strand Conducting Ladder Polymers: Two-Step Electropolymerization of Metallorotaxanes", by J. Buey and T. M. Swager (Angew. Chem. Int. Ed. 2000, 39, No. 3, 608–612), which is herein incorporated by reference in its entirety.

EXAMPLE 2

Synthesis of 63 (see FIG. 10): Compound 64 (100 mg, 0.115 mmol), 2-(tributylstannyl)-3,4 ethylenedioxythiophene (124 mg, 0.288 mmol), CuI (66 mg, 0.346 mmol) and t-PdCl$_2$(PPh$_3$)$_2$ (4 mg) were dissolved in 10 mL dry DMF and the mixture was stirred overnight at 80° C. The DMF was then evaporated and the residue was extracted with CH$_2$Cl$_2$/NH$_4$OH. The organic phase was dried and the crude product was precipitated with hexane. Column chromatography (SiO$_2$, CH$_2$Cl$_2$/MeOH 99:1) afforded the desired compound as a yellow solid in 90% yield.

EXAMPLE 3

Synthesis of Monomer 60 (see FIG. 10): A solution of [Cu(MeCN)$_4$] BF$_4$ (5.3 mg, 0.017 mmol) in dry deoxygenated MeCN (2 mL) was transferred via cannula to the solution of 62 (8 mg, 0.017 mmol) and 63 (15 mg, 0.017 mmol) in 10 mL dry deoxygenated dichloromethane. After 3 h stirring the solvents were evaporated and the residue was dissolved in acetone and filtered. Evaporation to small volume and addition of diethylether afforded compound 60 as a green powder in 60% isolated yield.

EXAMPLE 4

Synthesis of Monomer 61 (see FIG. 10): The synthesis was performed as described for 60, using Zn(ClO$_4$)$_2$ 6H$_2$O (4.2 mg, 0.01 mmol), 62 (5.4 mg, 0.01 mmol) and 63 (10 mg, 0.01 mmol). Isolated yield 90% (orange solid).

EXAMPLE 5

Synthesis of poly1, poly2, (see FIG. 10) and poly4 : This example illustrates one method for making an article of the present invention by sequentially polymerizing a monomer having two polymerization sites. Synthesis of the 4,4'-bis (dithienyl)-2,2'-bipyridine threading ligand 62 is prepared as described previously (see S. S. Zhu, T. M. Swager, Adv. Mater. 1996, 8, 497) as well as its use for the formation of conducting polymetallorotaxanes (see S. S. Zhu, T. M. Swager, J. Am. Chem. Soc. 1996, 118, 8713; S. S. Zhu, T. M. Swager, J. Am. Chem. Soc. 1997, 119, 12568; P. L. Vidal, M. Billon, B. Divisia-Blohorn, G. Bidan, J. M. Kern, J.-P. Sauvage, Chem. Commun. 1998, 629). The electron poor nature of ligands requires a more positive oxidation potential to undergo electropolymerization than would be required from an isolated bithiophene. To complement this threading group, we designed and synthesized a new macrocycle, 63

(FIG. 10), bearing an electron rich 1,4-bis(ethylenedioxythiophene)-2,5-dialkoxybenzene group that is easily oxidatively polymerized at lower potentials. In accord with methods pioneered by Sauvage and coworkers (J. C. Chambron, J.-P. Sauvage, *Chem. Eur. J.* 1998, 4, 1362; J.-P. Sauvage, *Acc. Chem. Res.* 1998, 31, 611), simple mixing of 62, 63, and $Cu^{1+}$ or $Zn^{2+}$ ions produces metallorotaxane monomers 60 and 61.

Figure 11A:
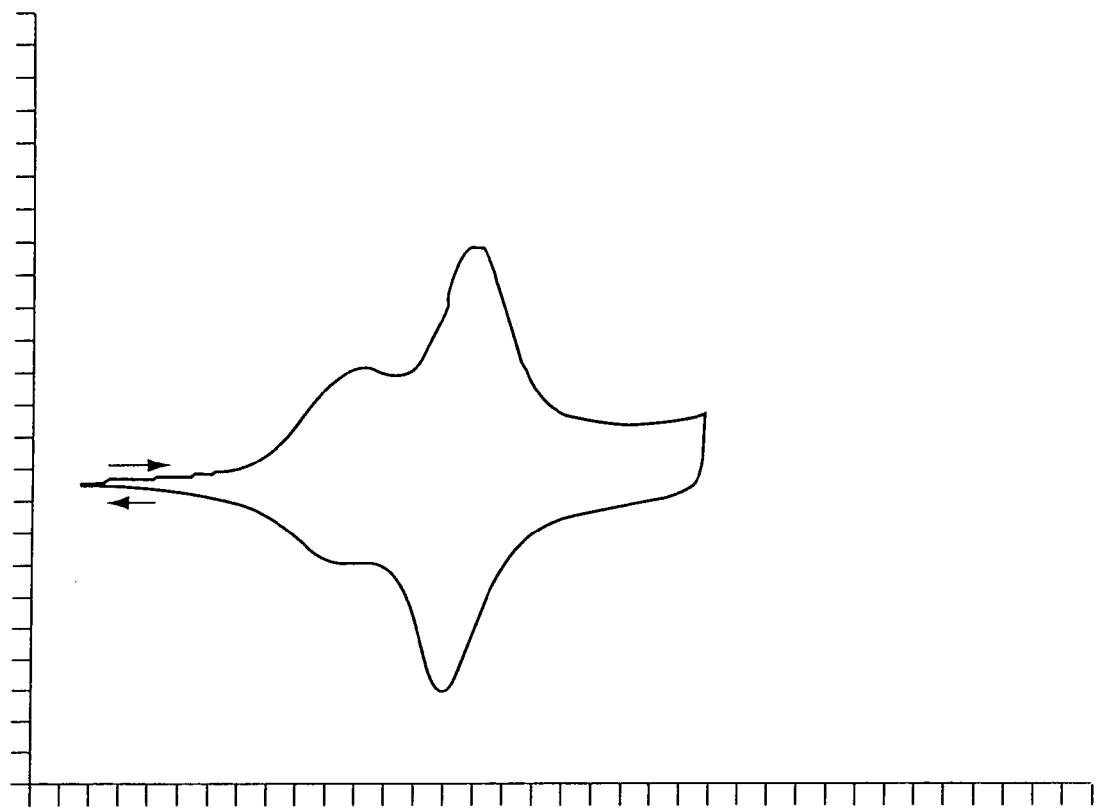
FIG. 11 shows cyclic voltammograms of 60, poly1, and poly1-L on interdigitated microelectrodes with a spacing of 5 μm between adjacent electrodes (0.1 M $(nBu_4N)PF_6$ in $CH_2Cl_2$ at a sweep rate of 100 $mVs^{-1}$). a: A film of poly1 in fresh, monomer-free electrolyte. b: The first electropolymerization to grow films of poly1 after 1, 20, 40, and 60 potential cycles. c: The first scan (solid line) and second scan (dashed line) of the same film when swept to 1.0 V vs. $Fc/Fc^+$. The first scan shows the large irreversible oxidation to form poly1-L.
Figure 11B:
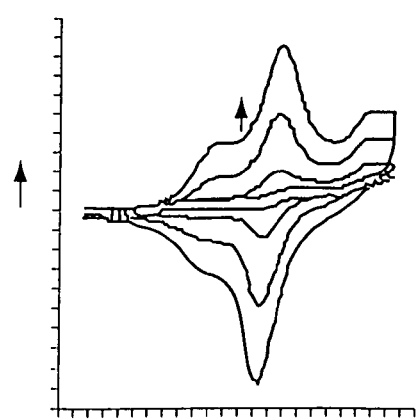
Figure 11C:
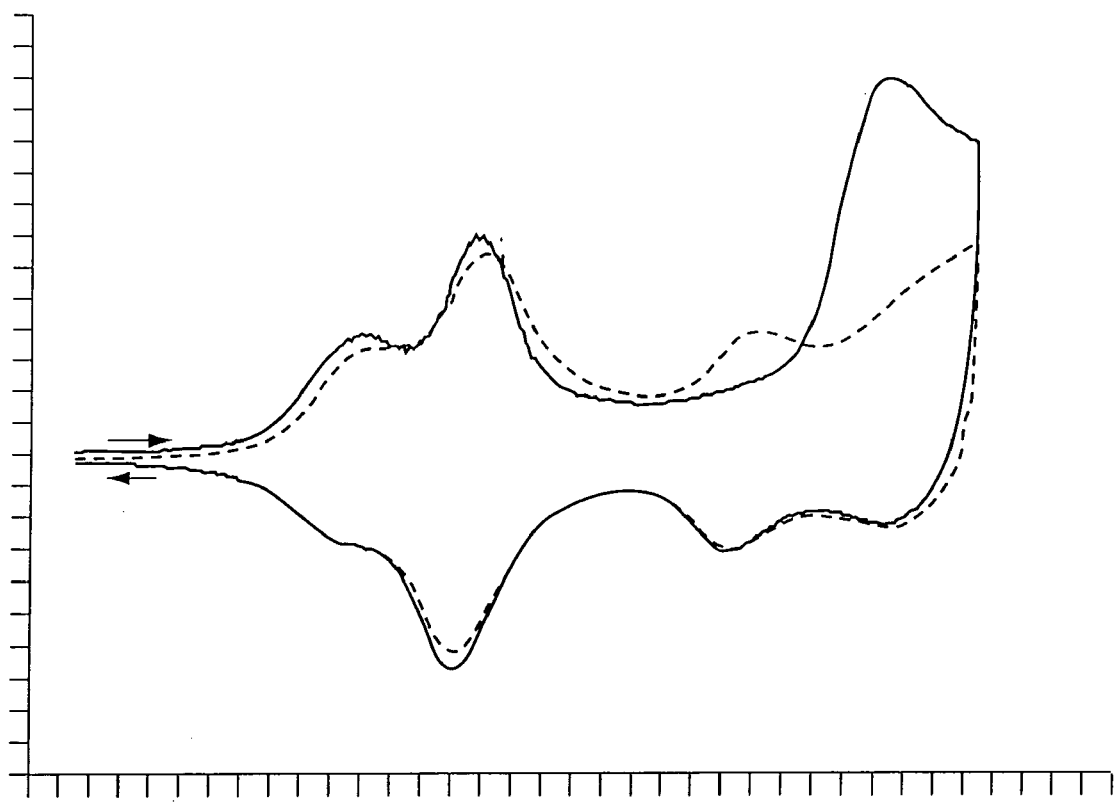

Controlled oxidation results in the electropolymerization of the macrocycle, 63, while leaving the threading group 62 untouched. Higher potentials can be subsequently applied to polymerize 62. The detailed procedure is as follows: Microelectrode arrays (G. P. Kittlesen, H. S. White, M. S. Wrighton, *J. Am. Chem. Soc.* 1984, 106, 7389; J. W. Thackeray, H. S. White, M. S. Wrighton, *J. Phys. Chem.* 1985, 89, 5133), are immersed in a solution (0.1M n-$Bu_4NPF_6$, $CH_2Cl_2$) of 60, 61, or 63 (0.3 mM) and are cycled between −0.5 and 0.55 V vs. Fc/$Fc^+$. This procedure results in the oxidative electropolymerization of the macrocycle to produce poly1, poly2, (see FIG. 10) and poly4 (polymerization of 63 without metal ion). The cyclic voltammetry data for the polymerization of 60 is shown in FIG. 11. Cyclicvoltammetric analysis of poly2 in fresh monomer-free electrolyte gave voltammograms indistinguishable from those obtained from poly4, as is consistent with polymerization. The cyclic voltammogram of poly1 (FIG. 11) is also similar but contains an added $Cu^{1+/2+}$ wave centered at 0.11 V vs. Fc/$Fc^+$. The UV-vis spectra also supports the selective polymerization of the macrocyclic ligand, and both poly1 and poly2 displayed absorption spectra similar to that of poly4 ($\lambda_{max}$=503 nm) with an additional absorption feature at about 450 nm assigned to the threading ligand, 62.

EXAMPLE 6

Synthesis of poly1-L and poly2-L (see FIG. 10): Subjecting deposited films of poly1 or poly2 to higher potentials in monomer-free electrolyte resulted in the polymerization of the 4,4'-bis(dithienyl)-2,2'-bipyridine threading ligand to form ladder polymers poly1-L and poly2-L, respectively. This process is readily apparent from FIG. 11 wherein the first sweep to 1 V vs. Fc/$Fc^+$ results in a large irreversible oxidation current. This irreversible current is expected since oxidation of the threading ligand, 62, will produce radical cations that undergo intermolecular coupling with loss of protons to form new thiophene-thiophene linkages (i.e. polymerization). The second sweep over the same expanded potential range lacks this irreversible oxidation and is identical to all subsequent sweeps.

The efficiency of the second polymerization can be deduced from an analysis of the irreversible charge relative to the reversible charge. A key parameter is the mass of the polymer immobilized on the electrodes. Once the mass of the polymer has been determined, the degree of oxidation of the polymer is also known. This analysis was afforded by a comparison of poly1, poly2, and poly4. Due to the fact that the metal ions do not directly interact with the macrocyclic polymer's electronic structure, poly2 and poly4 have nearly identical cyclic voltammetric responses over the potential region of −0.5–0.55 V vs. Fc/$Fc^+$ and display the same number of Coulombs per gram of polymer deposited. Poly1 has an additional one electron $Cu^{1+/2+}$ wave in that potential region, which also serves as an internal standard to establish the moles of polymer repeating units in the film.

It can be seen that poly1, poly2, and poly4 are respectively oxidized by 3.2, 2.2, and 2.2 electron per repeating unit when cycled to 0.55 V vs. Fc/$Fc^+$. With regard to the efficiency of the second polymerization of poly1 and poly2, the respective irreversible charge passed was 1.7 and 2.1 electron per repeating group. A quantitative polymerization results in 2 electrons per monomer being removed irreversibly. After the first sweep to high potential a stable reproducible voltammogram is observed and with application of 0.98 V vs. Fc/$Fc^+$ 5.3, 5.4, and 3.3 electrons per repeating unit were removed for poly1-L, poly2-L and poly4, respectively. For a perfect structure it would be expected that poly1-L, due to the presence of Cu ion, would be oxidized by one more electron than poly2-L. The smaller value for poly1-L reflects the concurrent loss of 62 and the Cu ion.

The linear dimensions of the two polymerizable groups and the structure of the metallorotaxane were chosen to promote the formation of a three-stranded ladder polymer (FIG. 10). Neglecting minor effects arising from conformational issues (there are two enantiomeric conformations of 60 and 61) the polymer formed from the threading unit is twice as long as the polymer containing the macrocycle. Additionally, computationally optimized structures (All calculations were performed with the Spartan program (Wavefunction, Inc.).

The geometry of 60 was optimized using semiemperical calculations (PM3). The structure of the octamer was minimized by molecular mechanics (MMFF94). Analysis of the monomers indicates that the two polymerizable groups are rigidly held in a parallel orientation. These structural features and the polymerization of the threading ligand require the structure of the polymer to contain a predominance of the three-stranded ladder architecture shown in FIG. 10. This ladder polymer structure is of particular interest due to the fact that the macrocyclic-containing polymer (poly4) is sandwiched between two chains for poly3. Thus, a three-stranded molecular wire has been assembled in which the internal wire is encapsulated between two polymer chains.

Figure 21A:
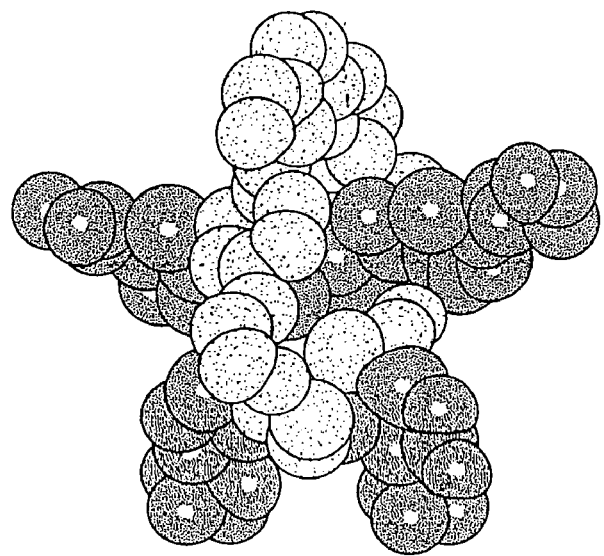
FIG. 21 shows space-filling model of 60 (a) and an octamer of poly1-L (b)
Figure 21B:
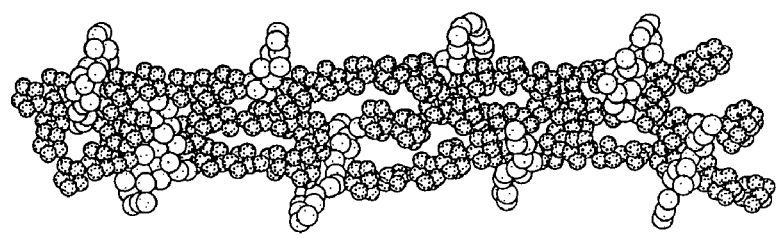
Figure 22:
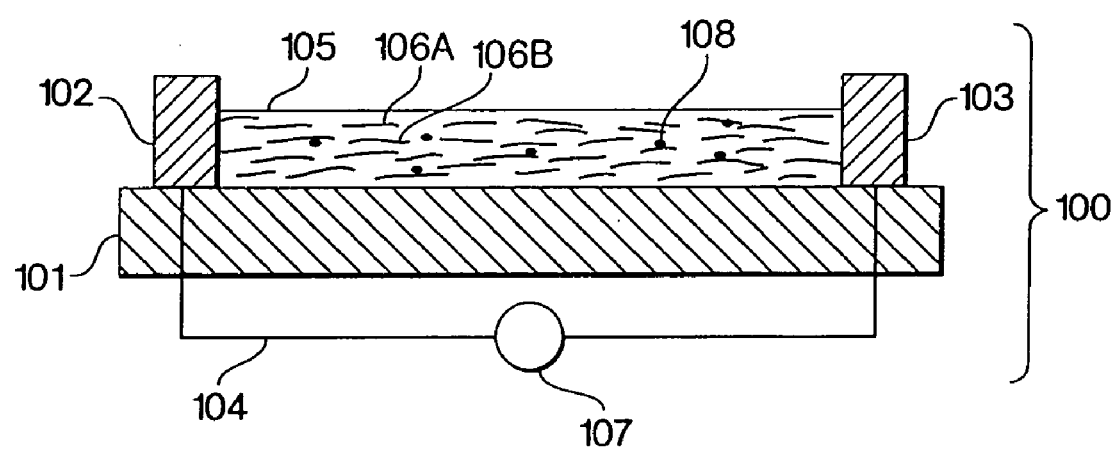
FIG. 22 shows a schematic of a prior art device incorporating a polymer film capable of conducting charge.
Figure 23:
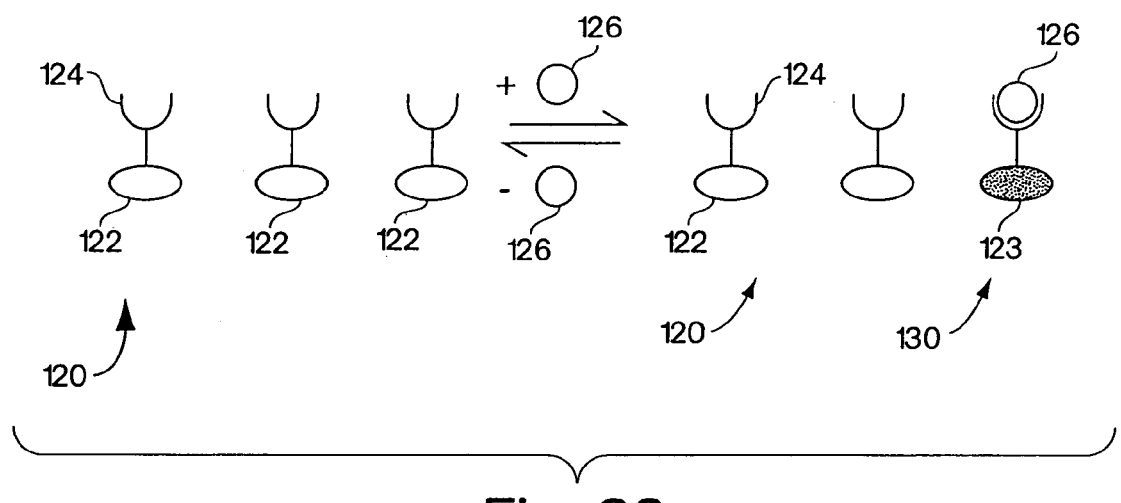
FIG. 23 shows a schematic of an equilibrium between a plurality of isolated, unbound receptors and a plurality of receptors after being exposed to an analyte.
Figure 24:
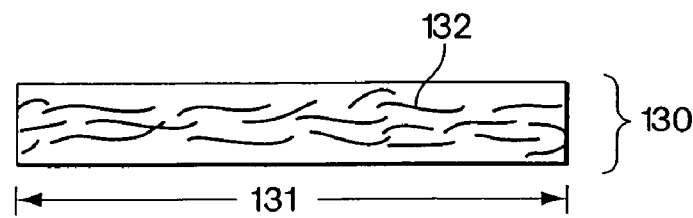
FIG. 24 shows a schematic of a polymer film capable of conducting charge comprising a plurality of individual polymer chains.
Figure 25:
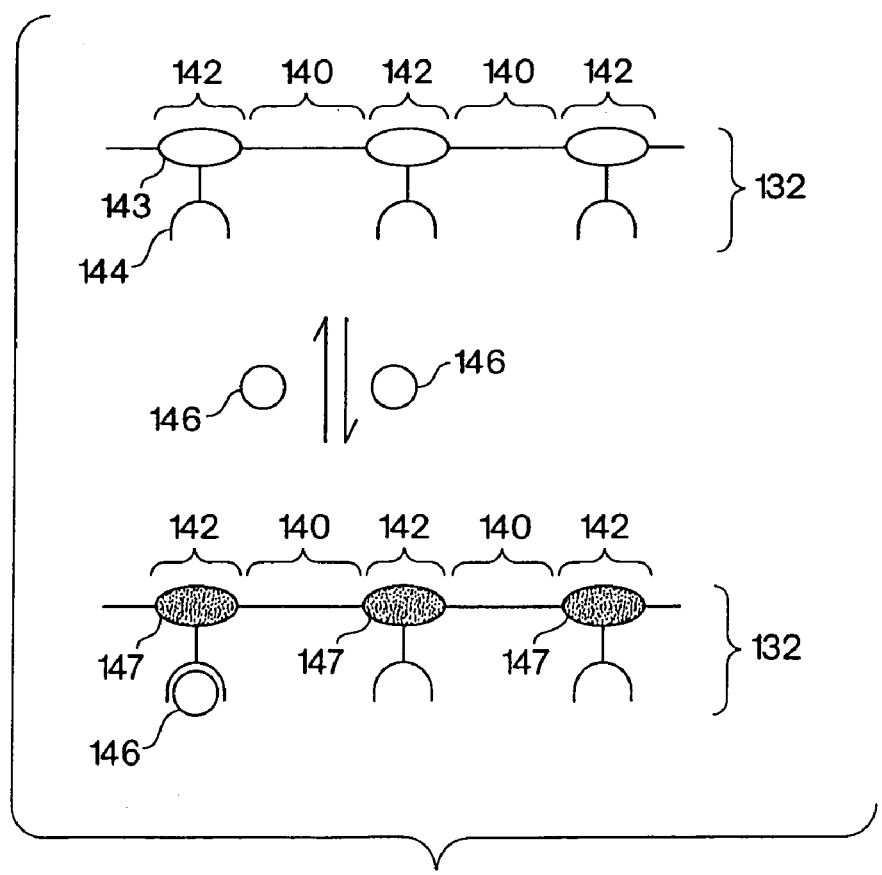
FIG. 25 shows a schematic of an expanded portion of a polymer chain of FIG. 24, where the polymer chain incorporates receptors for binding an analyte in equilibrium with a chain after exposure to an analyte.

To further illustrate the viability of this structure, molecular mechanics calculations were conducted on oligomers assembled from the computationally optimized monomer. (All calculations were performed with the Spartan program (Wave-function, Inc.). FIG. 21 shows a space-filling model of 60(a) and an octamer of poly1-L (b). In FIG. 21(a), the backbone of poly4 is shown as the medium-shaded portion, the light-shaded portion represents the phenanthroline portion, and the dark-shaded portion represents the poly3 chains. Corresponding FIG. 21(b) shows the backbone of poly4 as the middle polymer sandwiched between poly3 chains. The geometry of 60 was optimized using semiemperical calculations (PM3). The structure of the octamer was minimized by molecular mechanics (MMFF94).) In these calculations a single enantiomer of 60 was used. As can be seen from the space filling structure of the octamer shown in FIG. 21, a corresponding polymer would show a clear match of the polymer lengths, and the chain of poly4 is incarcerated between two strands of poly3. An additional feature revealed by the structure is the steric constraints of the phenanthroline portion of the macrocycle. This unit presents a rigid steric barrier that prevents close contacts between neighboring polymers and thereby promotes intrapolymer coupling in the second polymerization to favor the three-strand ladder structure.

Figure 12A:
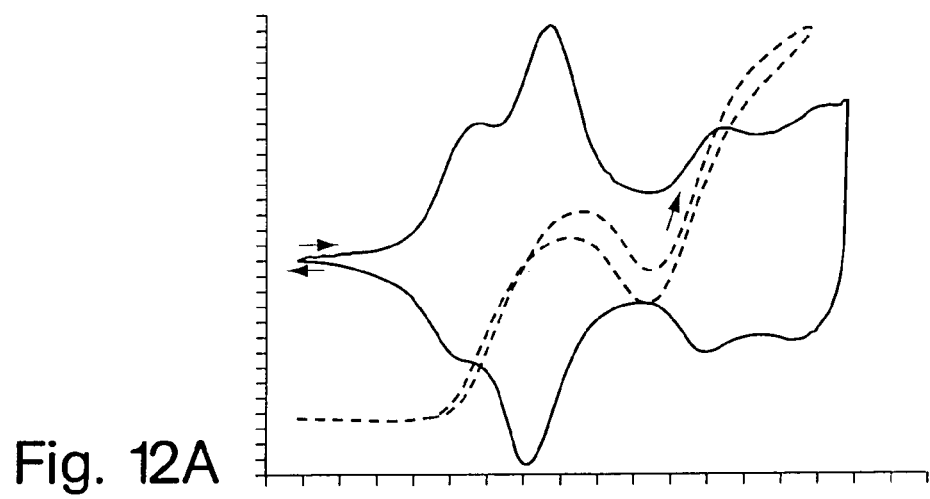
FIG. 12 shows solid lines: cyclic voltammograms of poly1-L (a), poly2-L (b), and poly4 (c), on 5 μm interdigitated microelectrodes (0.1 $M(nBu_4N)PF_6$ in $CH_2Cl_2$ at a sweep rate of 100 $mVs^{-1}$). Dashed lines: plots of the in situ conductivity versus applied oxidation potential of the same films at a sweep rate of 5 $mVs^{-1}$ with a 40 mV offset potential between adjacent electrodes.
Figure 12B:
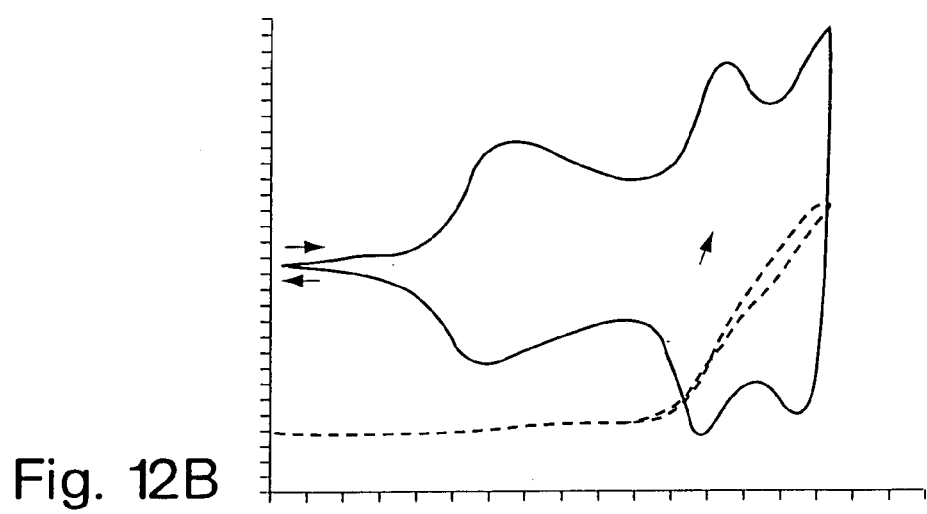
Figure 12C:
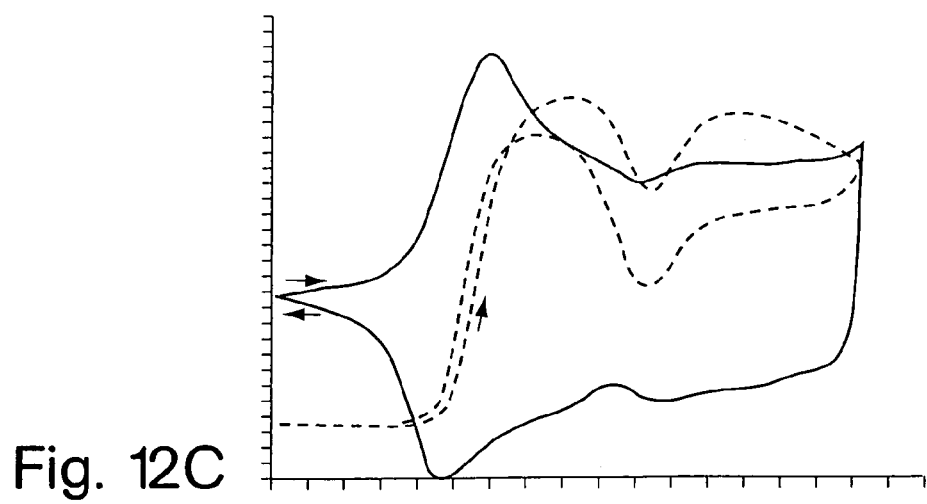

Comparisons of the conductivity and electrochemistry (FIG. 12) of poly1-L, poly2-L, and poly4 provide evidence that the internal polymer behaves as a partially isolated wire when the outer two polymer-strands are in their insulating (undoped) state. The observed electroactivity has three components; (1) the macrocyclic polymer, (2) the Cu center (for poly1-L), and (3) the threading polymer. A comparison with poly4 (FIG. 12) indicates that the first wave at about 0.1 V vs. Fc/Fc$^+$ and a broad featureless electroactivity at more positive potentials for poly1-L and poly2-L can be assigned to the macrocycle-containing polymer. For poly1-L the Cu$^{1+/2+}$ wave overlaps the macrocyclic polymer's electroactivity, which creates an optimal situation for the Cu-centered electroactivity to enhance the conductivity.

Figure 13:
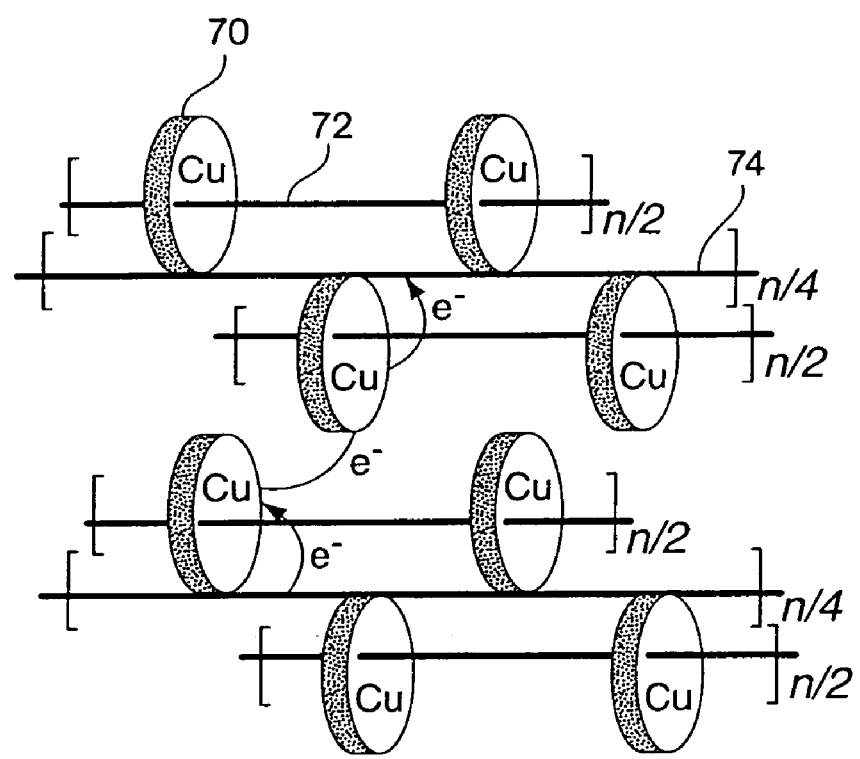
FIG. 13 shows a schematic representation of the participation of the Cu ion in the nanoscopic pathway.

The conductivities of rotaxane complexes of poly3 have been previously determined to be low (ca. 10$^{-3}$ S/cm), and thus the poly4 backbone is the dominant contributor to the conductivity of the ladder polymers. Simple inspection of FIG. 21 reveals that the conductivity ($\sigma$) of poly1-L (to obtain conductivities the coverage on the electrodes were determined by profilometry and are related to the conductivity of poly(3-methylthiophene), $\sigma$=60 S cm$^{-1}$ to correct for non-uniform coverage —this method has been established to provide a reliable measurement of a number of electropolymerizable monomers. R. P. Kingsborough, T. M. Swager, *Adv. Mater.* 1998, 10,1100; G. Zotti, G. Schiavon, *Synth. Met.* 1990, 39, 183; G. Schiavon, S. Sitran, G. Zotti, *Synth. Met.* 1989, 32, 209) at 0.25 V vs. Fc/Fc$^+$ is 38 S/cm$^{-1}$), is approximately 20 times higher that poly2-L at the same potential ($\sigma$=2 S/cm). Likewise, the conductivity of poly4 at the same potential is 66 S/cm$^{-1}$. All three materials poly1-L, poly2-L, and poly4 display comparable (within a factor of 2) conductivities at high potentials (~0.9 V vs. Fc/Fc$^+$). These conductivity comparisons demonstrate that the central macrocyclic polymer (poly4) in poly1-L and poly2-L is isolated by the outer polymers (poly3 chains) when they are in their insulating states. When the poly3 chains are insulating, the Cu ion's electroactivity can assist in interchain transport. The Cu ion's redox potential is optimally positioned to participate in the conduction. This effect, illustrated in FIG. 13 (poly3 chains comprising macrocycle 70 and chain 72 and poly4 chain indicated by 74), is responsible for the much larger conductivity at lower potentials of poly1-L relative to poly2-L. In the absence of a rotaxane structure the polymer chains of poly3 can come in close proximity, and poly4 exhibits a high conductivity without the Cu-centered electroactivity. At higher potentials the poly3 chains are redox active and mediate interchain conduction. Hence, there exists similar conductivities for poly1-L, poly2-L, and poly4.

EXAMPLE 7

Figure 14:
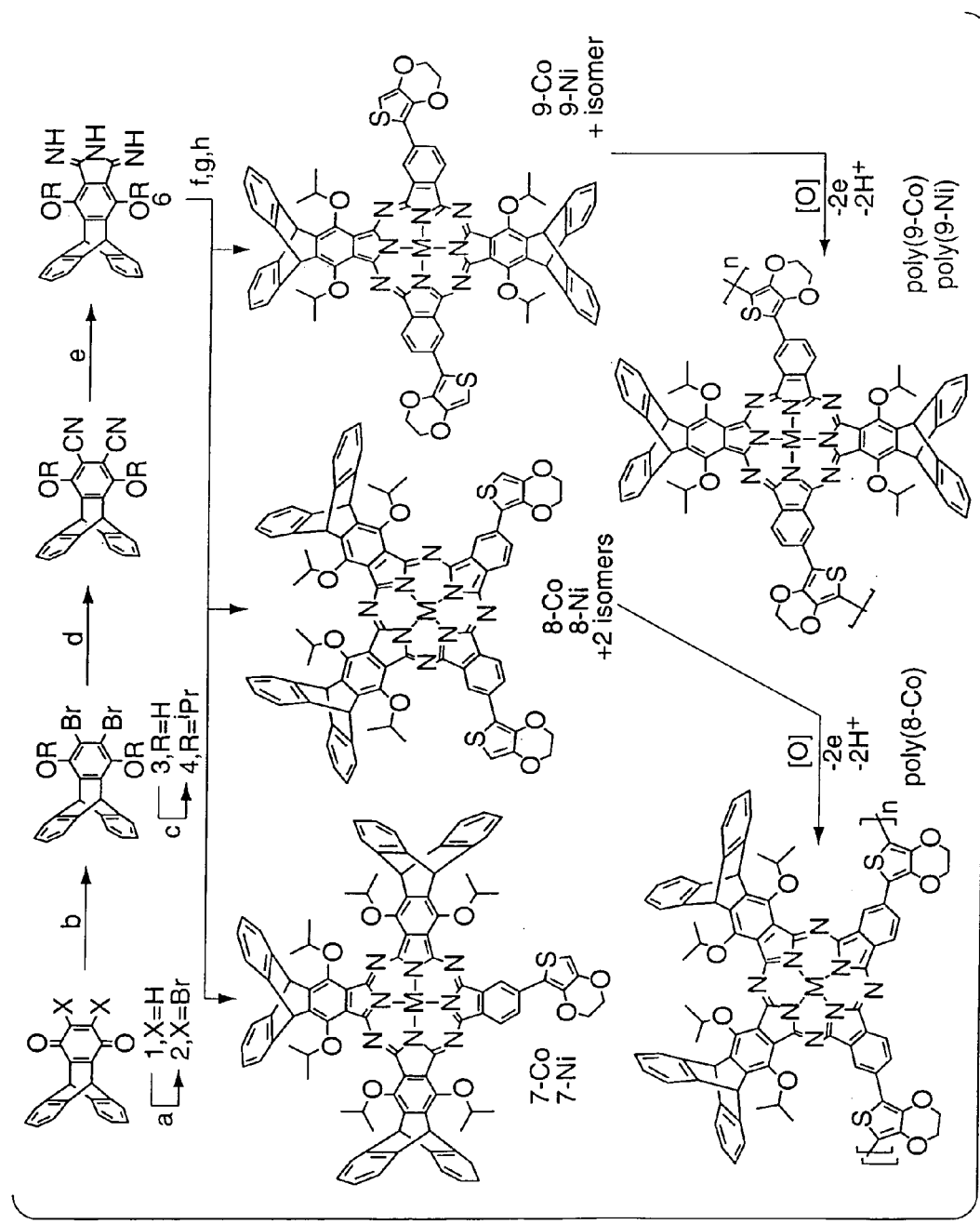
FIG. 14 shows a schematic representation of the synthesis of iptycene-containing phthalocyanine monomers: (a) 2 equiv of $Br_2$, $CHCl_3$ rt (87%); (b) 4 equiv of $Na_2S_2O_4$, 1:1 $Et_2O:H_2O$, rt (90%); (c) 5 equiv of $K_2CO_3$, 8 equiv of $(CH_3)_2CHBr$, DMF, 60° C. 3 d (93%); (d) 6 equiv of CuCN, DMF, 140° C., 3 d (71%): (3) cat. Na, $NH_3$ (g), ethylene glycol, 140° C., 5 h (87%); (f) 4-iodophthalonirile, $Mg(OBu)_2$, BuOH, reflux, 1 d; (g) $M(acac)_2$, THF, reflux, 1 d; (h) $Bu_3EnEDOT$, $PdCl_2(PPh_3)_2$, DMF, 60° C., 1 d.

The synthesis of the iptycene-containing phthalocyanine monomers is shown in FIG. 14. Quinone 1 is converted to 2 by reaction with bromine in chloroform. Reduction of the quinone 2 to the hydroquinone 3 is carried out using Na$_2$S$_2$O$_4$ in a biphasic Et$_2$O/H$_2$O solvent system. Alkylation of the hydroquinone 3 affords 4 in high yields. Cyanation of 4 with CuCN in DMF yields the dicyano derivative 5 in moderate yields. Conversion diiminoisoindoline (6) is carried out by bubbling ammonia through a suspension of 5 in ethylene glycol at 140° C. with a catalytic amount of Na for 5 h. Compound 6 (A) is then cyclized with 4-iodophthalonitrile (S. M. Marcuccio, P. I. Svirskaya, S. Greenberg, A. B. P. Lever, C. Leznoff, K. B. Tomer, *Can. J. Chem.* 1985, 63, 3057), (B) in a refluxing Mg(OBu)$_2$ suspension in BuOH. After trifluoroacetic acid treatment, the free bases of the three isomers, 2H[pz(A$_3$;B)], cis-2H[pz(A$_2$;B$_2$)], and trans-2H[pz(A$_2$;B$_2$)], are obtained. Subsequenly, the crude mixture is metallated with M(acac)$_2$ in refluxing THF (M=Co, Ni). The crude metallophthalocyanine mixture is then reacted with 2-tributylstannyl-3,4-ethylenedioxythiophene in DMF at 60° C. in the presence of a catalytic amount of PdCl$_2$(PPh$_3$)$_2$. Separation of the three isomers, 7-Co, 8-Co, and 9-Co, (or 7-Ni, 8-Ni, and 9-Ni) is easily accomplished by flash chromatography. The alternating mixed ring phthalocyanines (precursors to 9-Co and 9-Ni) are the major products. Compounds 7-Co and 7-Ni with a single thiophene group are incapable of forming polymers and were not studied further. CPK space-filling models indicate that the iptycene architecture should create a pocket at the metal center.

EXAMPLE 8

Figure 15A:
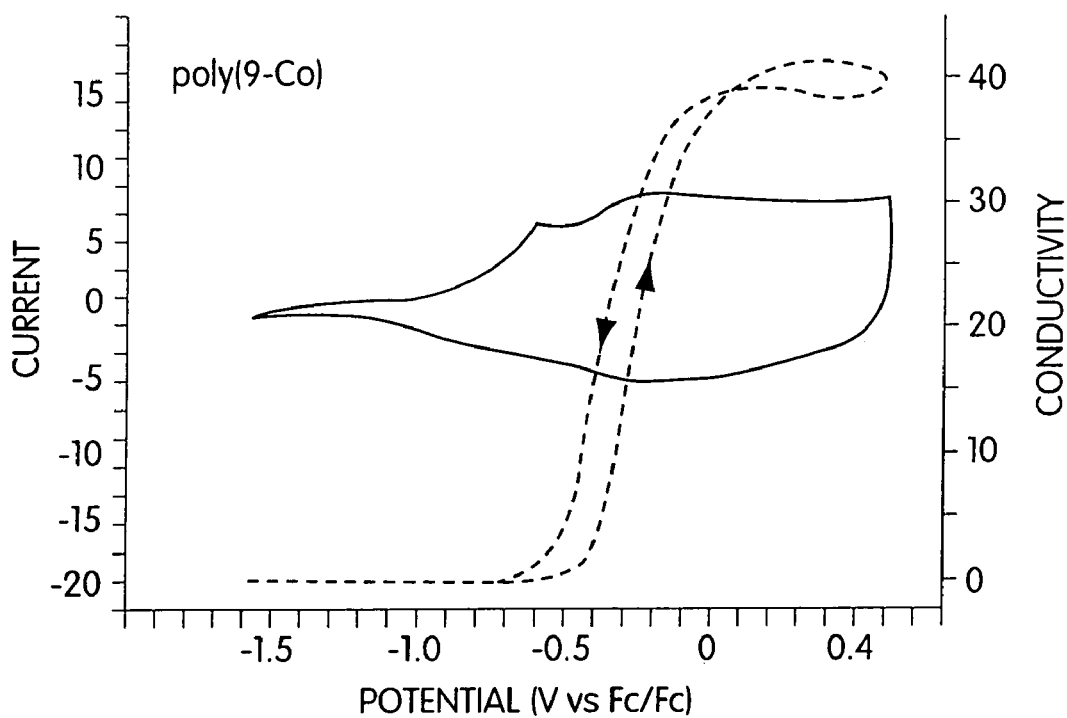
FIG. 15 shows cyclic voltammograms (solid lines) and conductivity profiles (dashed liens) of (a) poly(9-Co) and (b) poly(9-Ni) in 0.1 M $Bu_4NPF_6/CH_2Cl_2$ on 2 μm interdigitated microelectrodes. Sweep rates are 100 mV/s for cyclic voltammograms and 5 mV/s with a 40 mV offset potential for conductivity measurement.

The electrochemical characteristics of both the cis and trans isomers and their polymers were investigated. Electropolymerization of 9-Co and 9-Ni on 2 µm interdigitated microelectrodes (G. P. Kittlesen, H. S. White, M. S. Wrighton, *J. Am. Chem. Soc.* 1984, 106, 7389; E. W. Paul, A. J. Ricco, M. S. Wrighton, *J. Phys. Chem.* 1985, 89, 1441; J. W. Thackeray, H. S. White, M. S. Wrighton, *J. Phys. Chem.* 1985, 89, 5133; D. Ofer, R. M. Crooks, M. S. Wrighton, *J. Am. Chem. Soc.* 1990, 112, 7869), results in the deposition of dark green films of poly(9-Co) and poly(9-Ni). The polymerization proceeds by oxidative coupling of the pendant thiophenes (FIG. 14). The cyclic voltammogram of these polymers in fresh (monomer free) electrolyte on the interdigitated microelectrodes (Pt button electrodes give identical results) is shown in FIG. 15a. Films of poly(9-Co) are characterized by a wave at –0.6 V vs Fc/Fc$^+$ (Unless noted all potentials are referenced to the Fc/Fc$^+$ redox couple), which is attributed to the Co$^{1+/2+}$ redox process, followed by a very broad region of redox activity. This broad nature suggests overlapping or admixed redox processes (i.e. redox matched), including the Co$^{2+/3+}$ redox wave, a ligand-based oxidation, and EDOT- based electrochemistry. The conductivity profile is observed to increase at potentials corresponding to the Co$^{2+/2+}$ redox wave, suggesting that the metal centered redox activity contributes to the conductivity, and finally reaches a maximum at 0.35 V. The low hysteresis in the conductivity and voltammogram suggests that minimal structural reorganization accompanies the redox cycling. Using methods described previously (R. P. Kingsborough, T. M. Swager, *Adv. Mater.* 1998, 10, 1003; R. P. Kingsborough, T. M. Swager, *J. Am. Chem. Soc.* 1999, 121, 8825), a maximum conductivity of approximately 40 S/cm is obtained.

Figure 15B:
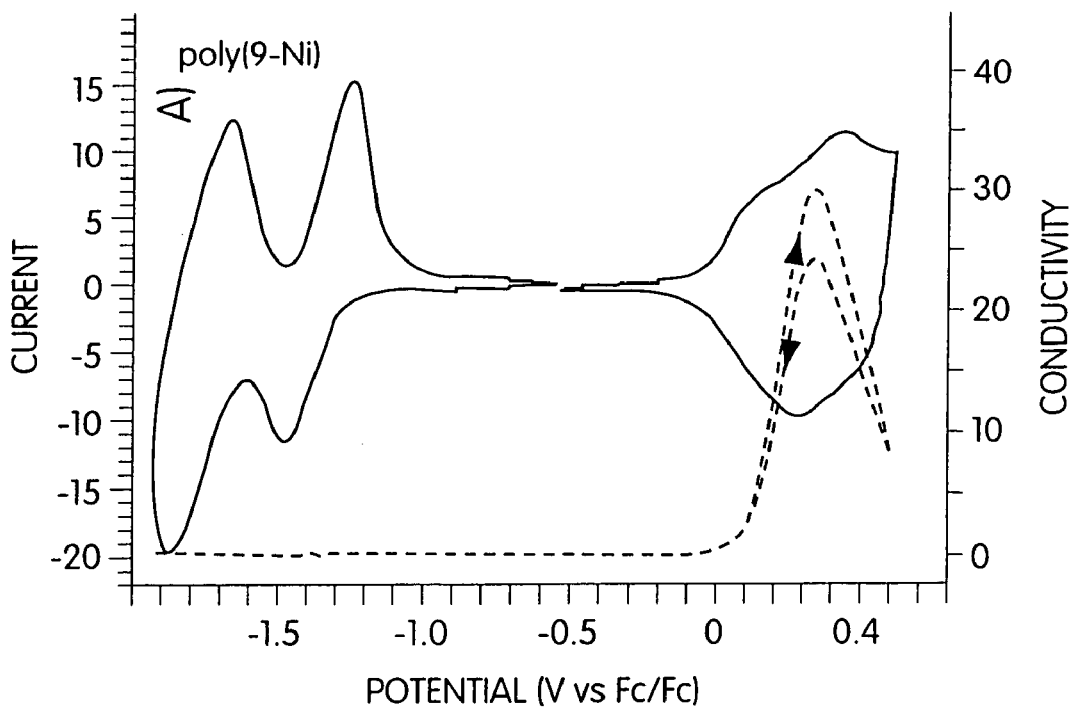

Poly(9-Ni) displays new features in the reductive region at –1.35 V and –1.75 V (FIG. 15b). Based upon comparisons of cyclic voltammograms with those of the cis derivative, 8-Ni, the first one-electron wave is assigned to a Ni$^{1+/2+}$ redox process and the second to a ligand-centered process. In the oxidative region, the cyclic voltammogram of poly (9-Ni) consists of a single broad redox wave centered at 0.3 V with a leading shoulder at 0.1 V. The higher oxidation potential required for electroactivity of poly(9-Ni) compared to poly(9-Co) is not unexpected since it lacks the lower potential Co$^{1+/2+}$ and Co$^{2+/3+}$ redox waves. The in situ conductivity trace (FIG. 15b) shows redox conduction associated only with the polymer backbone and not the metal-centered and ligand-centered reductive processes. The Co$^{1+/2+}$ wave, which is not redox-matched, produces no conductivity in poly(9-Co). The maximum conductivity is observed at the half-wave potential of the polymer film (($\sigma_{max}$=30 S/cm) and decreases rapidly at higher applied potentials.

EXAMPLE 9

Figure 16:
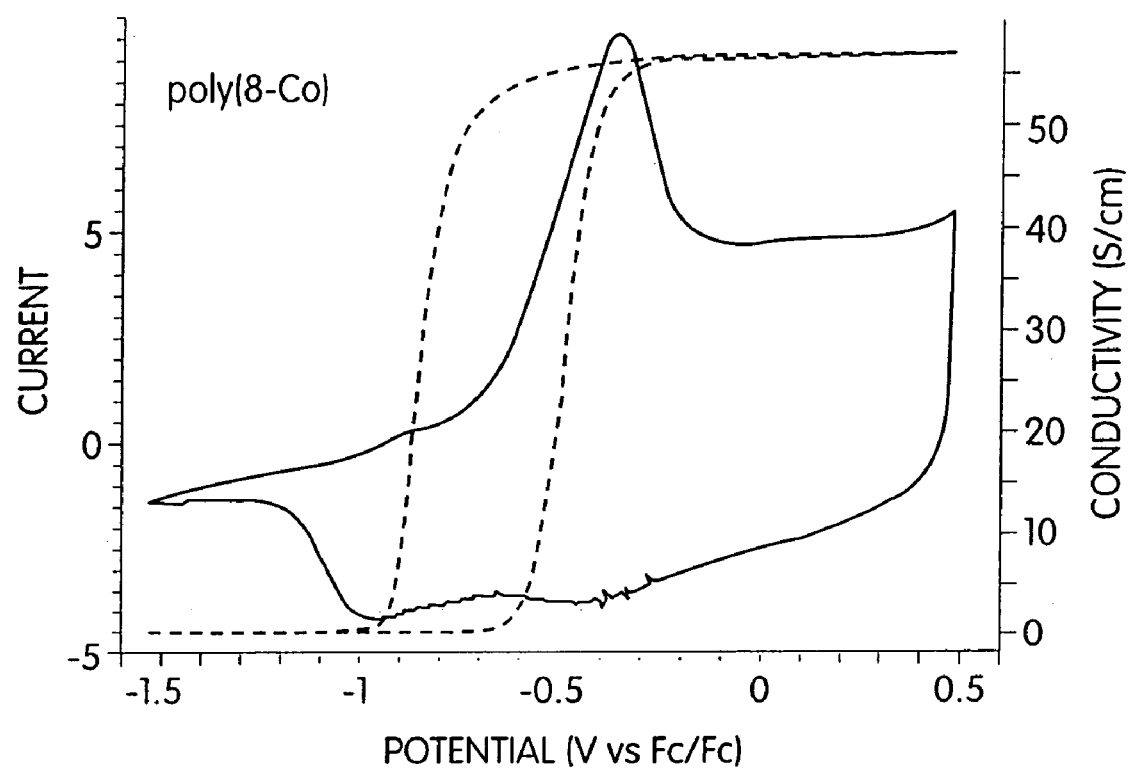
FIG. 16 shows cyclic voltammogram (solid line) and conductivity profile (dashed line) of poly(8-Co) in 0.1 M $Bu_4NPF_6/CH_2Cl_2$ on 2 μm interdigitated microelectrodes. Sweep rates and offset potentials were the same as in FIG. 15.

Films of poly(8-Co) were also investigated with 2 μm interdigitated microelectrodes, and the cyclic voltammogram is shown in FIG. 16. FIG. 16 shows a large oxidation current followed by a plateau region, which is indicative of a highly delocalized polymer backbone. This plateau region in the CV includes the overlapping electrochemical $Co^{2+/3+}$, ligand oxidation, and polymer oxidation processes. After reversal of the potential sweep at 0.5 V, a pronounced hysteresis is observed in the reduction wave and conductivity profile. Upon polymer oxidation, the in situ conductivity profile rapidly increases and levels off on a plateau conductivity of ca. 55 S/cm. The hysteresis and high conductivity suggests that the cis-geometry favors greater interchain interactions in the oxidized polymer.

EXAMPLE 10

Figure 17:
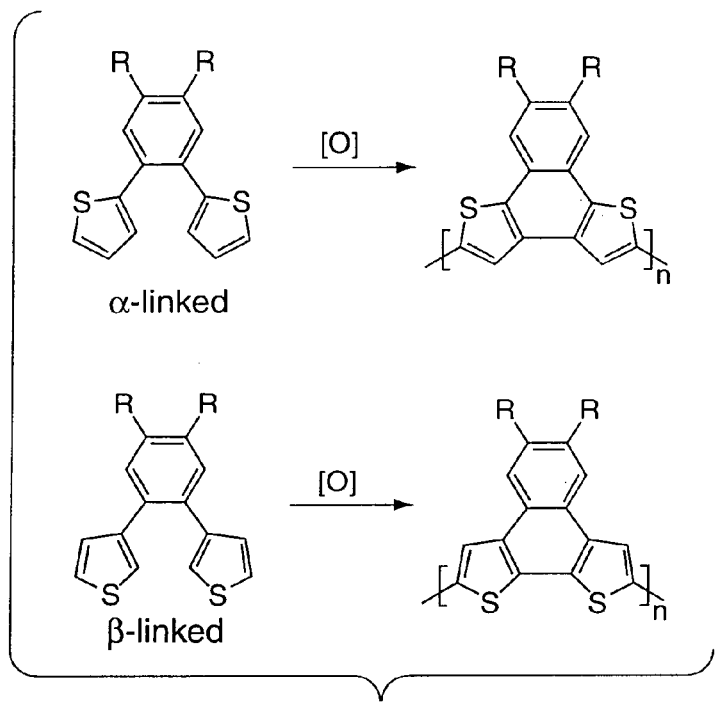
FIG. 17 shows cyclization of α-linked and β-linked species.

This example presents another approach to design monomers that can be both electropolymerized and cyclized in a tandem process. Thiophene groups can be attached in one of two fashions, either through the position α or β to the sulfur. In the first case cyclization as shown (top) in FIG. 17 proceeds through the less reactive β-position and the polymerization can occur through the α-position. In this polymer the only conjugation path involves the phenyl ring resulting in a higher band-gap and higher oxidation potential. In the case shown (bottom) in FIG. 17 the cyclization and polymerization both occur through the more reactive α-positions. A conjugation path exists through the thiophene residues and these systems are easier to oxidize and have lower band gaps.

Figure 18A:
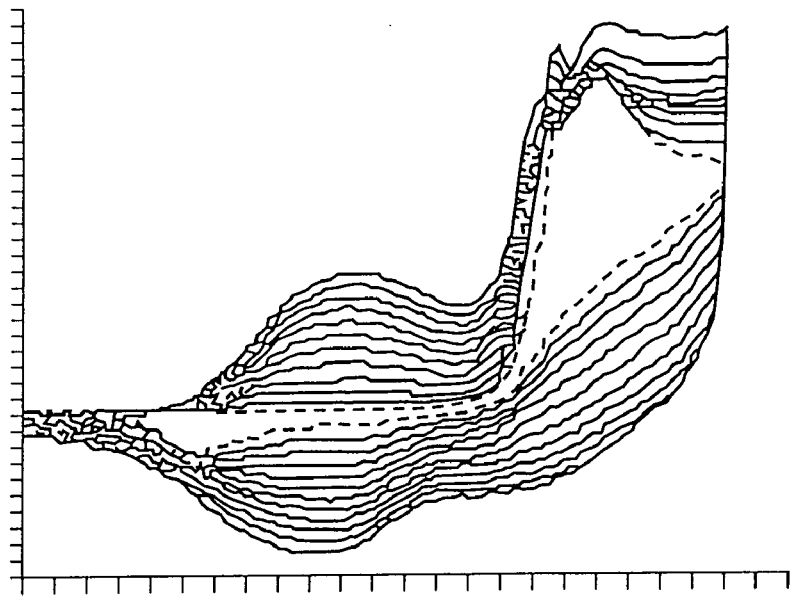
FIG. 18 shows electropolymerization (a) of the monomer: The dashed line is the first sweep and the increasing current with successive sweeps indicates that polymerization occurs; the cyclic voltammetric behavior of the thin film (b) on a 2 $mm^2$ platinum button electrode shows reversible electrochemical behavior, (scan rates were 100 m V/s)
Figure 18B:

Different R groups can be used where R=CH₃, OCH₃, H, crown ethers. The cyclic voltammetric behaviors of the film-growth (polymerization) and of the polymer film are shown in FIG. 18 for β-linked monomers. FIG. 18 shows electropolymerization (a) of the monomer: The dashed line is the first sweep and the increasing current with successive sweeps indicates that polymerization occurs; the cyclic voltammetric behavior of the thin film (b) on a 2 mm² platinum button electrode shows reversible electrochemical behavior, (scan rates were 100 m V/s) This material shows both excellent growth characteristics and electroactivity. The cyclic voltammetric behavior suggests that this film is highly conductive. The films have excellent durability and can be cycled many ($10^3$ +) times over the potential range shown without degradation. The films can be cycled to higher potentials vs. Ag/Ag⁺ in acetonitrile solutions and degrade at potentials around 2 volts, potentials whereat the solvent is also degrading. These films can be stable in aqueous media, a feature relevant to ascertain stability in ambient conditions. The crown ether linkages bind metal ions and change the redox potential of segments of the polymer and thereby constitute a switching mechanism.

Figure 19:
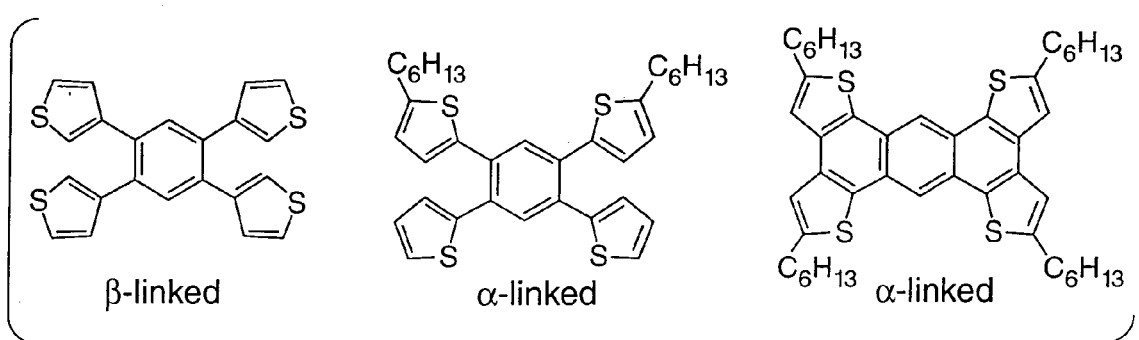
FIG. 19 shows examples of α-linked and β-linked tetrathienyl monomers.

The β-linked tetrathienyl monomer of FIG. 19 displays very desirable electrochemical behavior and is readily electropolymerized into thin highly conductive films. The added solubility of the hexyl sidechains can make soluble analogs. The α-linked monomer undergoes an irreversible oxidation at 0.9 V vs. Ag/Ag⁺ suggestive of a cyclization and/or polymerization. Due to the higher solubility no film deposition was observed. The model compound displays reversible redox wave in $CH_2Cl_2$ electrolyte at $E^{1/2}$=1.25 V vs. Ag/A.

EXAMPLE 11

Figure 20:
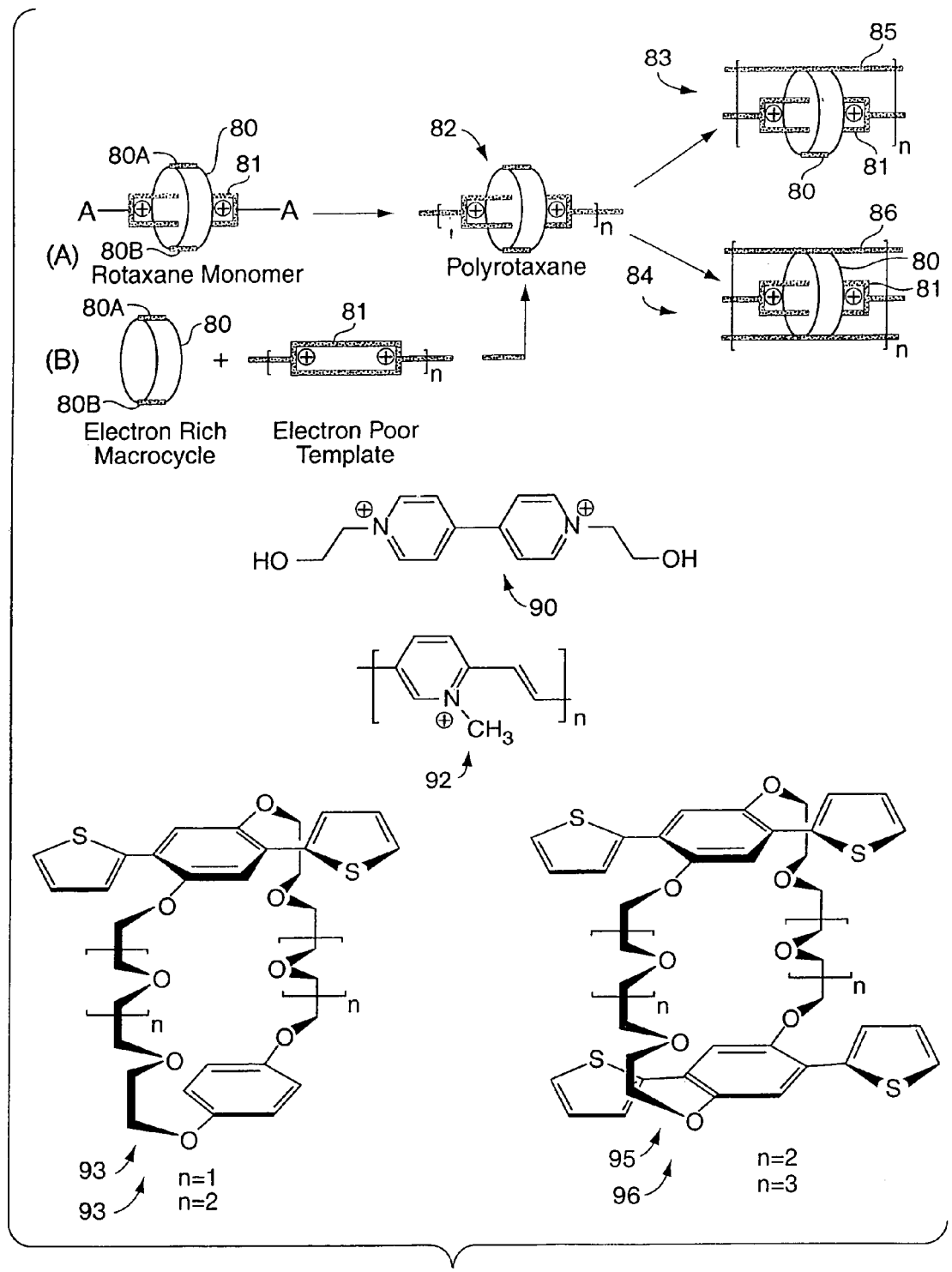
FIG. 20 shows more monomers and polymers of the present invention.

Electron-rich macrocyclic monomers can be polymerized about electron-poor template polymers as shown in FIG. 20. Polyrotaxane 82 can be produced by either polymerizing rotaxane monomer (pathway A, comprising electron rich macrocycle 80 and electron poor templating polymer 81) or by assembling macrocycle 80 around an existing templating polymer 81. In the simplest case, the macrocycle 80 will have coupling sites 80a and 80b and polymers with structures schematically shown as 83 or 84 will be formed. This polymer is a ladder polymer by virtue of the fact that to completely sever the polymer backbone two bonds must be broken. However the strong covalent bonds are on two different polymers held together by non-covalent interactions. Few such synthetic ladder polymers have been previously synthesized. Non-covalent ladder polymers in biological species and related assemblies can also be used (e.g. DNA, beta-sheets). Macrocycles containing four coupling sites can create three strand ladder polymers 84.

Monomer 90 can function as the electron poor element. This choice is based upon the fact that the diol structure is readily converted to a number of polymeric structures (e.g. polyesters, polysiloxanes, etc.) by standard methods. Great flexibility can be provided in the choice of a linking group. Linking groups that can be readily cleaved will allow for the electron poor templating polymer to be removed. Removal of the template in 84 can generate a tubular structure which can be subsequently utilized for the transport/binding of ions or small molecules to produce separation/sensory materials. Furthermore the binding of polymerizable monomers by 84 can be used to organize dielectric polymers and isolate 84 to produce a nanoscopic pathway.

The reactive groups used to interconnect the macrocycles can similarly be varied. Oxidative polymerization of electron-rich heterocyclic monomers is one process for the synthesis of conducting polymers. This polymerization can also allow for electro-deposition directly onto devices and substrates for physical measurements. The syntheses of electron-rich macrocyclic monomers 93–96 can result in assembly into polyrotaxanes when mixed with 90 or related materials. Once assembled into a polyrotaxane complex, oxidation can form oligothiophene interconnects to produce the ladder structure. Structures 93 and 94 will lead to ladder polymers of structure 83 and monomers 95 and 96 will produce structure 84.

Polymer 92 can also be used as a conjugated polymer template. Polymer 92, a very electron-poor polymer previously synthesized (Marsella et. al. *Advanced Materials* 7, 145–147, 1995), is an efficient threading element for the formation of polyrotaxane complexes. The resultant ladder polymers will have electron-rich and electron-poor polymers with close co-facial contacts. Photoexcititation will transfer an electron to 92 from the macrocycle containing polymer, and the conjugated nature of both polymers will allow for the carriers to rapidly diffuse away from each other and hence produce long lived charge separation. This charge separation should produce an accompanying photocurrent when placed between two electrodes in an electric field.

Those skilled in the art would readily appreciate that all parameters listed herein are meant to be examples and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

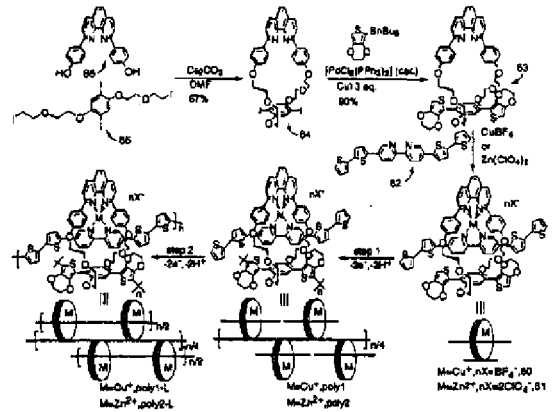

What is claimed is:

1. An article comprising:
a nanoscopic pathway having a conductivity;
an insulating dielectric surrounding the nanoscopic pathway; and
a nanoscopic switch in electronic communication with the nanoscopic pathway being capable of altering the conductivity of the nanoscopic pathway,
wherein the nanoscopic pathway comprises a conducting polymer,
wherein the conducting polymer has a structure comprising the formula:

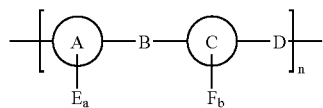

wherein A and C are aromatic groups; B and D can be a heteroatom or metal and chosen from a group of N, P, S, As, Se, or —CC-M-CC-($M=FeL_x$, $RuL_x$, $PdL_x$, $PtL_x$, $CoL_x$, $RhL_x$, where L is neutral (phosphine, nitrogen, or π-arene based ligand) or charged (nitrogen, oxygen, or charged π-arene ligand), or are selected from the group consisting of a carbon-carbon double bond and a carbon-carbon triple bond; and any hydrogen on aromatic group A and C can be replaced by E and F respectively, wherein a and b are integers which can be the same or different and $a=0-4$, $b=0-4$ such that when $a=0$, b is nonzero and when $b=0$, a is nonzero, and at least one of E and F includes a bicyclic ring system having aromatic or non-aromatic groups optionally interrupted by O, S, $NR^1$ and $CR^1_2$ wherein $R^1$ is selected from the group consisting of hydrogen, $C_1$–$C_{20}$ alkyl, $C_1$–$C_{20}$ alkoxy and aryl and n is less than about 10,000, and wherein, when E or F is not said bicyclic ring system, E or F is a part of aromatic group A or C.

2. The article of claim 1, wherein $E_a$ is covalently attached to A, and the conducting polymer comprises the structure:

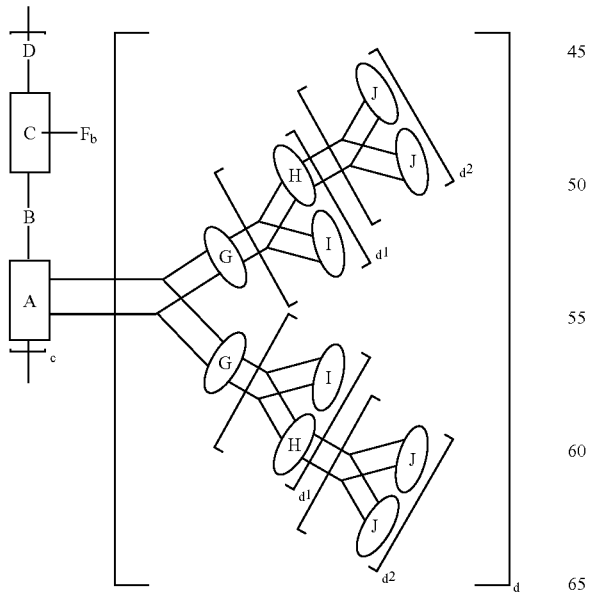

wherein G, H, I, and J are aromatic groups, $d=1, 2$, and $d^1=0, 1$, such that when $d^1=0$, $d^2=0$ and when $d^1=1$, $d^2=0, 1$.

3. The article of claim 2, wherein G and H may be the same or different, and each is selected from the group consisting of:

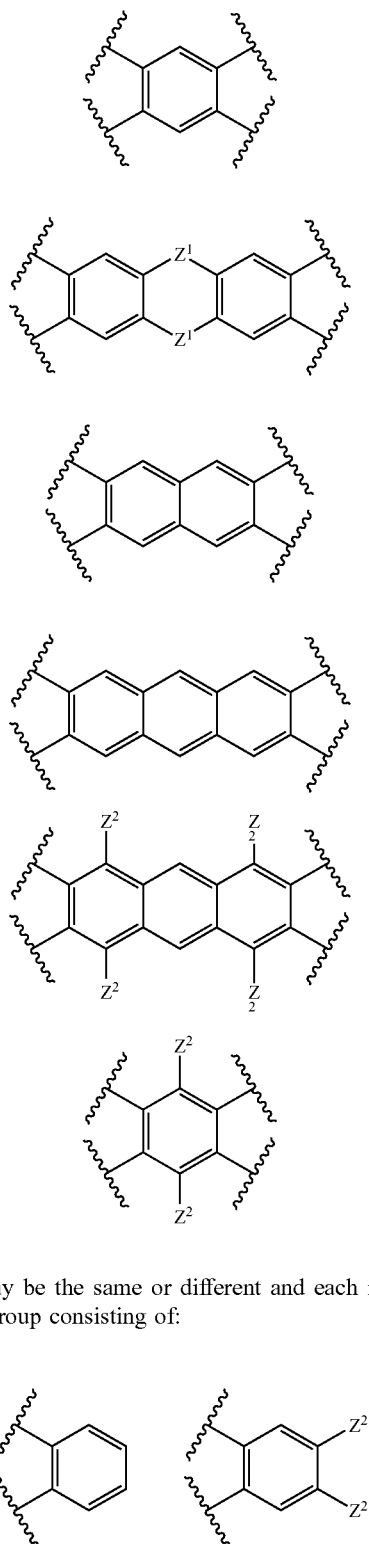

I and J may be the same or different and each is selected from the group consisting of:

-continued

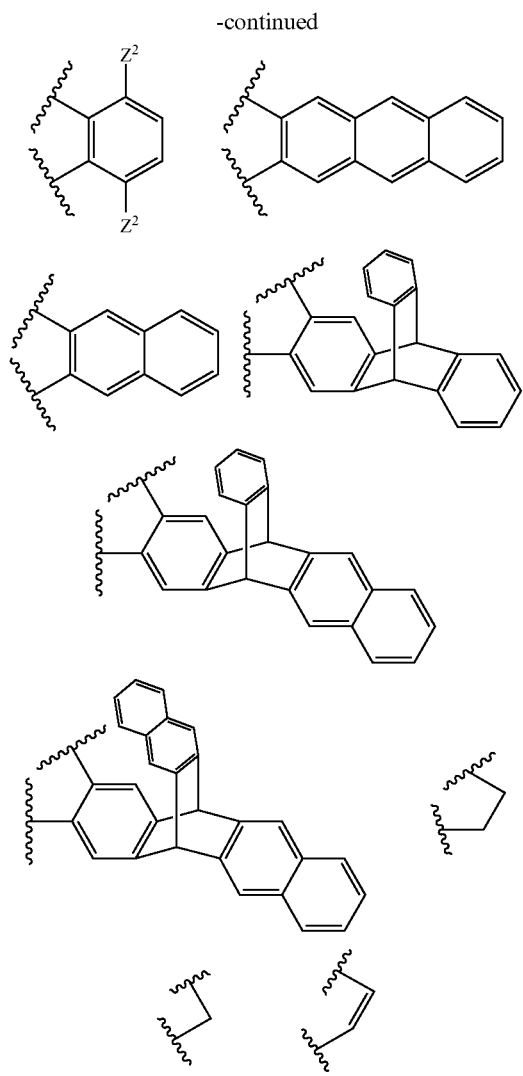

wherein any hydrogen in G, H, I and J can be substituted by $R^2$, $R^2$ is selected from the group consisting of $C_1$–$C_{20}$ alkyl, aryl, $C_1$–$C_{20}$ alkoxy, phenoxy, $C_1$–$C_{20}$ thioalkyl, thioaryl, C(O)O$R^3$, N($R^3$)($R^4$), C(O)N($R^3$)($R^4$), F, Cl, Br, I, $NO_2$, CN, acyl, carboxylate, hydroxy, $R^3$ and $R^4$ can be the same or different and each is selected from the group consisting of hydrogen, $C_1$–$C_{20}$ alkyl, and aryl, $Z^1$ is selected from the group consisting of O, S and N$R^8$ wherein $R^8$ is selected from the group consisting of hydrogen, $C_1$–$C_{20}$ alkyl, and aryl, and $Z^2$ is selected from the group consisting of F, Cl, O$R^3$, S$R^3$, N$R^3R^4$ and Si$R^8R^3R^4$.

A is selected from the group consisting of:

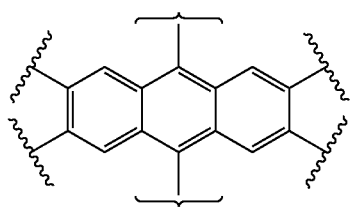

-continued

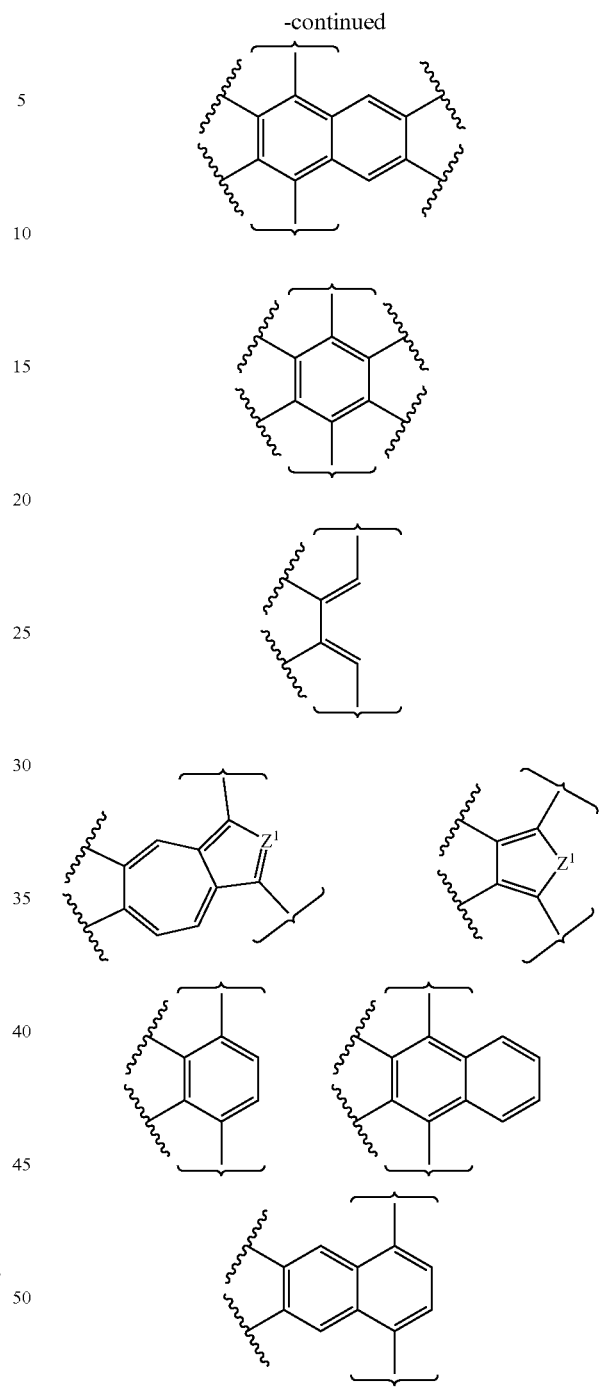

wherein any hydrogen in A can be substituted by $R^5$, $R^5$ is selected from the group consisting of $C_1$–$C_{20}$ alkyl, aryl, $C_1$–$C_{20}$ alkoxy, phenoxy, $C_1$–$C_{20}$ thioalkyl, thioaryl, C(O)O$R^6$, N($R^6$)($R^7$), C(O)N($R^6$)($R^7$), F, Cl, Br, $NO_2$, CN, acyl, carboxylate, hydroxy; $R^6$ and $R^7$ can be the same or different and each is selected from the group consisting of hydrogen, $C_1$–$C_{20}$ alkyl, and aryl; $Z^1$ is selected from the group consisting of O, S and N$R^8$ and $R^8$ is selected from the group consisting of hydrogen, $C_1$–$C_{20}$ alkyl, and aryl;

B and D can be the same or different and each is selected from the group consisting of:

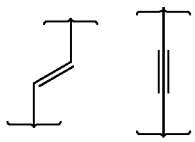

wherein any hydrogen in B and D can be substituted by $R^9$, $R^9$ is selected from the group consisting of $C_1$–$C_{20}$ alkyl, aryl, $C_1$–$C_{20}$ alkoxy, phenoxy, $C_1$–$C_{20}$ thioalkyl, thioaryl, $C(O)OR^{10}$, $N(R^{10})(R^{11})$, $C(O)N(R^{10})(R^{11})$, F, Cl, Br, $NO_2$, CN, acyl, carboxylate, hydroxy, $R^{10}$ and $R^{11}$ can be the same or different and each is selected from the group consisting of hydrogen, $C_1$–$C_{20}$ alkyl, and aryl;

C is selected from the aromatic group consisting of:

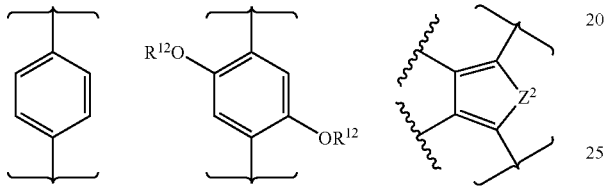

wherein $R^{12}$ is selected from the group consisting of hydrogen, $C_1$–$C_{20}$ alkyl and aryl; any hydrogen in C can be substituted by F which is represented by $R^{13}$, $R^{13}$ is selected from the group consisting of $C_1$–$C_{20}$ alkyl, aryl, $C_1$–$C_{20}$ alkoxy, phenoxy, $C_1$–$C_{20}$ thioalkyl, thioaryl, $C(O)OR^{14}$, $N(R^{14})(R^{15})$, $C(O)N(R^{14})(R^{15})$, F, Cl, Br, $NO_2$, CN, acyl, carboxylate, hydroxy; $R^{14}$ and $R^{15}$ can be the same or different and each is selected from the group consisting of hydrogen, $C_1$–$C_{20}$ alkyl, and aryl; $Z^2$ is selected from the group consisting of O, S and $NR^{16}$ and $R^{16}$ is selected from the group consisting of hydrogen, $C_1$–$C_{20}$ alkyl, and aryl.

4. The article of claim 3, wherein A is selected from the group consisting of:

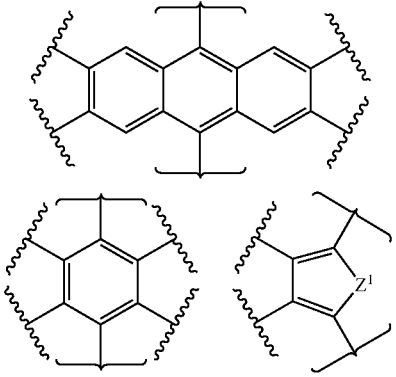

and both B and D are:

* * * * *

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

In the Specification:

At column 1, line 10, please add the following:

-- <u>Statement Regarding Federally Sponsored Research or Development</u>

This invention was made with the support under the following government contract: N00014-97-1-0174 awarded by the Office of Naval Research. The government has certain rights in the invention. --

At column 8, line 27, please add the following:

-- In some embodiments, an article of the present invention may comprise a nanoscopic pathway having a conductivity, an insulating dielectric surrounding the nanoscopic pathway, and a nanoscopic switch in electronic communication with the nanoscopic pathway being capable of altering the conductivity of the nanoscopic pathway. The nanoscopic pathway may comprise a conducting polymer, wherein the conducting polymer has a structure comprising the formula:

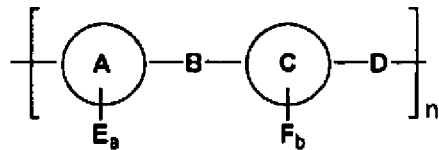

UNITED STATES PATENT AND TRADEMARK OFFICE
CERTIFICATE OF CORRECTION

| | |
|---|---|
| PATENT NO. | : 7,186,355 B2 |
| APPLICATION NO. | : 09/777725 |
| DATED | : March 6, 2007 |
| INVENTOR(S) | : Timothy M. Swager |

It is certified that error appears in the above-identified patent and that said Letters Patent is hereby corrected as shown below:

wherein A and C are aromatic groups; B and D can be a heteroatom or metal and chosen from a group of N, P, S, As, Se, or -CC-M-CC-(M=$FeL_x$, $RuL_x$, $PdL_x$, $PtL_x$, $CoL_x$, $RhL_x$, where L is neutral (phosphine, nitrogen, or π-arene based ligand) or charged (nitrogen, oxygen, or charged π-arene ligand), or are selected from the group consisting of a carbon-carbon double bond and a carbon-carbon triple bond; and any hydrogen on aromatic group A and C can be replaced by E and F respectively, wherein a and b are integers which can be the same or different and a = 0 - 4, b = 0 - 4 such that when a = 0, b is nonzero and when b = 0, a is nonzero, and at least one of E and F includes a bicyclic ring system having aromatic or non-aromatic groups optionally interrupted by O, S, $NR^1$ and $CR^1_2$ wherein $R^1$ is selected from the group consisting of hydrogen, $C_1$-$C_{20}$ alkyl, $C_1$-$C_{20}$ alkoxy and aryl and n is less than about 10,000, and wherein, when E or F is not said bicyclic ring system, E or F is a part of aromatic group A or C.

In some cases, $E_a$ may be covalently attached to A, and the conducting polymer comprises the structure:

UNITED STATES PATENT AND TRADEMARK OFFICE
CERTIFICATE OF CORRECTION

PATENT NO. : 7,186,355 B2 Page 3 of 21
APPLICATION NO. : 09/777725
DATED : March 6, 2007
INVENTOR(S) : Timothy M. Swager It is certified that error appears in the above-identified patent and that said Letters Patent is hereby corrected as shown below:

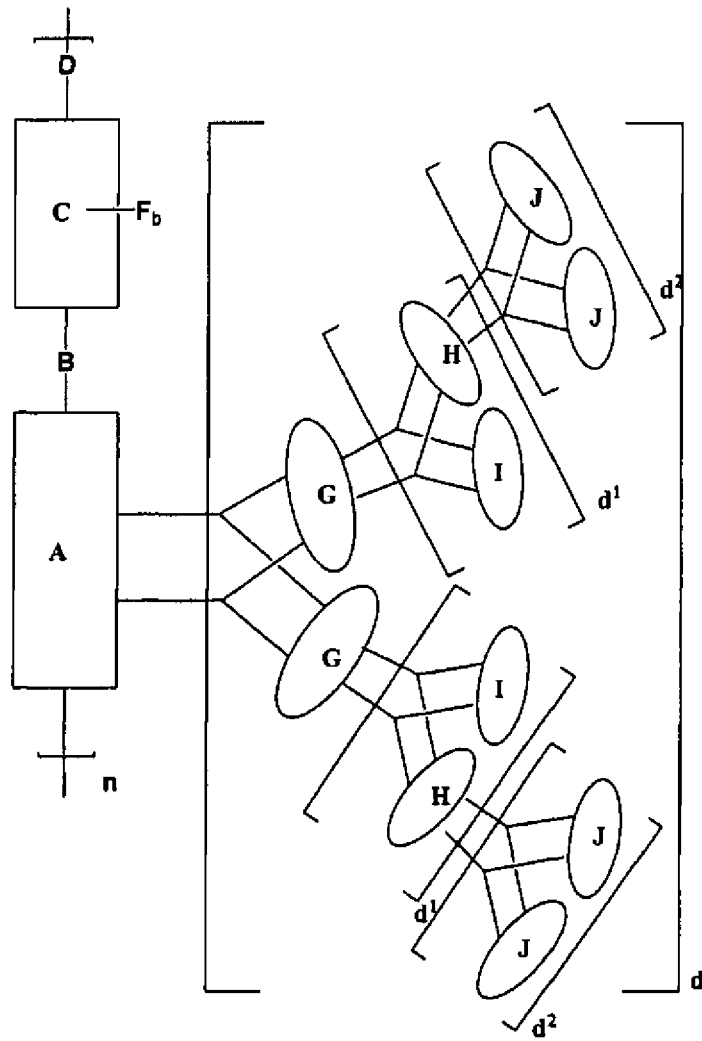

UNITED STATES PATENT AND TRADEMARK OFFICE
CERTIFICATE OF CORRECTION

PATENT NO. : 7,186,355 B2  Page 4 of 21
APPLICATION NO. : 09/777725
DATED : March 6, 2007
INVENTOR(S) : Timothy M. Swager It is certified that error appears in the above-identified patent and that said Letters Patent is hereby corrected as shown below:

wherein G, H, I, and J are aromatic groups, $d = 1, 2$, and $d^1 = 0, 1$, such that when $d^1 = 0$, $d^2 = 0$ and when $d^1 = 1$, $d^2 = 0, 1$. In some embodiments, G and H may be the same or different, and each may be selected from the group consisting of:

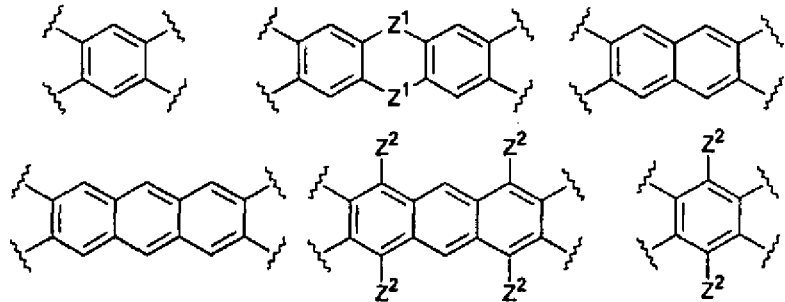

In some embodiments, I and J may be the same or different and each is selected from the group consisting of:

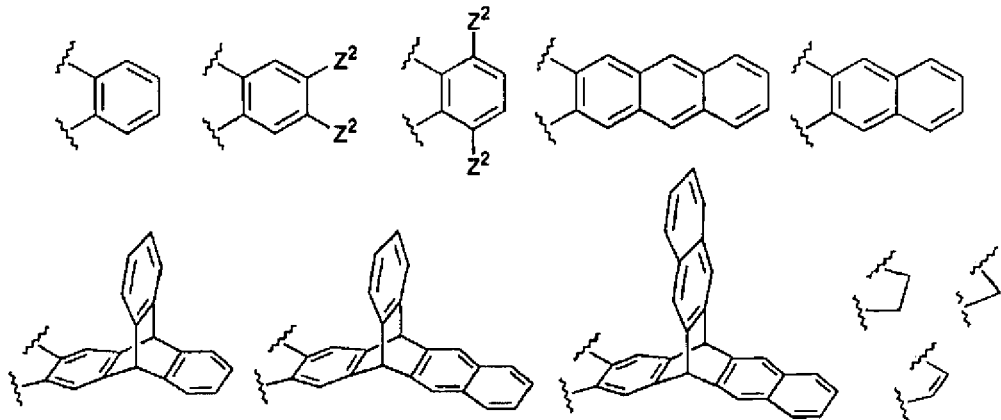

UNITED STATES PATENT AND TRADEMARK OFFICE
CERTIFICATE OF CORRECTION

PATENT NO.        : 7,186,355 B2
APPLICATION NO.   : 09/777725
DATED             : March 6, 2007
INVENTOR(S)       : Timothy M. Swager It is certified that error appears in the above-identified patent and that said Letters Patent is hereby corrected as shown below:

wherein any hydrogen in G, H, I and J can be substituted by $R^2$, $R^2$ is selected from the group consisting of $C_1$-$C_{20}$ alkyl, aryl, $C_1$-$C_{20}$ alkoxy, phenoxy, $C_1$-$C_{20}$ thioalkyl, thioaryl, $C(O)OR^3$, $N(R^3)(R^4)$, $C(O)N(R^3)(R^4)$, F, Cl, Br, I, $NO_2$, CN, acyl, carboxylate, hydroxy, $R^3$ and $R^4$ can be the same or different and each is selected from the group consisting of hydrogen, $C_1$-$C_{20}$ alkyl, and aryl, $Z^1$ is selected from the group consisting of O, S and $NR^8$ wherein $R^8$ is selected from the group consisting of hydrogen, $C_1$-$C_{20}$ alkyl, and aryl, and $Z^2$ is selected from the group consisting of F, Cl, $OR^3$, $SR^3$, $NR^3R^4$ and $SiR^8R^3R^4$.

In some embodiments, A may be selected from the group consisting of:

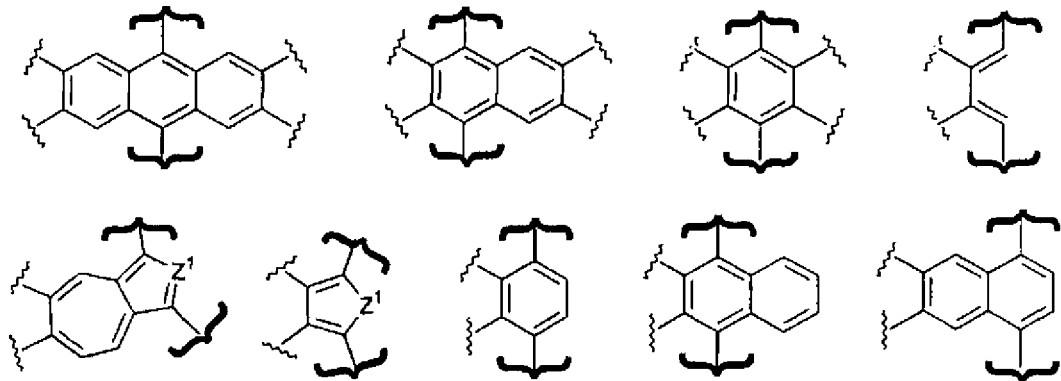

wherein any hydrogen in A can be substituted by $R^5$, $R^5$ is selected from the group consisting of $C_1$-$C_{20}$ alkyl, aryl, $C_1$-$C_{20}$ alkoxy, phenoxy, $C_1$-$C_{20}$ thioalkyl, thioaryl, $C(O)OR^6$, $N(R^6)(R^7)$, $C(O)N(R^6)(R^7)$, F, Cl, Br, $NO_2$, CN, acyl, carboxylate, hydroxy; $R^6$ and $R^7$ can be the same or different and each is selected from the group consisting of hydrogen, $C_1$-$C_{20}$ alkyl, and aryl; $Z^1$ is selected from the group consisting of O, S and $NR^8$

UNITED STATES PATENT AND TRADEMARK OFFICE
CERTIFICATE OF CORRECTION

PATENT NO.          : 7,186,355 B2
APPLICATION NO. : 09/777725
DATED                  : March 6, 2007
INVENTOR(S)       : Timothy M. Swager It is certified that error appears in the above-identified patent and that said Letters Patent is hereby corrected as shown below:

and $R^8$ is selected from the group consisting of hydrogen, $C_1$-$C_{20}$ alkyl, and aryl; B and D can be the same or different and each is selected from the group consisting of:

wherein any hydrogen in B and D can be substituted by $R^9$, $R^9$ is selected from the group consisting of $C_1$-$C_{20}$ alkyl, aryl, $C_1$-$C_{20}$ alkoxy, phenoxy, $C_1$-$C_{20}$ thioalkyl, thioaryl, $C(O)OR^{10}$, $N(R^{10})(R^{11})$, $C(O)N(R^{10})(R^{11})$, F, Cl, Br, $NO_2$, CN, acyl, carboxylate, hydroxy, $R^{10}$ and $R^{11}$ can be the same or different and each is selected from the group consisting of hydrogen, $C_1$-$C_{20}$ alkyl, and aryl; C may be selected from the aromatic group consisting of:

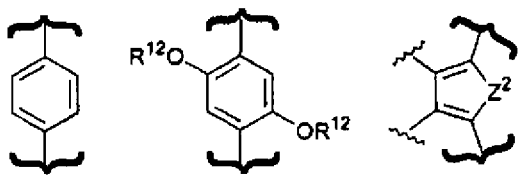

wherein $R^{12}$ is selected from the group consisting of hydrogen, $C_1$-$C_{20}$ alkyl and aryl; any hydrogen in C can be substituted by F which is represented by $R^{13}$, $R^{13}$ is selected from the group consisting of $C_1$-$C_{20}$ alkyl, aryl, $C_1$-$C_{20}$ alkoxy, phenoxy, $C_1$-$C_{20}$ thioalkyl, thioaryl, $C(O)OR^{14}$, $N(R^{14})(R^{15})$, $C(O)N(R^{14})(R^{15})$, F, Cl, Br, $NO_2$, CN, acyl, carboxylate, hydroxy; $R^{14}$ and $R^{15}$ can be the same or different and each is selected from

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

the group consisting of hydrogen, $C_1$-$C_{20}$ alkyl, and aryl; $Z^2$ is selected from the group consisting of O, S and $NR^{16}$ and $R^{16}$ is selected from the group consisting of hydrogen, $C_1$-$C_{20}$ alkyl, and aryl.

In one set of embodiments, A may be selected from the group consisting of:

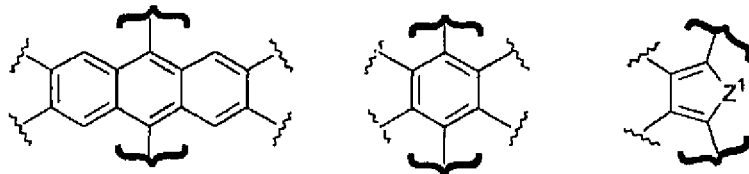

and both B and D may be:

In the Claims, column 28, line 36, please add the following:

-- 5. The article of claim 1, wherein the conducting polymer is selected from the group consisting of polyaniline, polythiophene, polypyrrole, polyphenylene, polyarylene, poly(bisthiophene phenylene), a conjugated ladder polymer, polyiptycene, polytriphenylene, poly(arylene vinylene), poly(arylene ethynylene), and organic and transition metal derivatives thereof.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

6. The article of claim 1, wherein a portion of the conducting polymer comprises a multi-dentate ligand.

7. The article of claim 1, further comprising a metal ion bonded to a portion of the conducting polymer.

8. The article of claim 1, wherein the nanoscopic pathway comprises a pathway of nanoparticles.

9. The article of claim 8, wherein the nanoparticles are selected from the group consisting of nanotubes, metal clusters, semiconductor clusters, colloids and fibers.

10. The article of claim 9, wherein the nanotubes are selected from the group consisting of carbon nanotubes and metallized nanotubes.

11. The article of claim 9, wherein the colloids are selected from the group consisting of gold colloids and silver colloids.

12. The article of claim 9, wherein the colloids comprise colloidal aggregates.

13. The article of claim 9, wherein the fibers comprise graphite.

14. The article of claim 1, wherein the nanoscopic pathway comprises a biological species.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

15. The article of claim 14, wherein the biological species is selected from the group consisting of DNA and redox-active enzymes.

16. The article of claim 1, wherein the nanoscopic pathway includes a metal ion.

17. The article of claim 16, wherein the metal ion is selected from the group consisting of transition metals, lanthanides and actinides.

18. The article of claim 16, wherein the metal ion is selected from the group consisting of iron, copper, nickel, cobalt, ruthenium, iridium, manganese, chromium, molybdenum, vanadium, uranium.

20. The article of claim 19, wherein the dielectric comprises a polymer.

21. The article of claim 20, wherein the dielectric polymer is selected from the group consisting of polyolefins, polyesters, polyamides, polyarylenes, polyethers, polyketones, polyarylsulfides, fluoropolymers, polyacrylates, polymethacrylates, polysiloxanes, polystyrene, polyurethanes, proteins and derivatives thereof.

22. The article of claim 20, wherein the dielectric polymer comprises a gel.

23. The article of claim 20, wherein the dielectric polymer is attached to the conducting polymer.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

24. The article of claim 23, wherein the dielectric polymer is attached to the conducting polymer via a chemical bond.

25. The article of claim 24, wherein the dielectric polymer is chemically bonded to the conducting polymer via a metal ion.

26. The article of claim 19, wherein the ceramic is selected from the group consisting of a metal oxide and a mixed metal oxide.

27. The article of claim 26, wherein the ceramic is a silicate.

28. The article of claim 27, wherein the silicate is a porous silicate.

29. The article of claim 1, wherein the dielectric comprises a biological species.

30. The article of claim 1, wherein the dielectric includes a metal ion.

31. The article of claim 1, wherein at least a portion of the nanoscopic pathway or the dielectric comprises a block co-polymer.

32. The article of claim 31, wherein the block co-polymer includes blocks comprising a dielectric.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

33. The article of claim 32, wherein the dielectric is selected from the group consisting of polyolefins, polyesters, polyamides, polyarylenes, polyethers, polyketones, polyarylsulfides, fluoropolymers, polyacrylates, polymethacrylates, polysiloxanes, polystyrene, polyurethanes, proteins and derivatives thereof.

34. The article of claim 31, wherein the block co-polymer includes blocks comprising a conducting material.

35. The article of claim 34, wherein the blocks comprising a conducting material is selected from the group consisting of a conjugated organic group and nanoparticles.

36. The article of claim 35, wherein the conjugated organic group is selected from the group consisting of polyaniline, polythiophene, polypyrrole, polyphenylene, polyarylene, poly(bisthiophene phenylene), a carbon ladder polymer, polyiptycene, polytriphenylene, poly(arylene vinylene), poly(arylene ethynylene), and organic and transition metal derivatives thereof.

37. The article of claim 35, wherein the nanoparticles are selected from the group consisting of nanotubes, metal clusters, colloids, and fibers.

38. The article of claim 1, wherein the dielectric is non-conducting at a first electrochemical potential range and is capable of having a resistivity of less than $10^{-4}$ times a resistivity at a second chemical potential.

UNITED STATES PATENT AND TRADEMARK OFFICE
CERTIFICATE OF CORRECTION

| | |
|---|---|
| PATENT NO. | : 7,186,355 B2 |
| APPLICATION NO. | : 09/777725 |
| DATED | : March 6, 2007 |
| INVENTOR(S) | : Timothy M. Swager |

It is certified that error appears in the above-identified patent and that said Letters Patent is hereby corrected as shown below:

39. The article of claim 1, wherein the nanoscopic switch is positioned in at least a portion of the dielectric.

40. The article of claim 1, wherein the nanoscopic switch is positioned in the nanoscopic pathway.

41. The article of claim 1, wherein the nanoscopic switch and the nanoscopic pathway are capable of being redox-matched.

42. The article of claim 1, wherein the nanoscopic switch is redox-active.

43. The article of claim 1, wherein the nanoscopic switch is a metal ion.

44. The article of claim 1, wherein the nanoscopic switch comprises a biological species selected from the group consisting of DNA and a redox-active enzyme.

45. The article of claim 1, wherein the nanoscopic switch is attached to a portion of the conducting polymer.

46. The article of claim 1, wherein the nanoscopic switch is capable of being activated to alter the conductivity of the nanoscopic pathway.

47. The article of claim 46, wherein the nanoscopic switch is capable of altering the conductivity upon binding to an analyte.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

48. The article of claim 1, wherein the nanoscopic pathway is a conductor within a first electrochemical potential range.

49. The article of claim 48, wherein the nanoscopic pathway is a first nanoscopic pathway, and the dielectric comprises a second nanoscopic pathway.

50. The article of claim 49, wherein the second pathway is a conductor within a second electrochemical potential range.

51. The article of claim 50, wherein the second electrochemical potential range is greater than the first electrochemical potential range.

52. The article of claim 49, wherein the second pathway is DNA.

53. The article of claim 1, wherein the nanoscopic pathway and the nanoscopic switch are redox-matched.

54. The article of claim 53, wherein the nanoscopic pathway and the nanoscopic switch are redox-matched within a defined electrochemical potential range.

55. The article of claim 16, wherein the nanoscopic pathway and metal ion are not redox-matched when the metal ion has a first ligand environment, and wherein the nanoscopic pathway and the metal ion are redox matched when the metal ion has a second ligand environment.

UNITED STATES PATENT AND TRADEMARK OFFICE
CERTIFICATE OF CORRECTION

PATENT NO.         : 7,186,355 B2
APPLICATION NO. : 09/777725
DATED                  : March 6, 2007
INVENTOR(S)        : Timothy M. Swager It is certified that error appears in the above-identified patent and that said Letters Patent is hereby corrected as shown below:

56. A sensor comprising the article of claim 1, for detecting the presence of an analyte.

57. The sensor of claim 56, wherein the nanoscopic switch is a detection site for the analyte.

58. The sensor of claim 57, wherein the sensor further comprises two electrodes positioned at either end of the nanoscopic pathway.

59. The article of claim 1, wherein the conducting polymer has a structure comprising the formula:

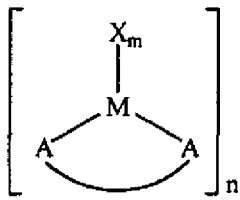

wherein M is a metal ion, n denotes a number of monomer units, n being at least 3, the polymeric structure comprising linkages through at least one atom in $\overset{A\ \frown\ A}{}$, and $\overset{A\ \frown\ A}{}$ and X are selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR1, —CO2C($R^1$)$_3$, —CONC($R^1$)$_2$, cyano, nitro, alkyloxy, aryloxy, hydroxyl, hydroxyalkyl, amino, alkylamino, dialkylamino, arylamino, diarylamino,

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

—$NR^1COR^2$, thioalkyl, thioaryl, —$SO_2R^1$, —$SOR^1$, —$SO_2OR^1$, F, Cl, Br, and I; $R^1$ and $R^2$ can be the same or different, and each is selected from the group consisting of hydrogen, C1-C10 alkyl, C1-C10 heteroalkyl, aryl, heteroaryl, hydroxy, F, Cl, Br, and I, and m = 0 - 3.

60. The article of claim 4, wherein the structure comprises a 1-, 2- or 3-dimensional array of n monomer units.

61. The article of claim 1, wherein the conducting polymer has a structure comprising the formula:

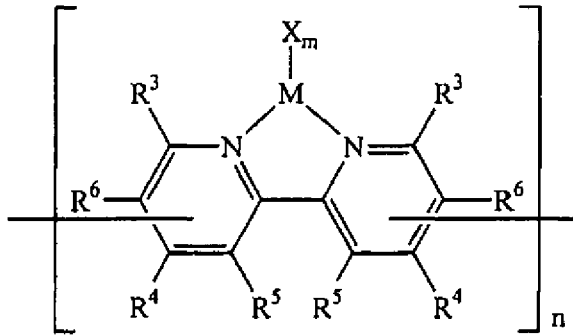

wherein M is a metal ion, n denotes a number of monomer units, n being at least 3, and the polymeric structure comprises linkages through at least one of any $R^3$ - $R^6$ units or X and $R^3$ - $R^6$ can be the same or different, and each is selected from the group consisting of hydrogen, $C_1$-$C_{10}$ alkyl, $C_1$-$C_{10}$ heteroalkyl, aryl, heteroaryl, carbonyl, acyl, acyloxy, —CHO, —$COOR^1$, —$CO_2C(R^1)_3$, —$CONC(R^1)_2$, cyano, nitro, hydroxy, hydroxyalkyl, amino, alkylamino, dialkylamino, arylamino, diarylamino, —$NR^1COR^2$, thioalkyl,

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

thioaryl, —$SO_2R^1$, —$SOR^1$, —$SO_2OR^1$, F, Cl, Br, I, or where possible, any two R groups combining to form a ring structure; $R^1$ and $R^2$ can be the same or different, and each is selected from the group consisting of hydrogen, $C_1$-$C_{10}$ alkyl, $C_1$-$C_{10}$ heteroalkyl, aryl, heteroaryl, hydroxy, F, Cl, Br, and I; and X is selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —$COOR^1$, —$CO2C(R^1)_3$, —$CONC(R^1)_2$, cyano, alkyloxy, aryloxy, hydroxy, hydroxyalkyl, amino, alkylamino, dialkylamino, arylamino, diarylamino, —$NR^1COR^2$, thioalkyl, thioaryl, —$SO_2R^1$, —$SOR^1$, —$SO_2OR^1$, F, Cl, Br, and I; $R^1$ and $R^2$ can be the same or different, and each is selected from the group consisting of hydrogen, $C_1$-$C_{10}$ alkyl, $C_1$-$C_{10}$ heteroalkyl, aryl, heteroaryl, hydroxy, F, Cl, Br, and I, and m = 0 - 3.

62. The article of claim 61, wherein the structure comprises a 1-, 2- or 3-dimensional array of n monomer units.

63. The article of claim 61, wherein R3 or R6 comprises the formula:

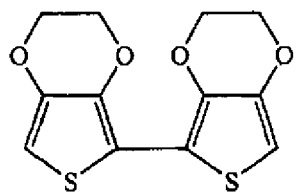

UNITED STATES PATENT AND TRADEMARK OFFICE
CERTIFICATE OF CORRECTION

| | |
|---|---|
| PATENT NO. | : 7,186,355 B2 |
| APPLICATION NO. | : 09/777725 |
| DATED | : March 6, 2007 |
| INVENTOR(S) | : Timothy M. Swager |

It is certified that error appears in the above-identified patent and that said Letters Patent is hereby corrected as shown below:

64. The article of claim 61, wherein X comprises the formula:

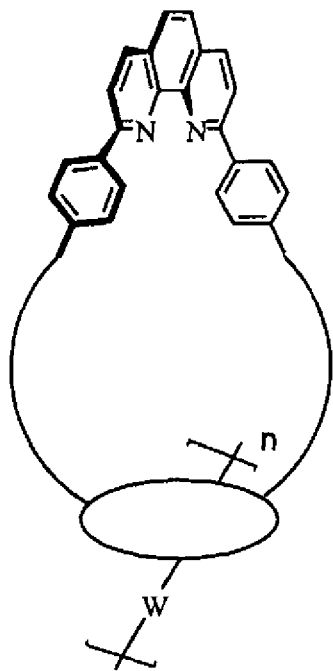

wherein ( ) comprises two continuous chains of atoms and 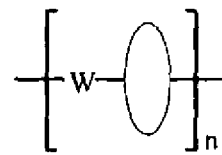 comprises a species selected from the group consisting of a dielectric and a conductive nanoscopic pathway, and n is an integer greater than 0.

UNITED STATES PATENT AND TRADEMARK OFFICE
CERTIFICATE OF CORRECTION

PATENT NO.         : 7,186,355 B2
APPLICATION NO.    : 09/777725
DATED              : March 6, 2007
INVENTOR(S)        : Timothy M. Swager It is certified that error appears in the above-identified patent and that said Letters Patent is hereby corrected as shown below:

65. The article of claim 64, wherein the continuous chains of atoms comprises chains of methylene units optionally interrupted by an atom selected from the group consisting of oxygen, nitrogen, sulfur and phosphorus.

66. The article of claim 64, wherein the continuous chains comprise chains of ethylene.

67. The article of claim 1, wherein X comprises the formula:

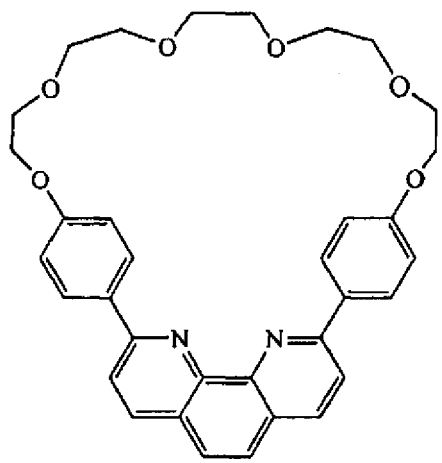

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

68. The article of claim 1, wherein the conducting polymer has a structure comprising the formula:

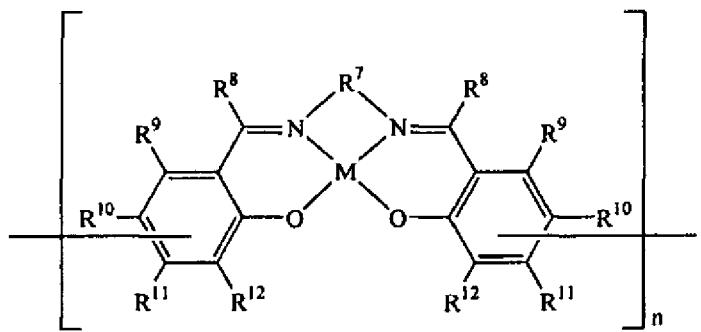

wherein M is a metal ion, n denotes a number of monomer units, n being at least 3, the polymeric structure comprising linkages through at least one atom in $R^7 - R^{12}$ units, and $R^7 - R^{12}$ can be the same or different, and each is selected from the group consisting of hydrogen, $C_1$-$C_{10}$ alkyl, $C_1$-$C_{10}$ heteroalkyl, aryl, heteroaryl, carbonyl, acyl, acyloxy, —CHO, —COOR$^1$, —CO$_2$C(R$^1$)$_3$, —CONC(R$^1$)$_2$, cyano, nitro, hydroxy, hydroxyalkyl, amino, alkylamino, dialkylamino, arylamino, diarylamino, —NR$^1$COR$^2$, thioalkyl, thioaryl, —SO$_2$R$^1$, —SOR$^1$, —SO$_2$OR$^1$, F, Cl, Br, and I, or where possible, any two R groups combining to form a ring structure; $R^1$ and $R^2$ can be the same or different, and each is selected from the group consisting of hydrogen, $C_1$-$C_{10}$ alkyl, $C_1$-$C_{10}$ heteroalkyl, aryl, heteroaryl, hydroxy, F, Cl, Br, and I.

69. The article of claim 68, wherein the structure comprises a 1-, 2- or 3-dimensional array of n monomer units.

UNITED STATES PATENT AND TRADEMARK OFFICE
CERTIFICATE OF CORRECTION

PATENT NO.        : 7,186,355 B2
APPLICATION NO. : 09/777725
DATED             : March 6, 2007
INVENTOR(S)       : Timothy M. Swager It is certified that error appears in the above-identified patent and that said Letters Patent is hereby corrected as shown below:

70. The article of claim 68, wherein $R^{10}$ is:

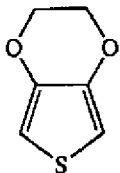

71. The article of claim 1, wherein the conducting polymer has a structure comprising the formula:

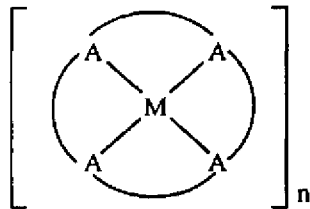

wherein M is a metal ion, n denotes a number of monomer units, n being at least 3, the polymeric structure comprising linkages through at least one atom in , and any ⌣ unit or X is selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR$^1$, —CO$_2$C(R$^1$)$_3$, —CONC(R$^1$)$_2$, cyano, nitro, alkyloxy, aryloxy,

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

hydroxyl, hydroxyalkyl, amino, alkylamino, dialkylamino, arylamino, diarylamino, —$NR^1COR^2$, thioalkyl, thioaryl, —$SO_2R^1$, —$SOR^1$, —$SO_2OR^1$, F, Cl, Br, and I; $R^1$ and $R^2$ can be the same or different, and each is selected from the group consisting of hydrogen, $C_1$-$C_{10}$ alkyl, $C_1$-$C_{10}$ heteroalkyl, aryl, heteroaryl, hydroxy, F, Cl, Br, and I, and m = 0-2.

72. The article of claim 71, wherein the structure comprises a 1-, 2- or 3- dimensional array of n monomer units.

73. The article of claim 71, wherein the four  units comprise a macrocycle.

74. The article of claim 73, wherein the macrocycle is selected from the group consisting of cyclams, phthalocyanines and porphyrins.

75. The article of claim 73, wherein the metal ion is a transition metal ion. --

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

Delete the title page and substitute therefor the attached title page.

In the Specification:

At column 1, line 10, please add the following:

-- Statement Regarding Federally Sponsored Research or Development

This invention was made with the support under the following government contract: N00014-97-1-0174 awarded by the Office of Naval Research. The government has certain rights in the invention. --

At column 8, line 27, please add the following:

-- In some embodiments, an article of the present invention may comprise a nanoscopic pathway having a conductivity, an insulating dielectric surrounding the nanoscopic pathway, and a nanoscopic switch in electronic communication with the nanoscopic pathway being capable of altering the conductivity of the nanoscopic pathway. The nanoscopic pathway may comprise a conducting polymer, wherein the conducting polymer has a structure comprising the formula:

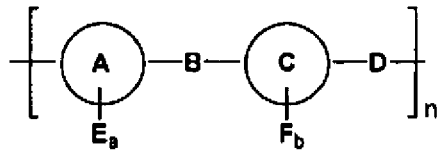

UNITED STATES PATENT AND TRADEMARK OFFICE
CERTIFICATE OF CORRECTION

| | | |
|---|---|---|
| PATENT NO. | : 7,186,355 B2 | |
| APPLICATION NO. | : 09/777725 | |
| DATED | : March 6, 2007 | |
| INVENTOR(S) | : Timothy M. Swager | |

It is certified that error appears in the above-identified patent and that said Letters Patent is hereby corrected as shown below:

wherein A and C are aromatic groups; B and D can be a heteroatom or metal and chosen from a group of N, P, S, As, Se, or -CC-M-CC-(M=$FeL_x$, $RuL_x$, $PdL_x$, $PtL_x$, $CoL_x$, $RhL_x$, where L is neutral (phosphine, nitrogen, or π-arene based ligand) or charged (nitrogen, oxygen, or charged π-arene ligand), or are selected from the group consisting of a carbon-carbon double bond and a carbon-carbon triple bond; and any hydrogen on aromatic group A and C can be replaced by E and F respectively, wherein a and b are integers which can be the same or different and a = 0 - 4, b = 0 - 4 such that when a = 0, b is nonzero and when b = 0, a is nonzero, and at least one of E and F includes a bicyclic ring system having aromatic or non-aromatic groups optionally interrupted by O, S, $NR^1$ and $CR^1_2$ wherein $R^1$ is selected from the group consisting of hydrogen, $C_1$-$C_{20}$ alkyl, $C_1$-$C_{20}$ alkoxy and aryl and n is less than about 10,000, and wherein, when E or F is not said bicyclic ring system, E or F is a part of aromatic group A or C.

In some cases, $E_a$ may be covalently attached to A, and the conducting polymer comprises the structure:

UNITED STATES PATENT AND TRADEMARK OFFICE
CERTIFICATE OF CORRECTION

| | |
|---|---|
| PATENT NO. | : 7,186,355 B2 |
| APPLICATION NO. | : 09/777725 |
| DATED | : March 6, 2007 |
| INVENTOR(S) | : Timothy M. Swager |

It is certified that error appears in the above-identified patent and that said Letters Patent is hereby corrected as shown below:

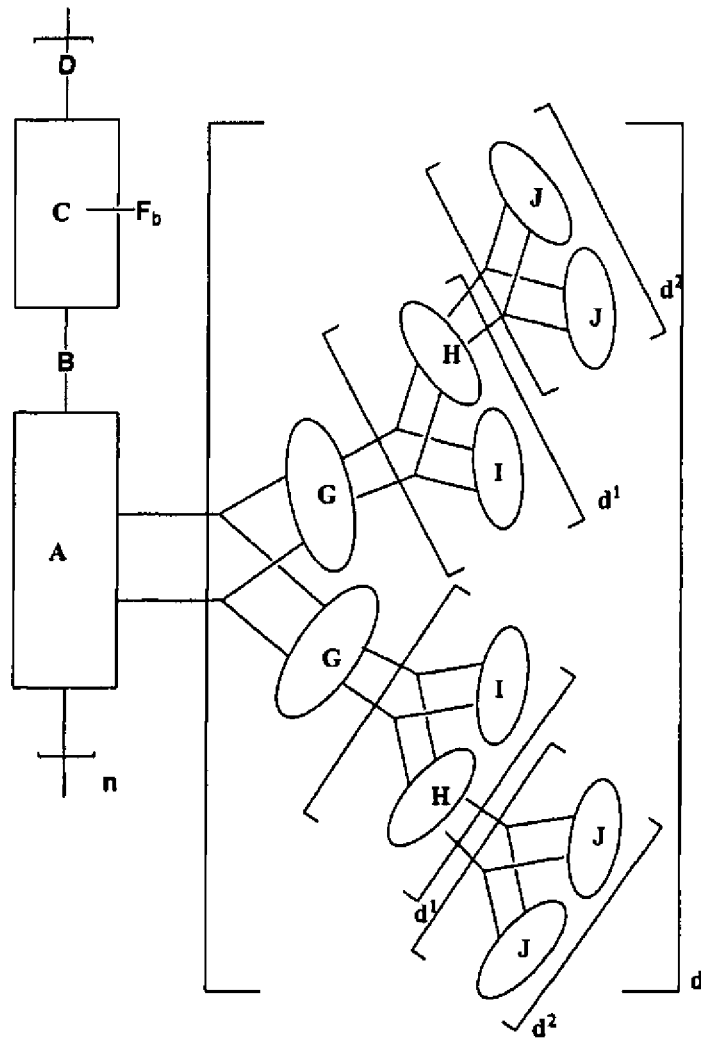

UNITED STATES PATENT AND TRADEMARK OFFICE
CERTIFICATE OF CORRECTION

PATENT NO. : 7,186,355 B2  Page 4 of 23
APPLICATION NO. : 09/777725
DATED : March 6, 2007
INVENTOR(S) : Timothy M. Swager It is certified that error appears in the above-identified patent and that said Letters Patent is hereby corrected as shown below:

wherein G, H, I, and J are aromatic groups, $d = 1, 2$, and $d^1 = 0, 1$, such that when $d^1 = 0$, $d^2 = 0$ and when $d^1 = 1$, $d^2 = 0, 1$. In some embodiments, G and H may be the same or different, and each may be selected from the group consisting of:

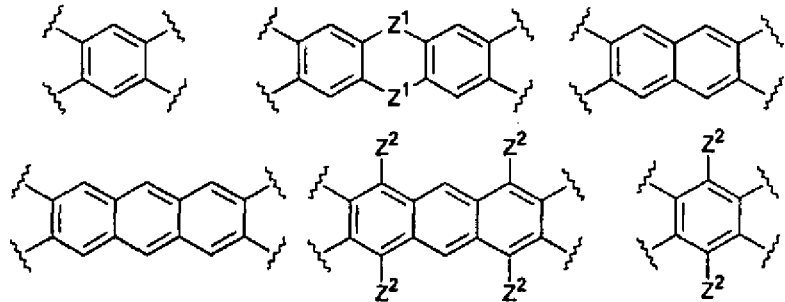

In some embodiments, I and J may be the same or different and each is selected from the group consisting of:

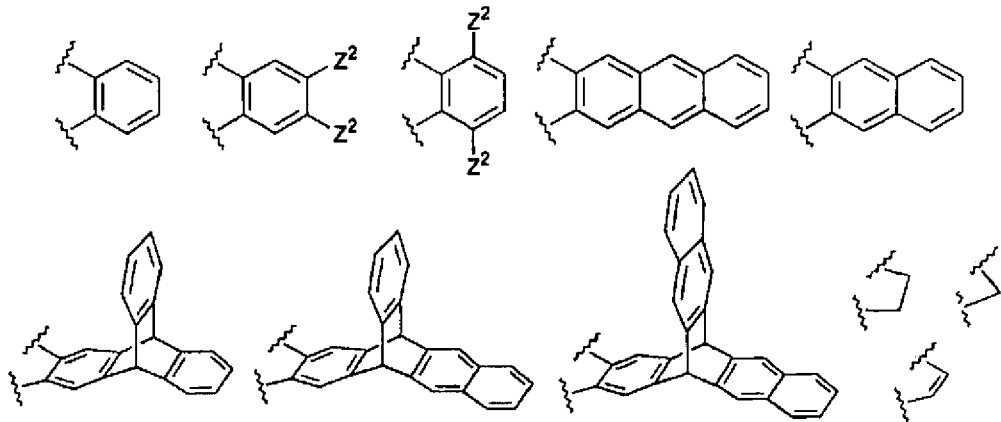

UNITED STATES PATENT AND TRADEMARK OFFICE
CERTIFICATE OF CORRECTION

PATENT NO.          : 7,186,355 B2
APPLICATION NO.  : 09/777725
DATED                   : March 6, 2007
INVENTOR(S)         : Timothy M. Swager It is certified that error appears in the above-identified patent and that said Letters Patent is hereby corrected as shown below:

wherein any hydrogen in G, H, I and J can be substituted by $R^2$, $R^2$ is selected from the group consisting of $C_1$-$C_{20}$ alkyl, aryl, $C_1$-$C_{20}$ alkoxy, phenoxy, $C_1$-$C_{20}$ thioalkyl, thioaryl, $C(O)OR^3$, $N(R^3)(R^4)$, $C(O)N(R^3)(R^4)$, F, Cl, Br, I, $NO_2$, CN, acyl, carboxylate, hydroxy, $R^3$ and $R^4$ can be the same or different and each is selected from the group consisting of hydrogen, $C_1$-$C_{20}$ alkyl, and aryl, $Z^1$ is selected from the group consisting of O, S and $NR^8$ wherein $R^8$ is selected from the group consisting of hydrogen, $C_1$-$C_{20}$ alkyl, and aryl, and $Z^2$ is selected from the group consisting of F, Cl, $OR^3$, $SR^3$, $NR^3R^4$ and $SiR^8R^3R^4$.

In some embodiments, A may be selected from the group consisting of:

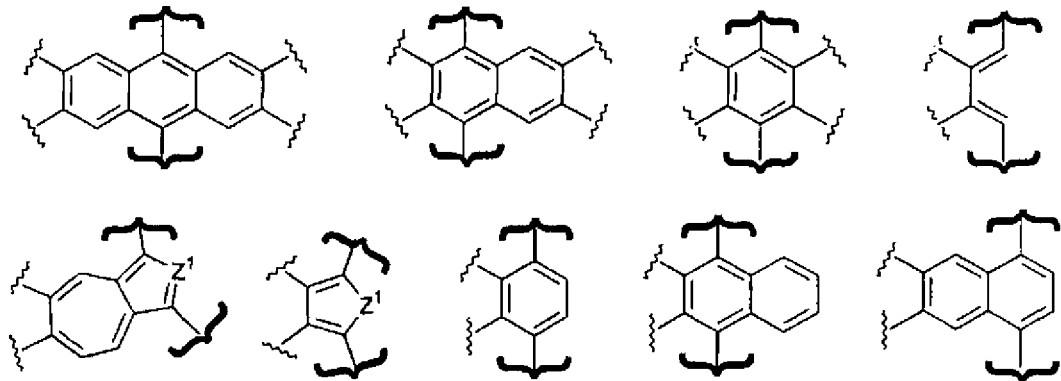

wherein any hydrogen in A can be substituted by $R^5$, $R^5$ is selected from the group consisting of $C_1$-$C_{20}$ alkyl, aryl, $C_1$-$C_{20}$ alkoxy, phenoxy, $C_1$-$C_{20}$ thioalkyl, thioaryl, $C(O)OR^6$, $N(R^6)(R^7)$, $C(O)N(R^6)(R^7)$, F, Cl, Br, $NO_2$, CN, acyl, carboxylate, hydroxy; $R^6$ and $R^7$ can be the same or different and each is selected from the group consisting of hydrogen, $C_1$-$C_{20}$ alkyl, and aryl; $Z^1$ is selected from the group consisting of O, S and $NR^8$

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

and $R^8$ is selected from the group consisting of hydrogen, $C_1$-$C_{20}$ alkyl, and aryl; B and D can be the same or different and each is selected from the group consisting of:

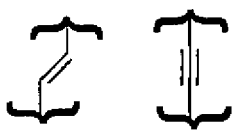

wherein any hydrogen in B and D can be substituted by $R^9$, $R^9$ is selected from the group consisting of $C_1$-$C_{20}$ alkyl, aryl, $C_1$-$C_{20}$ alkoxy, phenoxy, $C_1$-$C_{20}$ thioalkyl, thioaryl, $C(O)OR^{10}$, $N(R^{10})(R^{11})$, $C(O)N(R^{10})(R^{11})$, F, Cl, Br, $NO_2$, CN, acyl, carboxylate, hydroxy, $R^{10}$ and $R^{11}$ can be the same or different and each is selected from the group consisting of hydrogen, $C_1$-$C_{20}$ alkyl, and aryl; C may be selected from the aromatic group consisting of:

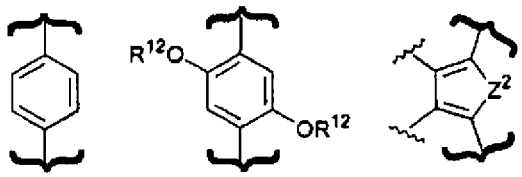

wherein $R^{12}$ is selected from the group consisting of hydrogen, $C_1$-$C_{20}$ alkyl and aryl; any hydrogen in C can be substituted by F which is represented by $R^{13}$, $R^{13}$ is selected from the group consisting of $C_1$-$C_{20}$ alkyl, aryl, $C_1$-$C_{20}$ alkoxy, phenoxy, $C_1$-$C_{20}$ thioalkyl, thioaryl, $C(O)OR^{14}$, $N(R^{14})(R^{15})$, $C(O)N(R^{14})(R^{15})$, F, Cl, Br, $NO_2$, CN, acyl, carboxylate, hydroxy; $R^{14}$ and $R^{15}$ can be the same or different and each is selected from

UNITED STATES PATENT AND TRADEMARK OFFICE
CERTIFICATE OF CORRECTION

PATENT NO. : 7,186,355 B2  Page 7 of 23
APPLICATION NO. : 09/777725
DATED : March 6, 2007
INVENTOR(S) : Timothy M. Swager It is certified that error appears in the above-identified patent and that said Letters Patent is hereby corrected as shown below:

the group consisting of hydrogen, $C_1$-$C_{20}$ alkyl, and aryl; $Z^2$ is selected from the group consisting of O, S and $NR^{16}$ and $R^{16}$ is selected from the group consisting of hydrogen, $C_1$-$C_{20}$ alkyl, and aryl.

In one set of embodiments, A may be selected from the group consisting of:

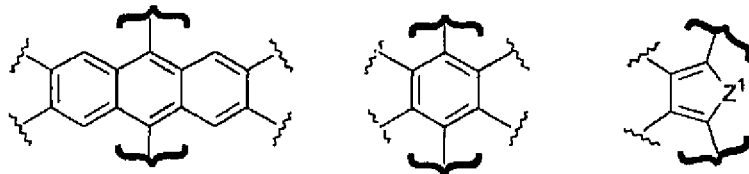

and both B and D may be:

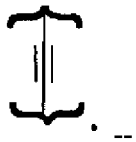

. --

In the Claims, column 28, line 36, please add the following:

-- 5. The article of claim 1, wherein the conducting polymer is selected from the group consisting of polyaniline, polythiophene, polypyrrole, polyphenylene, polyarylene, poly(bisthiophene phenylene), a conjugated ladder polymer, polyiptycene, polytriphenylene, poly(arylene vinylene), poly(arylene ethynylene), and organic and transition metal derivatives thereof.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

6. The article of claim 1, wherein a portion of the conducting polymer comprises a multi-dentate ligand.

7. The article of claim 1, further comprising a metal ion bonded to a portion of the conducting polymer.

8. The article of claim 1, wherein the nanoscopic pathway comprises a pathway of nanoparticles.

9. The article of claim 8, wherein the nanoparticles are selected from the group consisting of nanotubes, metal clusters, semiconductor clusters, colloids and fibers.

10. The article of claim 9, wherein the nanotubes are selected from the group consisting of carbon nanotubes and metallized nanotubes.

11. The article of claim 9, wherein the colloids are selected from the group consisting of gold colloids and silver colloids.

12. The article of claim 9, wherein the colloids comprise colloidal aggregates.

13. The article of claim 9, wherein the fibers comprise graphite.

14. The article of claim 1, wherein the nanoscopic pathway comprises a biological species.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

15. The article of claim 14, wherein the biological species is selected from the group consisting of DNA and redox-active enzymes.

16. The article of claim 1, wherein the nanoscopic pathway includes a metal ion.

17. The article of claim 16, wherein the metal ion is selected from the group consisting of transition metals, lanthanides and actinides.

18. The article of claim 16, wherein the metal ion is selected from the group consisting of iron, copper, nickel, cobalt, ruthenium, iridium, manganese, chromium, molybdenum, vanadium, uranium.

20. The article of claim 19, wherein the dielectric comprises a polymer.

21. The article of claim 20, wherein the dielectric polymer is selected from the group consisting of polyolefins, polyesters, polyamides, polyarylenes, polyethers, polyketones, polyarylsulfides, fluoropolymers, polyacrylates, polymethacrylates, polysiloxanes, polystyrene, polyurethanes, proteins and derivatives thereof.

22. The article of claim 20, wherein the dielectric polymer comprises a gel.

23. The article of claim 20, wherein the dielectric polymer is attached to the conducting polymer.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

24. The article of claim 23, wherein the dielectric polymer is attached to the conducting polymer via a chemical bond.

25. The article of claim 24, wherein the dielectric polymer is chemically bonded to the conducting polymer via a metal ion.

26. The article of claim 19, wherein the ceramic is selected from the group consisting of a metal oxide and a mixed metal oxide.

27. The article of claim 26, wherein the ceramic is a silicate.

28. The article of claim 27, wherein the silicate is a porous silicate.

29. The article of claim 1, wherein the dielectric comprises a biological species.

30. The article of claim 1, wherein the dielectric includes a metal ion.

31. The article of claim 1, wherein at least a portion of the nanoscopic pathway or the dielectric comprises a block co-polymer.

32. The article of claim 31, wherein the block co-polymer includes blocks comprising a dielectric.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

33. The article of claim 32, wherein the dielectric is selected from the group consisting of polyolefins, polyesters, polyamides, polyarylenes, polyethers, polyketones, polyarylsulfides, fluoropolymers, polyacrylates, polymethacrylates, polysiloxanes, polystyrene, polyurethanes, proteins and derivatives thereof.

34. The article of claim 31, wherein the block co-polymer includes blocks comprising a conducting material.

35. The article of claim 34, wherein the blocks comprising a conducting material is selected from the group consisting of a conjugated organic group and nanoparticles.

36. The article of claim 35, wherein the conjugated organic group is selected from the group consisting of polyaniline, polythiophene, polypyrrole, polyphenylene, polyarylene, poly(bisthiophene phenylene), a carbon ladder polymer, polyiptycene, polytriphenylene, poly(arylene vinylene), poly(arylene ethynylene), and organic and transition metal derivatives thereof.

37. The article of claim 35, wherein the nanoparticles are selected from the group consisting of nanotubes, metal clusters, colloids, and fibers.

38. The article of claim 1, wherein the dielectric is non-conducting at a first electrochemical potential range and is capable of having a resistivity of less than $10^{-4}$ times a resistivity at a second chemical potential.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

39. The article of claim 1, wherein the nanoscopic switch is positioned in at least a portion of the dielectric.

40. The article of claim 1, wherein the nanoscopic switch is positioned in the nanoscopic pathway.

41. The article of claim 1, wherein the nanoscopic switch and the nanoscopic pathway are capable of being redox-matched.

42. The article of claim 1, wherein the nanoscopic switch is redox-active.

43. The article of claim 1, wherein the nanoscopic switch is a metal ion.

44. The article of claim 1, wherein the nanoscopic switch comprises a biological species selected from the group consisting of DNA and a redox-active enzyme.

45. The article of claim 1, wherein the nanoscopic switch is attached to a portion of the conducting polymer.

46. The article of claim 1, wherein the nanoscopic switch is capable of being activated to alter the conductivity of the nanoscopic pathway.

47. The article of claim 46, wherein the nanoscopic switch is capable of altering the conductivity upon binding to an analyte.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

48. The article of claim 1, wherein the nanoscopic pathway is a conductor within a first electrochemical potential range.

49. The article of claim 48, wherein the nanoscopic pathway is a first nanoscopic pathway, and the dielectric comprises a second nanoscopic pathway.

50. The article of claim 49, wherein the second pathway is a conductor within a second electrochemical potential range.

51. The article of claim 50, wherein the second electrochemical potential range is greater than the first electrochemical potential range.

52. The article of claim 49, wherein the second pathway is DNA.

53. The article of claim 1, wherein the nanoscopic pathway and the nanoscopic switch are redox-matched.

54. The article of claim 53, wherein the nanoscopic pathway and the nanoscopic switch are redox-matched within a defined electrochemical potential range.

55. The article of claim 16, wherein the nanoscopic pathway and metal ion are not redox-matched when the metal ion has a first ligand environment, and wherein the nanoscopic pathway and the metal ion are redox matched when the metal ion has a second ligand environment.

UNITED STATES PATENT AND TRADEMARK OFFICE
CERTIFICATE OF CORRECTION

PATENT NO.       : 7,186,355 B2
APPLICATION NO.  : 09/777725
DATED            : March 6, 2007
INVENTOR(S)      : Timothy M. Swager It is certified that error appears in the above-identified patent and that said Letters Patent is hereby corrected as shown below:

56. A sensor comprising the article of claim 1, for detecting the presence of an analyte.

57. The sensor of claim 56, wherein the nanoscopic switch is a detection site for the analyte.

58. The sensor of claim 57, wherein the sensor further comprises two electrodes positioned at either end of the nanoscopic pathway.

59. The article of claim 1, wherein the conducting polymer has a structure comprising the formula:

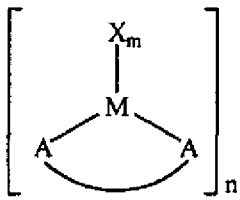

wherein M is a metal ion, n denotes a number of monomer units, n being at least 3, the polymeric structure comprising linkages through at least one atom in $\overset{A\frown A}{}$, and $\overset{A\frown A}{}$ and X are selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR1, —CO2C($R^1$)$_3$, —CONC($R^1$)$_2$, cyano, nitro, alkyloxy, aryloxy, hydroxyl, hydroxyalkyl, amino, alkylamino, dialkylamino, arylamino, diarylamino,

UNITED STATES PATENT AND TRADEMARK OFFICE
CERTIFICATE OF CORRECTION

PATENT NO. : 7,186,355 B2
DATED : March 6, 2007
INVENTOR(S) : Timothy M. Swager

It is certified that error appears in the above-identified patent and that said Letters Patent is hereby corrected as shown below:

—$NR^1COR^2$, thioalkyl, thioaryl, —$SO_2R^1$, —$SOR^1$, —$SO_2OR^1$, F, Cl, Br, and I; $R^1$ and $R^2$ can be the same or different, and each is selected from the group consisting of hydrogen, C1-C10 alkyl, C1-C10 heteroalkyl, aryl, heteroaryl, hydroxy, F, Cl, Br, and I, and m = 0 - 3.

60. The article of claim 4, wherein the structure comprises a 1-, 2- or 3-dimensional array of n monomer units.

61. The article of claim 1, wherein the conducting polymer has a structure comprising the formula:

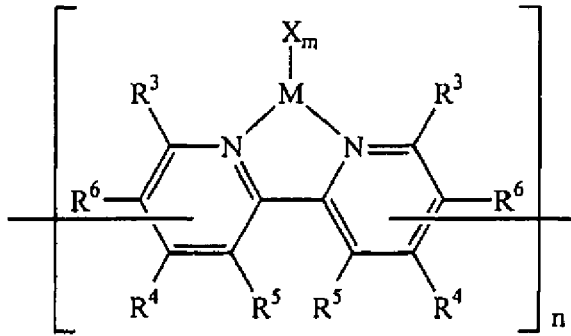

wherein M is a metal ion, n denotes a number of monomer units, n being at least 3, and the polymeric structure comprises linkages through at least one of any $R^3$ - $R^6$ units or X and $R^3$ - $R^6$ can be the same or different, and each is selected from the group consisting of hydrogen, $C_1$-$C_{10}$ alkyl, $C_1$-$C_{10}$ heteroalkyl, aryl, heteroaryl, carbonyl, acyl, acyloxy, —CHO, —$COOR^1$, —$CO_2C(R^1)_3$, —$CONC(R^1)_2$, cyano, nitro, hydroxy, hydroxyalkyl, amino, alkylamino, dialkylamino, arylamino, diarylamino, —$NR^1COR^2$, thioalkyl,

UNITED STATES PATENT AND TRADEMARK OFFICE
CERTIFICATE OF CORRECTION

PATENT NO.       : 7,186,355 B2
APPLICATION NO.  : 09/777725
DATED            : March 6, 2007
INVENTOR(S)      : Timothy M. Swager It is certified that error appears in the above-identified patent and that said Letters Patent is hereby corrected as shown below:

thioaryl, —$SO_2R^1$, —$SOR^1$, —$SO_2OR^1$, F, Cl, Br, I, or where possible, any two R groups combining to form a ring structure; $R^1$ and $R^2$ can be the same or different, and each is selected from the group consisting of hydrogen, $C_1$-$C_{10}$ alkyl, $C_1$-$C_{10}$ heteroalkyl, aryl, heteroaryl, hydroxy, F, Cl, Br, and I; and X is selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —$COOR^1$, —$CO2C(R^1)_3$, —$CONC(R^1)_2$, cyano, alkyloxy, aryloxy, hydroxy, hydroxyalkyl, amino, alkylamino, dialkylamino, arylamino, diarylamino, —$NR^1COR^2$, thioalkyl, thioaryl, —$SO_2R^1$, —$SOR^1$, —$SO_2OR^1$, F, Cl, Br, and I; $R^1$ and $R^2$ can be the same or different, and each is selected from the group consisting of hydrogen, $C_1$-$C_{10}$ alkyl, $C_1$-$C_{10}$ heteroalkyl, aryl, heteroaryl, hydroxy, F, Cl, Br, and I, and m = 0 - 3.

62. The article of claim 61, wherein the structure comprises a 1-, 2- or 3-dimensional array of n monomer units.

63. The article of claim 61, wherein R3 or R6 comprises the formula:

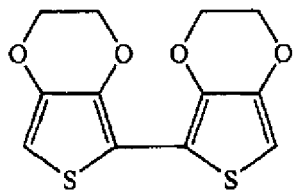

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

64. The article of claim 61, wherein X comprises the formula:

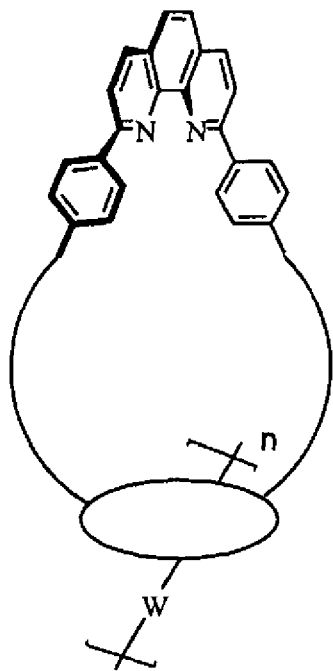

wherein ( ) comprises two continuous chains of atoms and 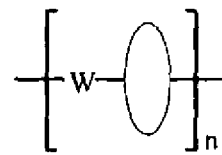

comprises a species selected from the group consisting of a dielectric and a conductive nanoscopic pathway, and n is an integer greater than 0.

UNITED STATES PATENT AND TRADEMARK OFFICE
CERTIFICATE OF CORRECTION

PATENT NO.      : 7,186,355 B2
APPLICATION NO. : 09/777725
DATED           : March 6, 2007
INVENTOR(S)     : Timothy M. Swager It is certified that error appears in the above-identified patent and that said Letters Patent is hereby corrected as shown below:

65. The article of claim 64, wherein the continuous chains of atoms comprises chains of methylene units optionally interrupted by an atom selected from the group consisting of oxygen, nitrogen, sulfur and phosphorus.

66. The article of claim 64, wherein the continuous chains comprise chains of ethylene.

67. The article of claim 1, wherein X comprises the formula:

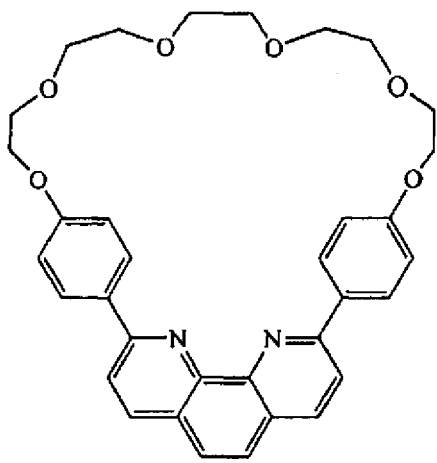

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

68. The article of claim 1, wherein the conducting polymer has a structure comprising the formula:

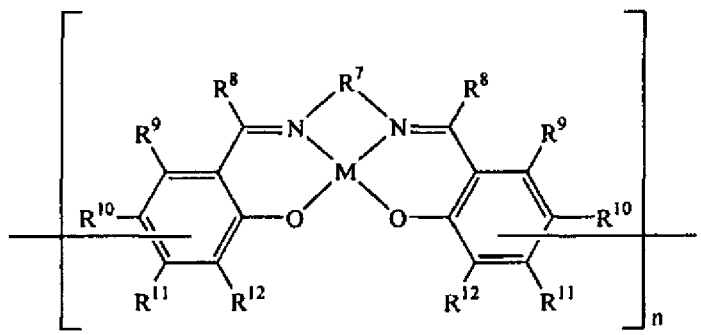

wherein M is a metal ion, n denotes a number of monomer units, n being at least 3, the polymeric structure comprising linkages through at least one atom in $R^7 - R^{12}$ units, and $R^7 - R^{12}$ can be the same or different, and each is selected from the group consisting of hydrogen, $C_1$-$C_{10}$ alkyl, $C_1$-$C_{10}$ heteroalkyl, aryl, heteroaryl, carbonyl, acyl, acyloxy, —CHO, —COOR$^1$, —CO$_2$C(R$^1$)$_3$, —CONC(R$^1$)$_2$, cyano, nitro, hydroxy, hydroxyalkyl, amino, alkylamino, dialkylamino, arylamino, diarylamino, —NR$^1$COR$^2$, thioalkyl, thioaryl, —SO$_2$R$^1$, —SOR$^1$, —SO$_2$OR$^1$, F, Cl, Br, and I, or where possible, any two R groups combining to form a ring structure; $R^1$ and $R^2$ can be the same or different, and each is selected from the group consisting of hydrogen, $C_1$-$C_{10}$ alkyl, $C_1$-$C_{10}$ heteroalkyl, aryl, heteroaryl, hydroxy, F, Cl, Br, and I.

69. The article of claim 68, wherein the structure comprises a 1-, 2- or 3-dimensional array of n monomer units.

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

70. The article of claim 68, wherein $R^{10}$ is:

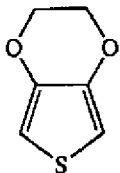

71. The article of claim 1, wherein the conducting polymer has a structure comprising the formula:

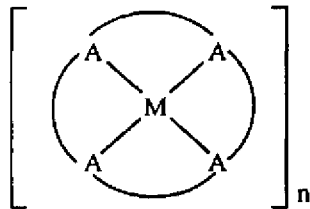

wherein M is a metal ion, n denotes a number of monomer units, n being at least 3, the polymeric structure comprising linkages through at least one atom in  and any unit or X is selected from the group consisting of alkyl, alkenyl, alkynyl, cycloalkyl, cycloalkenyl, cycloalkynyl, aryl, alkaryl, aralkyl and optionally interrupted or terminated by N, O, P, S, heteroalkyl, heteroaryl, carbonyl, acyl, acyloxy, —CHO, —COOR$^1$, —CO$_2$C(R$^1$)$_3$, —CONC(R$^1$)$_2$, cyano, nitro, alkyloxy, aryloxy,

UNITED STATES PATENT AND TRADEMARK OFFICE
CERTIFICATE OF CORRECTION

PATENT NO. : 7,186,355 B2
APPLICATION NO. : 09/777725
DATED : March 6, 2007
INVENTOR(S) : Timothy M. Swager It is certified that error appears in the above-identified patent and that said Letters Patent is hereby corrected as shown below:

hydroxyl, hydroxyalkyl, amino, alkylamino, dialkylamino, arylamino, diarylamino, —NR$^1$COR$^2$, thioalkyl, thioaryl, —SO$_2$R$^1$, —SOR$^1$, —SO$_2$OR$^1$, F, Cl, Br, and I; R$^1$ and R$^2$ can be the same or different, and each is selected from the group consisting of hydrogen, C$_1$-C$_{10}$ alkyl, C$_1$-C$_{10}$ heteroalkyl, aryl, heteroaryl, hydroxy, F, Cl, Br, and I, and m = 0-2.

72. The article of claim 71, wherein the structure comprises a 1-, 2- or 3- dimensional array of n monomer units.

73. The article of claim 71, wherein the four  units comprise a macrocycle.

74. The article of claim 73, wherein the macrocycle is selected from the group consisting of cyclams, phthalocyanines and porphyrins.

UNITED STATES PATENT AND TRADEMARK OFFICE
CERTIFICATE OF CORRECTION

PATENT NO.       : 7,186,355 B2
APPLICATION NO.  : 09/777725
DATED            : March 6, 2007
INVENTOR(S)      : Timothy M. Swager It is certified that error appears in the above-identified patent and that said Letters Patent is hereby corrected as shown below:

75. The article of claim 73, wherein the metal ion is a transition metal ion. --

This certificate supersedes the Certificate of Correction issued June 9, 2009.

Signed and Sealed this

Seventh Day of July, 2009

JOHN DOLL
*Acting Director of the United States Patent and Trademark Office*

United States Patent
Swager

(10) Patent No.: US 7,186,355 B2
(45) Date of Patent: Mar. 6, 2007

(54) INSULATED NANOSCOPIC PATHWAYS, COMPOSITIONS AND DEVICES OF THE SAME

(75) Inventor: Timothy M. Swager, Newton, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 793 days.

(21) Appl. No.: 09/777,725

(22) Filed: Feb. 5, 2001

(65) Prior Publication Data

US 2002/0040805 A1  Apr. 11, 2002

Related U.S. Application Data

(60) Provisional application No. 60/180,357, filed on Feb. 4, 2000.

(51) Int. Cl.
| | |
|---|---|
| H01B 1/00 | (2006.01) |
| H01B 1/12 | (2006.01) |
| H01B 1/04 | (2006.01) |
| H01B 1/06 | (2006.01) |
| H01L 29/08 | (2006.01) |
| H01L 35/24 | (2006.01) |
| H01L 51/00 | (2006.01) |
| G01N 27/26 | (2006.01) |
| C08F 290/14 | (2006.01) |
| H01L 29/43 | (2006.01) |

(52) U.S. Cl. ............ 252/500; 252/502; 252/510; 252/506; 204/415; 422/98; 525/50; 257/40; 257/139

(58) Field of Classification Search ........ 252/500, 252/502, 506, 510; 204/415; 422/98; 525/50; 257/40, 139
See application file for complete search history.

(56) References Cited

U.S. PATENT DOCUMENTS

| | | | |
|---|---|---|---|
| 4,839,112 A | 6/1989 | Wynne et al. | |
| 4,841,099 A * | 6/1989 | Epstein et al. | 174/258 |
| 4,957,615 A | 9/1990 | Ushizawa et al. | |
| 4,992,244 A | 2/1991 | Grate | |

(Continued)

FOREIGN PATENT DOCUMENTS

WO    WO 99/57222 A1    11/1999

(Continued)

OTHER PUBLICATIONS

T. Swager, "The Molecular Wire Approach to Sensory Signal Application," Acc. Chem. Res., vol. 31, pp. 201-207, 1998.

(Continued)

*Primary Examiner*—Jezia Riley
(74) *Attorney, Agent, or Firm*—Wolf, Greenfield & Sacks, P.C.

(57) ABSTRACT

The present invention relates to compositions which provide an insulated nanoscopic pathway. The pathway comprises molecules, polymers or nanoscopic particles capable of conducting charge integrated with nanoscopic switches which are capable of electronic communication with the charge-conducting species. Turning "on" the nanoscopic switch electronically "connects" the various molecules/particles, such that a continuous nanoscopic pathway results. The nanoscopic pathway can be used in a sensor, where the switches can act as receptors for analytes. Binding of an analyte can result in a variety of effects on the nanoscopic pathway, including altering the conductivity of the nanoscopic pathway.

75 Claims, 25 Drawing Sheets